(12) United States Patent
Silina et al.

(10) Patent No.: US 12,722,791 B2
(45) Date of Patent: Sep. 1, 2026

(54) SYSTEMS AND METHODS FOR AIRCRAFT PROPULSION

(71) Applicant: Limo Air Drive Corp., Road Town (VG)

(72) Inventors: Olga Viktorovna Silina, Cernobbio (IT); Mikhail Vasiliev, Moscow (RU); Sergey Alexandrovich Vybornov, Cernobbio (IT)

(73) Assignee: Limo Air Drive Corp., Road Town (VG)

( * ) Notice: Subject to any disclaimer, the term of this patent is extended or adjusted under 35 U.S.C. 154(b) by 0 days.

(21) Appl. No.: 18/527,105

(22) Filed: Dec. 1, 2023

(65) Prior Publication Data

US 2024/0199220 A1 Jun. 20, 2024

Related U.S. Application Data

(63) Continuation-in-part of application No. PCT/IB2022/000432, filed on Jun. 1, 2022.

(Continued)

(51) Int. Cl.

*B64D 31/18* (2024.01)
*B60L 58/10* (2019.01)

(Continued)

(52) U.S. Cl.

CPC .............. *B64D 31/18* (2024.01); *B60L 58/10* (2019.02); *B63H 11/02* (2013.01); *B64C 35/001* (2013.01);

(Continued)

(58) Field of Classification Search

CPC ...... B60L 58/10; B60L 2200/10; B63H 11/02; B64C 35/00; B64C 35/001; B64C 35/002;

(Continued)

(56) References Cited

U.S. PATENT DOCUMENTS

| | | | | |
|---|---|---|---|---|
| 2,062,384 A * | 12/1936 | White | B64C 35/00 | 244/105 |
| 2,379,186 A * | 6/1945 | Reynolds | B64C 35/00 | 244/63 |

(Continued)

FOREIGN PATENT DOCUMENTS

| | | |
|---|---|---|
| CA | 3180611 A1 | 4/2024 |
| CN | 106018675 A | 10/2016 |

(Continued)

OTHER PUBLICATIONS

Adu-Gyamfi et al., Electric aviation: A review of concepts and enabling technologies. Transportation Engineeringl. 2022;9:100134, 14 pages.

(Continued)

*Primary Examiner* — Joshua E Rodden
(74) *Attorney, Agent, or Firm* — McCarter & English, LLP

(57) ABSTRACT

A flotation system for an aircraft that includes a battery system providing power to the aircraft is presented. The flotation system can include a water propulsion system enables maneuvering of the aircraft, such as a seaplane, on the surface of water. The system can include waterjets located on floats of the aircraft that enable maneuvering of the aircraft in forward, backward, and lateral directions as well as rotational motion. The systems are quieter in operation than the main engine of the aircraft and provide precision maneuvering for docking or active stabilization of the aircraft's position.

37 Claims, 47 Drawing Sheets

Related U.S. Application Data

(60) Provisional application No. 63/430,851, filed on Dec. 7, 2022, provisional application No. 63/195,462, filed on Jun. 1, 2021.

(51) Int. Cl.

| | |
|---|---|
| ***B63H 11/02*** | (2006.01) |
| ***B64C 35/00*** | (2006.01) |
| ***B64D 27/33*** | (2024.01) |
| ***B64D 43/00*** | (2006.01) |
| ***B64U 50/19*** | (2023.01) |
| ***B64U 60/10*** | (2023.01) |
| ***H01M 10/42*** | (2006.01) |
| ***H01M 50/24*** | (2021.01) |

(52) U.S. Cl.

CPC ............. *B64D 27/33* (2024.01); *B64D 43/00* (2013.01); *B64U 50/19* (2023.01); *B64U 60/10* (2023.01); *H01M 10/425* (2013.01); *H01M 50/24* (2021.01); *B60L 2200/10* (2013.01); *B64U 2201/10* (2023.01); *H01M 2010/4271* (2013.01); *H01M 2220/20* (2013.01)

(58) Field of Classification Search

CPC ... B64C 35/003; B64C 35/005; B64C 35/006; B64C 35/007; B64C 35/008; B64D 27/33; B64D 31/18; B64D 43/00; B64U 50/19; B64U 60/10; H01M 10/425; H01M 2010/4271; H01M 2220/20

USPC ........................................................... 244/55

See application file for complete search history.

(56) References Cited

U.S. PATENT DOCUMENTS

| | | | | |
|---|---|---|---|---|
| 2,495,643 | A | 1/1950 | Pidgeon | |
| 4,351,500 | A * | 9/1982 | Golze | B64C 25/56 114/283 |
| 4,848,702 | A * | 7/1989 | Riggins | B64C 25/54 114/283 |
| 5,913,493 | A | 6/1999 | Labouchere | |
| 8,795,009 | B1 | 8/2014 | Yan et al. | |
| 9,789,768 | B1 | 10/2017 | Meier | |
| 10,059,436 | B1 * | 8/2018 | Robertson | B64D 27/31 |
| 10,081,422 | B1 * | 9/2018 | Reichert | B64C 27/20 |
| 10,543,905 | B1 * | 1/2020 | Kwon | B64D 27/357 |
| 10,559,792 | B1 | 2/2020 | Combs | |
| 11,208,210 | B2 * | 12/2021 | Wiplinger | B64D 37/04 |
| 11,273,924 | B2 * | 3/2022 | Kwon | B64D 33/08 |
| 2009/0121071 | A1 | 5/2009 | Chan | |
| 2010/0032522 | A1 * | 2/2010 | Zadini | B63H 25/46 244/105 |
| 2019/0016448 | A1 | 1/2019 | Robertson et al. | |
| 2020/0017228 | A1 | 1/2020 | Combs et al. | |
| 2020/0381985 | A1 | 12/2020 | Sercombe et al. | |
| 2021/0237834 | A1 * | 8/2021 | They | B64C 35/008 |
| 2021/0394900 | A1 * | 12/2021 | They | B60F 5/003 |
| 2022/0024584 | A1 | 1/2022 | Peterson | |
| 2022/0077516 | A1 | 3/2022 | Combs et al. | |
| 2022/0111958 | A1 * | 4/2022 | Tian | B64U 60/30 |
| 2022/0380043 | A1 * | 12/2022 | Mulligan | G01S 15/8902 |
| 2024/0140603 | A1 | 5/2024 | Amerl | |
| 2025/0074617 | A1 * | 3/2025 | Kays | B64D 31/18 |

FOREIGN PATENT DOCUMENTS

| | | | |
|---|---|---|---|
| CN | 108995794 | A | 12/2018 |
| CN | 110341896 | A | 10/2019 |
| EP | 3798124 | A1 | 3/2021 |
| KR | 2773026 | B1 * | 2/2025 |
| RU | 2592755 | C2 | 7/2016 |
| WO | 2022/254257 | A2 | 12/2022 |
| WO | 2024/121793 | A1 | 6/2024 |

OTHER PUBLICATIONS

Haran, Electric/Hybrid-Electric Drives for Aircraft Propulsion. Illinois, Electrical & Computer Engineering, College of Engineering. Slideshow. 23 pages.

Nagy, Electric aircraft—present and future. Production Engineering Archives. 2019;23:36-40.

Shadbolt, Technical Study, Electric Aviation in 2022. HDI Global Specialty SE. 56 pages, (2022).

Ying, Electric Aircraft. Climate Change Mitigation Aircraft Technologies. Chapter Five, pp. 120-123, (2022).

International Search Report and Written Opinion for Application No. PCT/IB2023/062364, dated Apr. 8, 2024, 17 pages.

International Search Report and Written Opinion for Application No. PCT/IB2022/000432, dated Feb. 22, 2023, 20 pages.

Loxton et al., First Flight of the Ecaravan, magniX and AeroTEC's All-Electric Cessna 208B Technology Demonstrator. AeroTEC. 21 pages, (2022).

* cited by examiner

Battery Management System (BMS) 302
Right float Controller 116
Left float Controller 116
motor Driver 304
DC
3.3V DC
24V DC
5V DC
ω (°/s)
φ (°)
M
SM
t°
CAN
340
320
To 120 in FIG. 12A/12B
To 352 in FIG. 12A/12B
220V AC / 24V DC (charge)
114
111
112
117
118
121A
121B
306
316
317
318
319
331
332
333
334
Waterjet Control System (R) 300
Waterjet Control System (L) 300

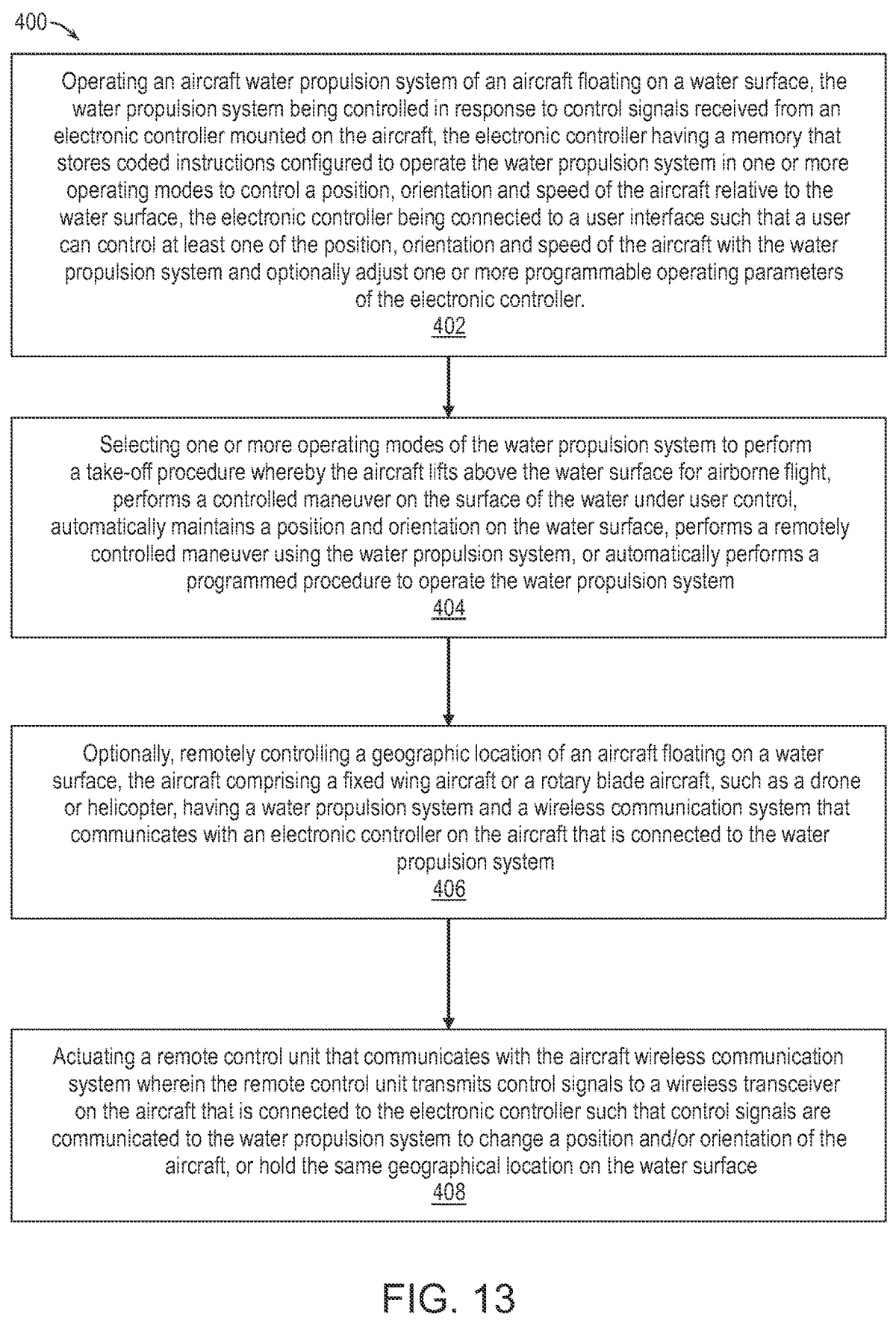

400

Operating an aircraft water propulsion system of an aircraft floating on a water surface, the water propulsion system being controlled in response to control signals received from an electronic controller mounted on the aircraft, the electronic controller having a memory that stores coded instructions configured to operate the water propulsion system in one or more operating modes to control a position, orientation and speed of the aircraft relative to the water surface, the electronic controller being connected to a user interface such that a user can control at least one of the position, orientation and speed of the aircraft with the water propulsion system and optionally adjust one or more programmable operating parameters of the electronic controller.
402

Selecting one or more operating modes of the water propulsion system to perform a take-off procedure whereby the aircraft lifts above the water surface for airborne flight, performs a controlled maneuver on the surface of the water under user control, automatically maintains a position and orientation on the water surface, performs a remotely controlled maneuver using the water propulsion system, or automatically performs a programmed procedure to operate the water propulsion system
404

Optionally, remotely controlling a geographic location of an aircraft floating on a water surface, the aircraft comprising a fixed wing aircraft or a rotary blade aircraft, such as a drone or helicopter, having a water propulsion system and a wireless communication system that communicates with an electronic controller on the aircraft that is connected to the water propulsion system
406

Actuating a remote control unit that communicates with the aircraft wireless communication system wherein the remote control unit transmits control signals to a wireless transceiver on the aircraft that is connected to the electronic controller such that control signals are communicated to the water propulsion system to change a position and/or orientation of the aircraft, or hold the same geographical location on the water surface
408

FIG. 13

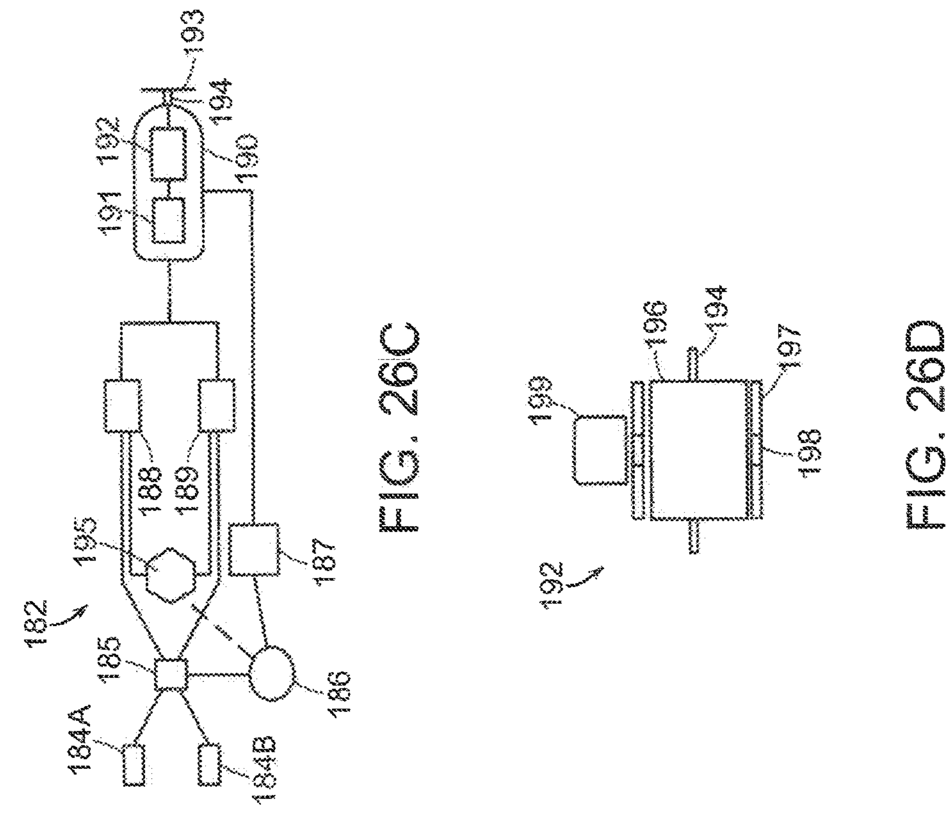
FIG. 26C
FIG. 26D
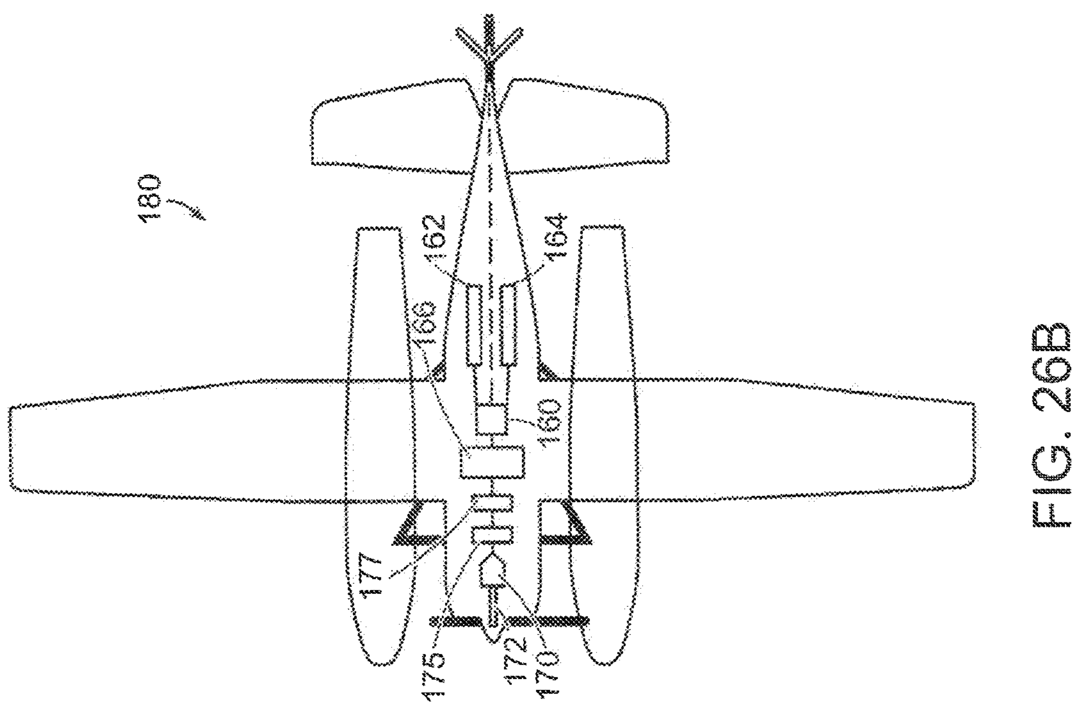
FIG. 26B

Available modes for each state

DEACTIVATED:
- DISARM

FAIL:
- DISARM

NOT_NEUTRAL:
- DISARM

ACTIVATED:
- DISARM
- ARM • DIRECT/ SEMIAUTO/FULL AUTO

SYSTEMS AND METHODS FOR AIRCRAFT PROPULSION

CROSS-REFERENCE TO RELATED APPLICATIONS

This application claims the benefit of U.S. Provisional Application No. 63/430,851 filed on Dec. 7, 2022 and is a continuation-in-part of International Application PCT/IB2022/000432, filed Jun. 1, 2022, which claims benefit of priority to U.S. Provisional Application No. 63/195,462, filed Jun. 1, 2021, the entire contents of each of the above applications being incorporated by reference herein.

BACKGROUND

Seaplanes are aircraft that can take off and land from a body of water. For safety and maneuverability, seaplanes take off and land in open areas of the body of water that are free from obstacles and away from shore. The conventional seaplane traverses across the surface of the water from a takeoff/landing zone to a dock using thrust provided by the propeller that is typically coupled to the main engine of the seaplane.

SUMMARY

An aircraft water propulsion system is provided in which the pilot of the aircraft can utilize the water propulsion system to propel and steer the aircraft across the surface of a body of water such as a lake, a river or an ocean without the need to also use the aircraft engine to propel the aircraft while on a water surface. Such aircraft are frequently required to land and takeoff in more populated areas including cities, towns, marinas, or beaches and the noise generated by aircraft engines that are operated for taxiing to docks or the shoreline, as well as takeoff and landing, can limit use as such operations are commonly restricted in many locations due to noise and safety considerations.

Preferred embodiments comprise an electronic control system to operate the water propulsion system of the aircraft. The electronic control system can include programmable electronic controller connected to one or more electric motors that are used to drive one or more water propulsion thrusters. Seaplanes can comprise one or more flotation surfaces and preferred embodiments can include the one or more propulsion thrusters mounted on or adjacent to an aircraft body that includes the one or more flotation surfaces. Many seaplanes have a pair of floats mounted to a seaplane fuselage and some embodiments include one or more propulsion thrusters mounted to each float. Some embodiments can include propulsion thrusters such as waterjets with sufficient water thrust to propel the aircraft on a water surface. Waterjets can be driven by electric motors that are operated by motor controllers that are connected to the electronic controller. The electronic controller can comprise one or more data processors such as commercially available microcontrollers mounted on one or more circuit boards. The thrusters can be separately controlled using programmable processors in which a sequence of coded instructions can be stored in a memory to perform a plurality of thrust and braking operations to provide precision control of the aircraft during movement across a water surface.

Exemplary systems can utilize battery systems to provide power to the aircraft. Battery modules can be located in the aircraft fuselage and/or in one or more floats on which the aircraft operates on water surfaces such as oceans, lakes or rivers. Preferred embodiments house a plurality of battery modules in each of a pair of floats mounted below the aircraft fuselage. The batteries in a float can provide power to a water propulsion system in each of the pair of floats. A battery management system includes control circuitry to manage power from each battery module to the water propulsion system and can be used by other electrically operated aircraft components. The batteries can comprise lithium-ion batteries, for example, that provide the required voltage and current for operation of the systems as described herein. The batteries are rechargeable and a connector port is provided on each float for connection to an external source of electrical power to recharge the batteries while the aircraft is docked, for example. By placement of the battery system in the flotation system of the aircraft, the center of gravity is lowered thereby substantially increasing the stability of the aircraft. The battery system can be housed in a pair of separate floats or within a single central flotation assembly that forms a part of the fuselage of the aircraft.

A user interface can be used to manually control the water propulsion system during use. A pilot may sit in the aircraft cockpit at the flight instrument panel where a manual controller can be positioned for ease of use while flight operations are also conducted during flight or after landing on a water surface. The instrument panel can include displays or gauges to indicate the status of the water propulsion system as well as the condition of other flight control systems. A handle grip stick can be used to generate electrical control signals that are delivered to the electronic controller. The user interface can include a touchscreen display that the pilot can use to enter data, adjust water propulsion system operating parameters and/or modes of system operation. One or more computer programs or modules can be stored in memory devices connected to the different processors utilized to control and monitor aircraft operations.

The electronic controller for the water propulsion system can be remotely controlled by wireless transceiver mounted to the aircraft that is configured to receive control signals from an external transmitter. The external transmitter can be operated by the remote user such as a pilot onshore that needs to move the aircraft remotely. Frequently seaplanes can be anchored offshore while not in use and the present system can be used to remotely control the position of the aircraft using the water propulsion system. The system can also be programmed to perform automated operations of the aircraft such as the anchoring of the aircraft in a fixed location or area using the propulsion system to automatically maintain that location even where wind, tidal or other water flow conditions may cause the aircraft to move. The remotely controlled system can have restricted access using password protection and/or include encryption software/firmware to prevent unwanted interference with system operation.

Thus, as described herein, the aircraft can operate in several motion modes. In the manual control (MC) mode, the speed selection and direction of movement is carried out by the operator. In this case, the operator has direct access to the controls of the aircraft using an electronic controller in the cockpit. In the remote control (RC) mode, the speed selection and direction of movement is carried out by the operator. However, in this case, the operator controls the movement using a remote controller and does not have direct access to the controls of the aircraft (i.e., operator is not sitting in the cockpit or operator seat). In the autonomous control (AC) mode, the speed selection and direction of movement is carried out autonomously by means of the systems of the aircraft, that is, without direct operator involvement, and according to a stored movement program embedded in the control system of the aircraft.

Further embodiments of aircraft that can employ electronically controlled water propulsion systems as described herein can include monohull seaplanes as well as autonomous unmanned aircraft (drones), helicopters, and autogyros that employ floats to enable takeoff and/or landing on a water surface. The water intake, jet flow and exhaust requirements can vary depending on the speed, weight and power requirements for each application.

BRIEF DESCRIPTION OF DRAWINGS

Illustrative embodiments are shown by way of example in the accompanying drawings and should not be considered as a limitation of the present disclosure:

FIG. 13 is a process flow diagram illustrating methods of operating aircraft water propulsion systems according to various embodiments of the invention.

FIG. 26B illustrates placement of storage batteries within the aircraft including fuselage in accordance with various embodiments described herein.

FIG. 26C illustrates an electric motor propulsion system for an aircraft in accordance with various embodiments described herein.

FIG. 26D schematically illustrates a cross-sectional view of an electric motor for propelling an aircraft in accordance with various embodiments described herein.

DETAILED DESCRIPTION

Figure 1:
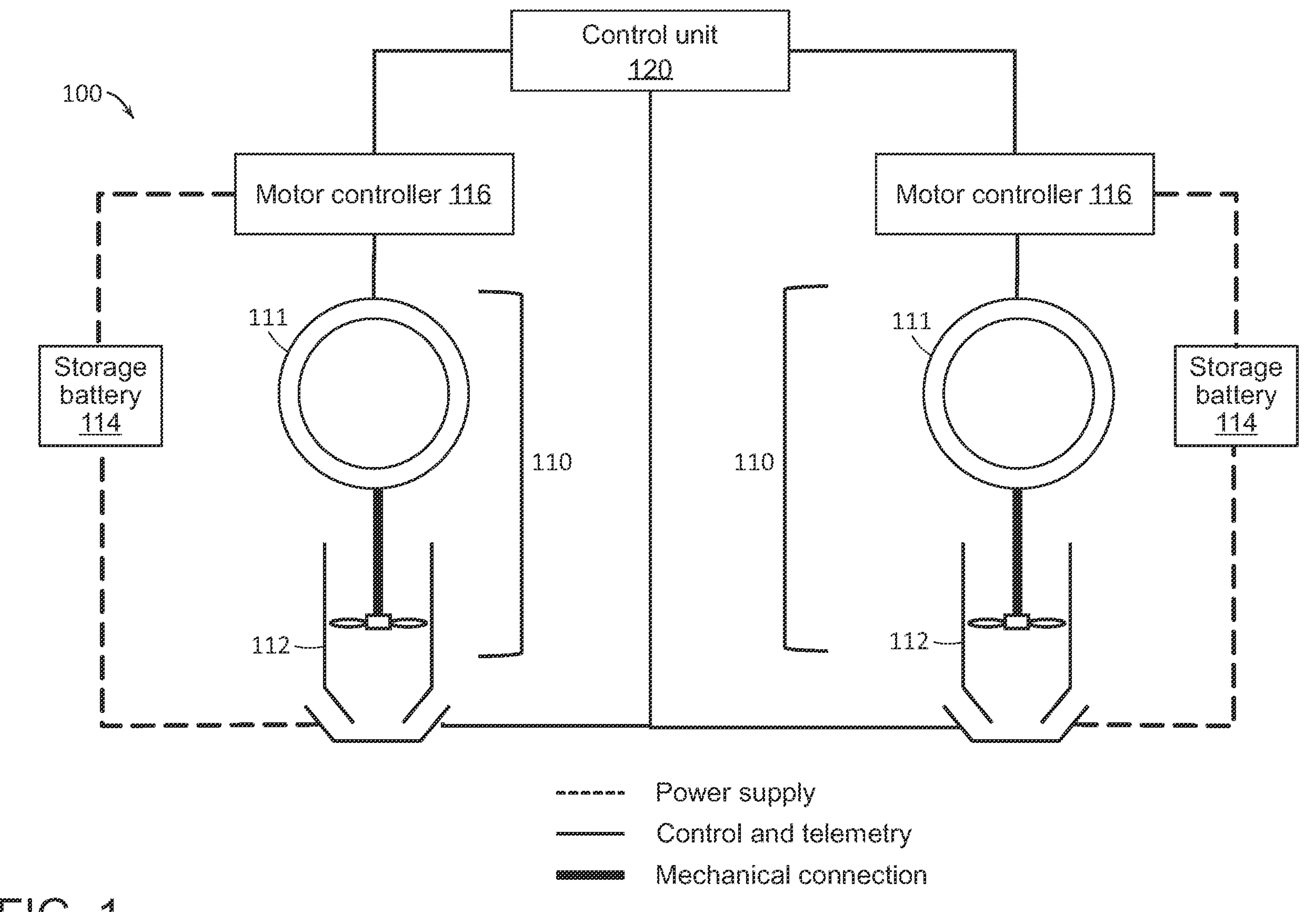
FIG. 1 illustrates a schematic view of the components of a propulsion system according to some embodiments described herein.

Systems and methods of the present disclosure provide propulsion for maneuvering an aircraft, such as a seaplane, on the water using a propulsion system that provides thrust separate from a main engine of the aircraft. The propulsion system allows the aircraft to move, maneuver, park, transport to take-off, and transport from landing on the water using the propulsion system independent of the other aircraft systems including the main engine. The propulsion system can operate even when the main engine is off. The propulsion system provides accurate and safe maneuvering of the aircraft when moving on water comparing to the use of just the main engine.

Conventionally, an aircraft maneuvers on water by using the main engine to power the propeller to pull the plane in the desired direction of travel. Because the propeller must rotate at an appreciable speed to pull the aircraft through the water, the main engine and propeller still produce a high level of noise at any time the operator is attempting to move the aircraft. This noise is undesirable particularly as the aircraft approaches the coastline or dock where habitation is likely. Moreover, the spinning propeller creates a risk of property damage or personal injury as the aircraft approaches a dock or habitation. Systems and methods described herein can use water propulsion devices such as waterjets or nozzles that are submerged under floats of the aircraft, which creates relatively less noise than the main engine and propeller of the aircraft. The water propulsion devices also present little to risk of injury or damage as they are not in proximity to other objects above the water and can be used even with the main engine and propeller turned off. Thus, the systems described herein reduce the level of noise emitted by the aircraft and can reduce safety risks caused the propeller while maneuvering. As such, the aircraft with the disclosed propulsion system can maneuver safely and quietly in highly congested water areas, including, but not limited to, ports, mooring places, airports with a water landing strip, and service areas with limited space to maneuver.

A conventional aircraft has a limited range of motion on the water using the main engine and propeller. The propeller provides forward motion while the aircraft's water rudder, flaps, or ailerons to change direction. As a result, the aircraft can largely accomplish only forward motion with slow curved turns. Systems and methods described herein enable linear and rotational motion that would be impossible or impractical in a standard aircraft such as backwards or lateral motion and rotational motion including rotation in-place (i.e., unaccompanied by linear motion).

Systems and methods described herein can use the propulsion system in conjunction with thrust from the main engine and propeller to provide improved handling of the aircraft. For example, the propulsion system can be activated in conjunction with the main engine of the aircraft to reduce the take-off run distance of the aircraft. Additionally, the propulsion system can be activated in conjunction with the main engine of the aircraft to provide additional braking during the landing. In this way, the propulsion system of the present disclosure makes possible the use of certain limited length water spaces that may not be usable by an aircraft utilizing main engine power alone.

Systems and methods described herein can use the propulsion system to provide active stabilization to the aircraft. In the absence of a mooring or anchor, aircrafts can drift away from an initial position due to motion of the water or wind. The propulsion system described herein can be used to maintain the aircraft's position within a small dedicated water area in some embodiments.

Systems and methods described herein can be used in conjunction with a broad range of types of aircraft including those with relatively high curb weight. Because the system provides propulsion for the aircraft on the surface of the water, it is suitable for use with light or heavy craft because weight has only a slight impact on the speed of movement on the water using the described systems. The disclosed systems and methods allow an aircraft to perform maneuvers on the water including mooring to the shore, without using the main engine and propeller, which reduces the noise level generated during this maneuvering. Moreover, the systems and methods herein enable an operator to choose a broad range of directions and patterns of movement, which can facilitate and accelerate the response to the prevailing spatial situation and enables effective avoidance of emergency situations.

FIG. 1 schematically illustrates a propulsion system 100 for an aircraft in accordance with various embodiments described herein. The propulsion system 100 includes one or more water propulsion devices 110 controlled by control and telemetry signals provided by motor controllers 116. The water propulsion devices 110 can include an electric motor 111 and a waterjet 112. Batteries 114 supply power to the motor controller 116, the electric motor 111, and/or the waterjet 112. An electronic controller 120 (also referred to herein as a "control unit") is operatively connected to provide control signals to the waterjets 112 and the motor controllers 116 to provide the desired level and direction of thrust as described in greater detail below. The propulsion system 110 enables an aircraft to maneuver by providing controlled thrust vectoring.

Figure 2:
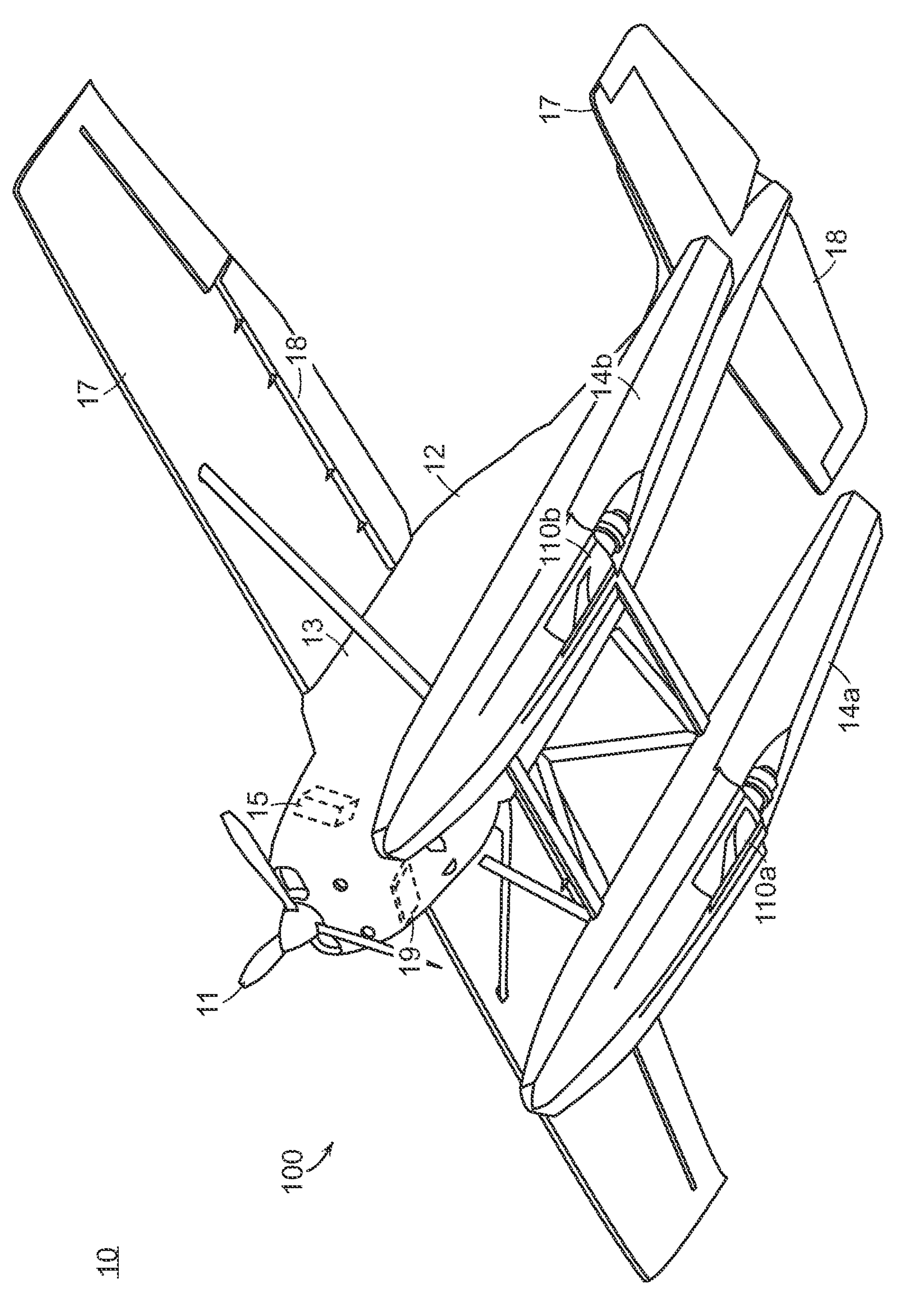
FIG. 2 illustrates the propulsion system attached to an aircraft according to some embodiments described herein.

FIG. 2 illustrates a rear view from below of an aircraft 10 including the propulsion system 100 according to various embodiments. The aircraft 10 includes a fuselage 12, an aircraft engine 11, one or more wings 17, and a flotation surface such as floats 14*a*, 14*b*. A pilot located in a cockpit 13 of the aircraft 10 can operate a flight control system 15 of the aircraft 10 and the propulsion system 100 of the aircraft 10. The flight control system 15 is connected to the aircraft engine 11 to control airborne flight of the aircraft 10 such as by using a propeller, jets, or other form of aerial thruster. The flight control system 15 also controls flight control surfaces 18 such as flaps, rudders, and ailerons on each wing 17 to control movement of the aircraft 10 in flight. A fuel tank 19 supplies fuel to the aircraft engine 11. Each water propulsion device 110*a*, 110*b* of the propulsion system 100 is disposed on the underside of a respective float 14*a*, 14*b* to allow the pilot to independently control thrust to enable maneuvering of the aircraft on a water surface.

In some embodiments, the floats 14*a*, 14*b* are each attached to the fuselage 12. The flotation surface can include multiple surfaces such as the individual surfaces of the floats 14*a*, 14*b* that contact water.

Water propulsion devices 110 including electric motors 111 and waterjets 112 allow for quiet operation and direct electronic control. In other embodiments, the water propulsion devices 110 can use other engines, motors, and propulsion devices known in the art. For example, the water propulsion devices 110 can include internal combustion engines, boat shafts, or any other creating thrust devices. Water propulsion devices 110 according to the present disclosure can use any fuel as a source of energy including, but not limited to, electrical energy (e.g., batteries) or chemical energy (e.g., gasoline or propane). The water propulsion devices 110 can utilize fuel from the fuel tank 19 of the airplane in some embodiments. In preferred embodiments, the water propulsion devices 110 operate using an independent source of power unrelated to the fuel tank 19 and aircraft engine 11.

In some embodiments, the noise level generated by the water propulsion devices 110 of the current disclosure can be as low as 55 dB, which is much lower than the maximum permissible noise level generated by a light aircraft taking off of 89 dB as mandated by industry regulators (e.g., noise levels mandated by the International Civil Aviation Organization (ICAO) in Annex 6, Volume I to the Convention on International Civil Aviation) and which is also below the noise level of conventional modern engines and propellers of 77-78 dB (e.g., the measured noise of a Quest Kodiak 100 aircraft with Aerocet 6650 Amphibious Floats). In preferred embodiments, the water propulsion system 100 as described herein can be a factor of six to ten times quieter than using the main aircraft engine 11 with a propeller to maneuver the plane on the water surface.

The electronic controller 120 enables control of the speed of movement of the aircraft by controlling the speed of the motor 111 using the motor controller 116. For example, the electronic controller 120 can provide signals to increase or decrease the rotation speed of the electric motors 111 that thereby creates a change in the thrust created by the waterjets 112. In other words, the waterjet 112 thrust can be adjusted by the electronic controller 120 by changing the number of revolutions per minute of the turbine in the waterjet 112. In some embodiments, the electronic controller 120 can include a manual controller that is installed in the cockpit or cabin of the aircraft. The manual controller can be a separate interface that is not connected with the regular flight controls or the flight control system in some embodiments. An embodiment of a standalone manual controller is described in greater detail below with respect to FIG. 11. Alternatively, the manual controller can be integrated into the regular aircraft controls (e.g., steering wheel or flight stick). In some embodiments, the electronic controller 120 is configured to receive control commands from a remote controller that is operated outside the cabin or outside the aircraft itself.

The storage batteries 114 can provide power to the motor controllers 116 and other components of the water propulsion system 110 in some embodiments. In some embodiments, the storage batteries 114 can be recharged while the aircraft 10 is positioned on the ground. The storage batteries 114 can be charged in place while attached to the aircraft 10, or they can be charged separately by disconnecting the batteries 114 from the aircraft 10. In some embodiments, the storage batteries 114 can be charged while the aircraft is off the ground, i.e., during flight using an aircraft alternator, for example. For some embodiments, the storage batteries 114 can include a charger that connects to a pre-existing electric generator in the aircraft 10. The electric generator can output electricity generated by the aircraft motor 11 and charge the storage batteries 114 via the charger. The charger can be set into the aircraft onboard equipment in some embodiments. The storage batteries 114 can contain a sufficient charge to enable maneuvering of the aircraft on the water for a given time. For each flight, the aircraft battery system should store enough charge to at least perform 1-2 hours of water propulsion operation.

Figure 3A:
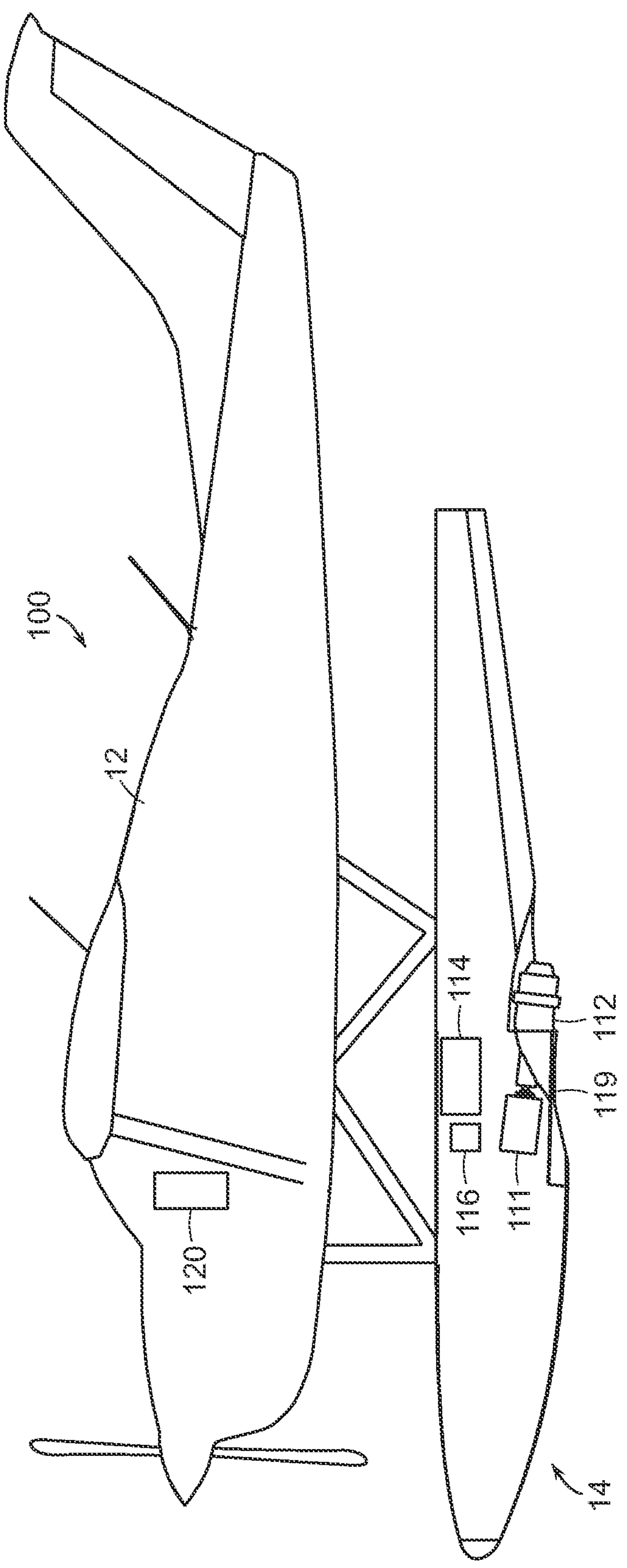
FIG. 3A illustrates a side view of placement of components of the propulsion system on the aircraft including motor controllers located in floats of the aircraft in accordance with some embodiments described herein.

FIG. 3A schematically illustrates a side view of placement of components of the water propulsion system 100 on components of the aircraft 10 in certain embodiments. The electronic controller 120 is positioned in the fuselage 12 of the aircraft in this design. The electric motor 111, waterjet 112, storage batteries 114, and motor controllers 116 of the water propulsion device 110 are positioned on or in the float 14 of the aircraft. Water is drawn into the waterjet assembly through inlets 119. Positioning of the motor controllers 116 and storage batteries 114 closer to the electric motor 111 can improve performance and reliability by allowing for short and direct connection between the motor controllers 116 and/or the storage batteries 114 and the electric motor 111.

Figure 3B:
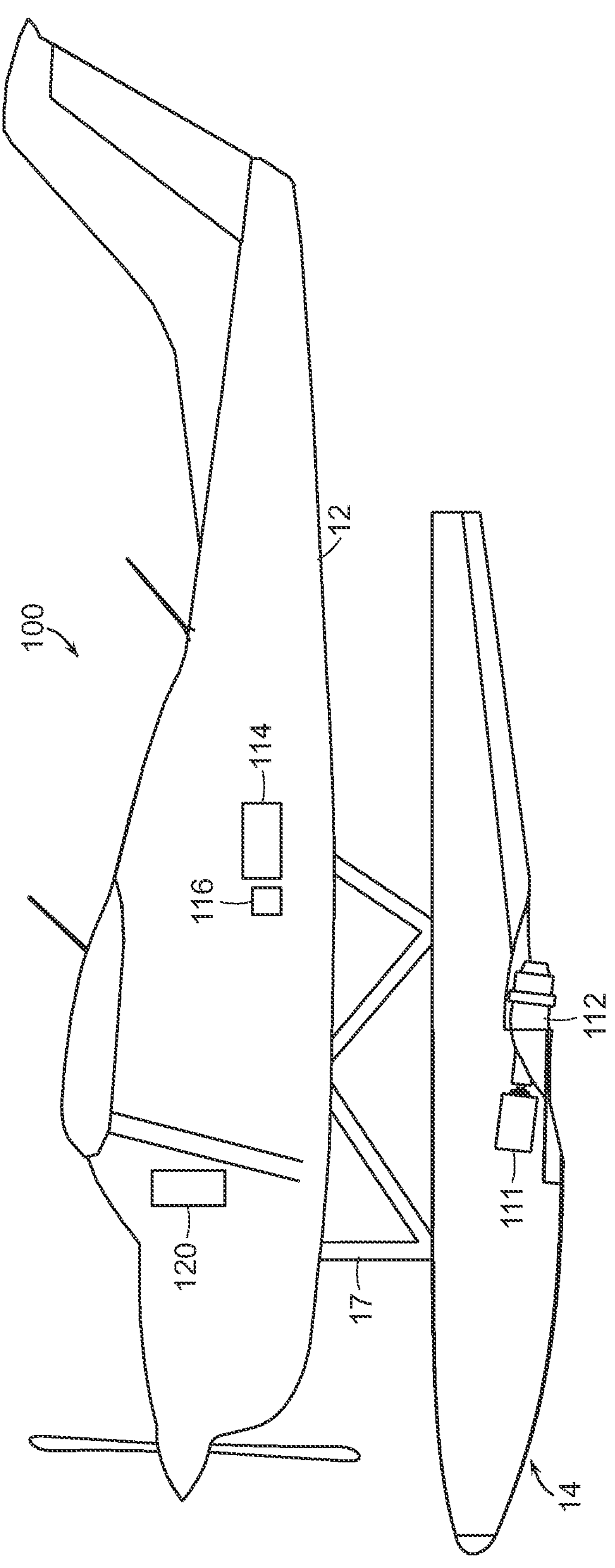
FIG. 3B illustrates a side view of placement of components of the propulsion system on the aircraft including motor controllers located in a fuselage of the aircraft in accordance with some embodiments described herein.

FIG. 3B illustrates a side view of placement of components of the water propulsion system 100 on the aircraft in accordance with some embodiments described herein. The electronic controller 120 is positioned in the fuselage 12 of the aircraft and the electric motor 111 and waterjet 112 of the water propulsion device 110 are positioned on or in the float 14 of the aircraft. In this embodiment, the motor controller 116 and storage batteries 114 are housed within the fuselage 12. Power and control connections, such as wires or cables, can connect the motor controller 116 and/or storage batteries 114 to the electric motor 111. For example, the power and control connections can be passed within or exterior to struts 17 of the aircraft. In some embodiments, the power connections can include a wireless component (e.g., an inductive coupler). In some embodiments, the control connections can include wireless communications components (e.g., Wi-Fi, Bluetooth®, or other wireless communication standard). Placement of the batteries 114 within the fuselage 12 can improve physical accessibility of the batteries (e.g., for removal and external charging or replacement). Placement of the motor controller 116 within the fuselage 12 can improve manufacturing efficiencies by enabling co-location of the electronic controller 120 and motor controller 116 in the same unit or even the same circuit board in some embodiments.

Although not displayed in FIGS. 3A, and 3B, other contemplated embodiments locate the motor controller 116 and batteries 114 in separate components from one other (e.g., batteries 114 in fuselage and motor controller 116 in the float 14 or vice versa). In some embodiments, the electronic controller 120 can be located in the float 14.

The aircraft 100 can include a hybrid propulsion system that includes electronic power elements in addition to other conventional power elements such as combustion engines. In one embodiment, the hybrid flight propulsion system can include water propulsion devices 110*a*, 110*b* as taught in other embodiments of this disclosure that are powered by electrical energy (e.g., batteries). The aircraft 100 can include power and control connections such as wires or cables that connect the motor controller 116 and/or storage batteries 114 to the water propulsion electric motor 111. The aircraft 100 in one embodiment can also include a second motor controller 129 and additional storage batteries 113 to provide electrical energy to an electric flight propulsion motor 160 that is attached to a first propeller 123 of the aircraft 100. In some embodiments, the additional storage batteries 113 can also be connected to the water propulsion systems as a backup power source. The aircraft also includes a combustion engine 150 that connects to a second propeller 127 of the aircraft. The electronic controller 120 can control the combustion engine 150 and the electric motor 160 to operate in individual modes (i.e., only one of the engine 150 or the motor 160 is operating) or combined modes (i.e., both engine 150 and motor 160 are operating). In some embodiments, the combustion engine 150 is connected to the second propeller 127 by a first motor shaft and the electric motor 160 is connected to the first propeller 123 by a second coaxial motor shaft. In other embodiments, a single motor shaft of a hybrid flight propulsion system is connected to single propeller that is coupled to both the combustion engine 150 and the electric aircraft engine 160. This can be accomplished, for example, using a transmission in which either the combustion engine or the electric aircraft engine is coupled to the motor shaft. Hybrid propulsion systems for aircraft have been manufactured by GE Aerospace and also by Honeywell Aerospace, for example.

In some embodiments of the present disclosure, the electric motor 160 is connected to the aircraft propeller 123 to power motion of the aircraft 10 including during taxiing and/or flight. In some embodiments, the electronic controller 120 can divert power distribution from the storage batteries 114 to the water propulsion devices 110 and/or the batteries 113 to the electric motor 160 as needed to guide the aircraft for taxiing and flight operations. In some embodiments, the electronic controller 120 can control operation of the combustion engine 150 and the electric motor 160 to use the appropriate modality for a given set of circumstances. For example, the electronic controller 120 can use electric motor 160 or the combustion engine 150 together with the water propulsion system 111,112 during takeoff when maximum power is desirable. During level flight at a set altitude, the electronic controller 120 can utilize the electric motor 150 to operate the aircraft propeller(s)s and cut off the combustion engine 150 to conserve fuel. If the electronic controller 120 receives an indication that battery power is low or is approaching a pre-set limit (e.g., receives a signal from a sensor associated with the battery that measures battery voltage or current that little power remains or that the battery is nearly depleted past the point where enough power remains for water navigation after landing), the electronic controller 120 can reduce the power expenditure to the electric motor 160 (e.g., by turning off the electrical motor 160) and employ only the combustion engine 150. In some embodiments, the aircraft 100 includes recharging electronics such that operation of the combustion engine 150 can recharge the storage batteries 116, 129. In some embodiments, the aircraft 10 can include a portion or all of an existing hybrid propulsion system such as the systems available from Ampaire, Inc. of Temecula, CA including their “Eco Caravan” model that can be adapted for mounting of a water propulsion system as described herein.

Storage batteries of the seaplane can be charged on the ground, either while batteries are attached to the seaplane, or separately, by removing them from onboard. In some embodiments, the storage batteries can be charged during flight by setting a charger into the onboard equipment and connecting it to the standard electric generator of the seaplane. Further embodiments can include aircraft with battery powered engines for such as those available from MagniX USA, Inc. located in Richmond, WA wherein power from battery systems as described herein can be used to power flight of the aircraft. In preferred embodiments power generated by batteries in the floats can be directed through power cables mounted in or on the aircraft mounting frame that connects the aircraft fuselage to the floats. Alternatively, as shown in FIG. 26B, batteries 162, 164 and 166 can be mounted in a distributed arrangement within the fuselage of the aircraft to be symmetric about the longitudinal axis of the aircraft to locate the center of gravity of the aircraft in a nominal position. These batteries are electrically to a battery management system 160 as described herein. These batteries can provide power to the aircraft flight propulsion electric engine 170 directly coupled to the propeller shaft 172. The electric engine can comprise one or more electric motors governed by a motor controller 175 and system controller 177. The batteries supplying power to the electric engine 170 can be low voltage and high voltage sources as high voltages in a range of at least 400-800 volts are required to drive the propulsion system such as a propeller or other rotary engine components used to provide thrust for flight of the aircraft. The main controller 120 of the aircraft 180 can operate the aircraft flight operation as well as the water propulsion system as described in conjunction with the various embodiments thereof set forth herein.

Shown in FIG. 26C is a detailed system diagram for an electric propulsion system 182 for control the electric engine. In this embodiment, the engine can comprise two or more electric motors 191, 192 that are coupled to a common rotor shaft 194 and propeller 193, for example. A second pair of motors can be used to drive a second rotor shaft and a second propeller for multi-engine aircraft. The plurality of motors provide redundancy for the propulsion system and can be operated by motor controllers 188, 189 in a multi-phase high voltage format. A system controller 195 is connected to both motor controllers 188, 189 to control operation of the propulsion system and thereby control the speed of the aircraft in flight. This system can be centrally controlled in combination through aircraft operating interface 185 with the water propulsion system as previously described to control operation during take-off and landing. In further embodiments, the system controller 195 can also be solely used to control movement of the aircraft on a water a surface without operation of a water propulsion system. Batteries 184A and 184B can be used to provide high voltage and/or low voltage power to the propulsion system. Power management controller 185 operated power distribution from the batteries 184A, 184B. The batteries mounted in the flotation system of a seaplane or other aircraft designed to launch and land on a water surface as described herein can also be used to provide power to the electric propulsion system as described herein in connection with FIGS. 26C and 26D.

An exemplary cross-section of an electric motor 192 used for aircraft propulsion is schematically shown in FIG. 26D. The electric motor includes a cryocooler 199 mounted within the engine housing 190 adjacent to the stator assembly 197 to control the engine temperature. A coil 198 can be mounted with the stator for coupling to the rotor assembly. The rotor assembly 196 mounted within the stator assembly is driven at high speeds to turn the main rotor shaft 194 thereby providing propulsion for flight. The electric motor can also generate power during braking with the propeller. The operation of electric motor assemblies for aircraft propulsion is described in numerous prior US patents and applications including US2020/00381985, U.S. Pat. Nos. 10,137,891, 11,711,003, 11,608,185, and WO2019/145777, the entire contents of these patents and applications being incorporated herein by reference.

Figure 42:
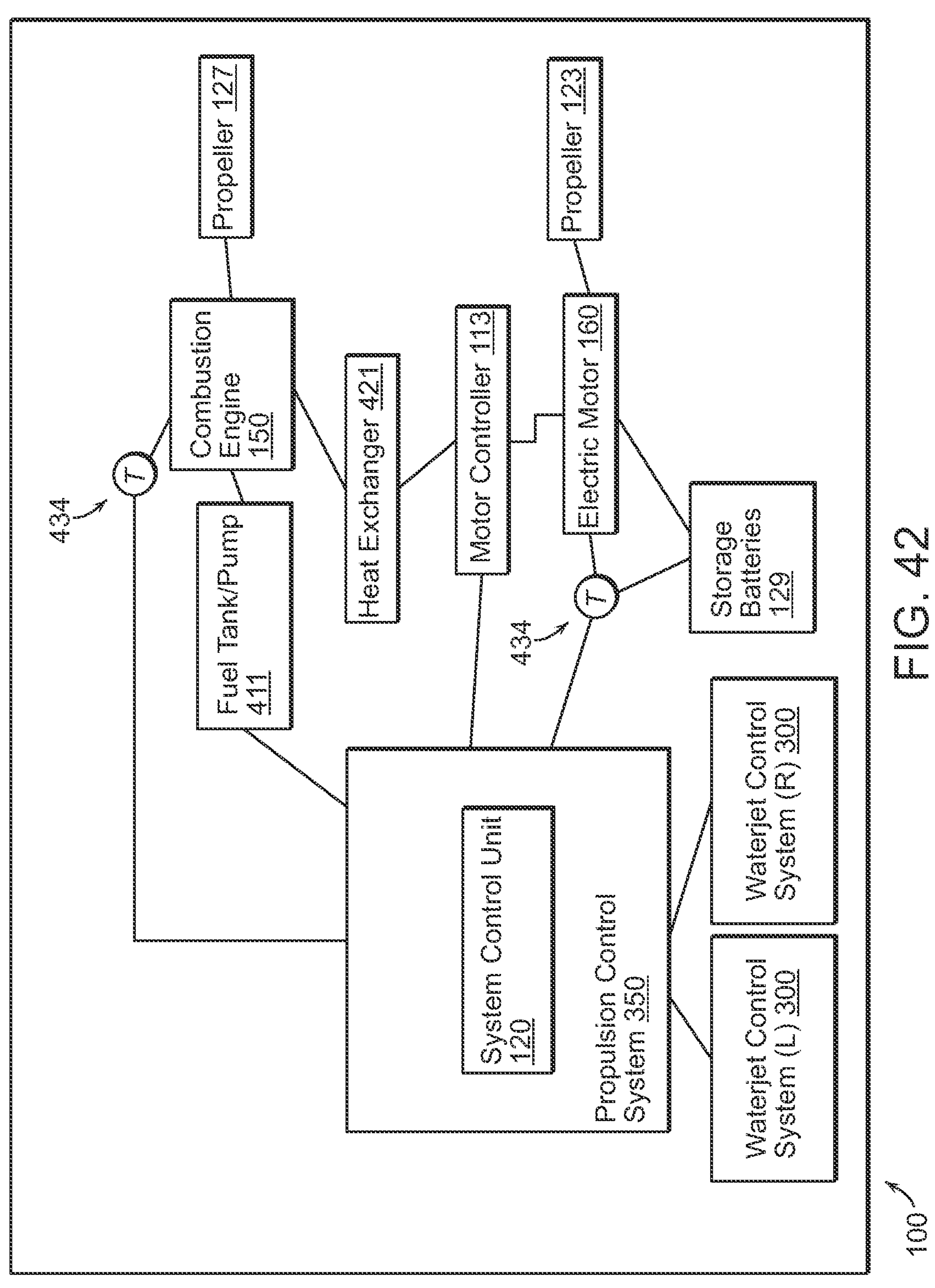
FIG. 42 illustrates a schematic diagram for a hybrid aircraft in accordance with various embodiments described herein.

A method of operating the hybrid aircraft as described in greater detail in FIG. 42. The method includes controlling operation of a hybrid flight propulsion system and a water propulsion system for an aircraft wherein the hybrid flight propulsion system includes a first engine connected to a fuel source and a second engine connected to an electric power source that powers an electric motor and wherein the aircraft includes a programmed control system to control the hybrid propulsion system and the water propulsion system. The method includes operating flight controls of the aircraft (by a pilot on the aircraft or by remote control) to actuate the water propulsion system to move the aircraft to a position of the aircraft on a water surface wherein the water propulsion system is powered by the electric power source. The method optionally includes transmitting and storing telemetry data during operation of the aircraft to a remote receiver by wireless transmission, the telemetry data including first engine status data, fuel status data, electric power source status data, second engine status data and water propulsion system status data The method also includes accelerating the aircraft by operation of at least one of the first engine and the second engine to a speed resulting in airborne flight of the aircraft wherein the control system is programmed to switch between operation of the first engine and the second engine during flight after consumption of an amount of fuel during flight wherein the aircraft includes a monitoring system that monitors the amount of fuel stored by the fuel source and a level of charge stored in the electric power source during flight. The method also includes actuating the water propulsion system to move the aircraft across a water surface to a docking or mooring location upon landing the aircraft on the water surface. The method optionally includes using a remote control system to remotely operate the aircraft by operation of the water propulsion system without operating the first engine or the second engine.

Figure 4:
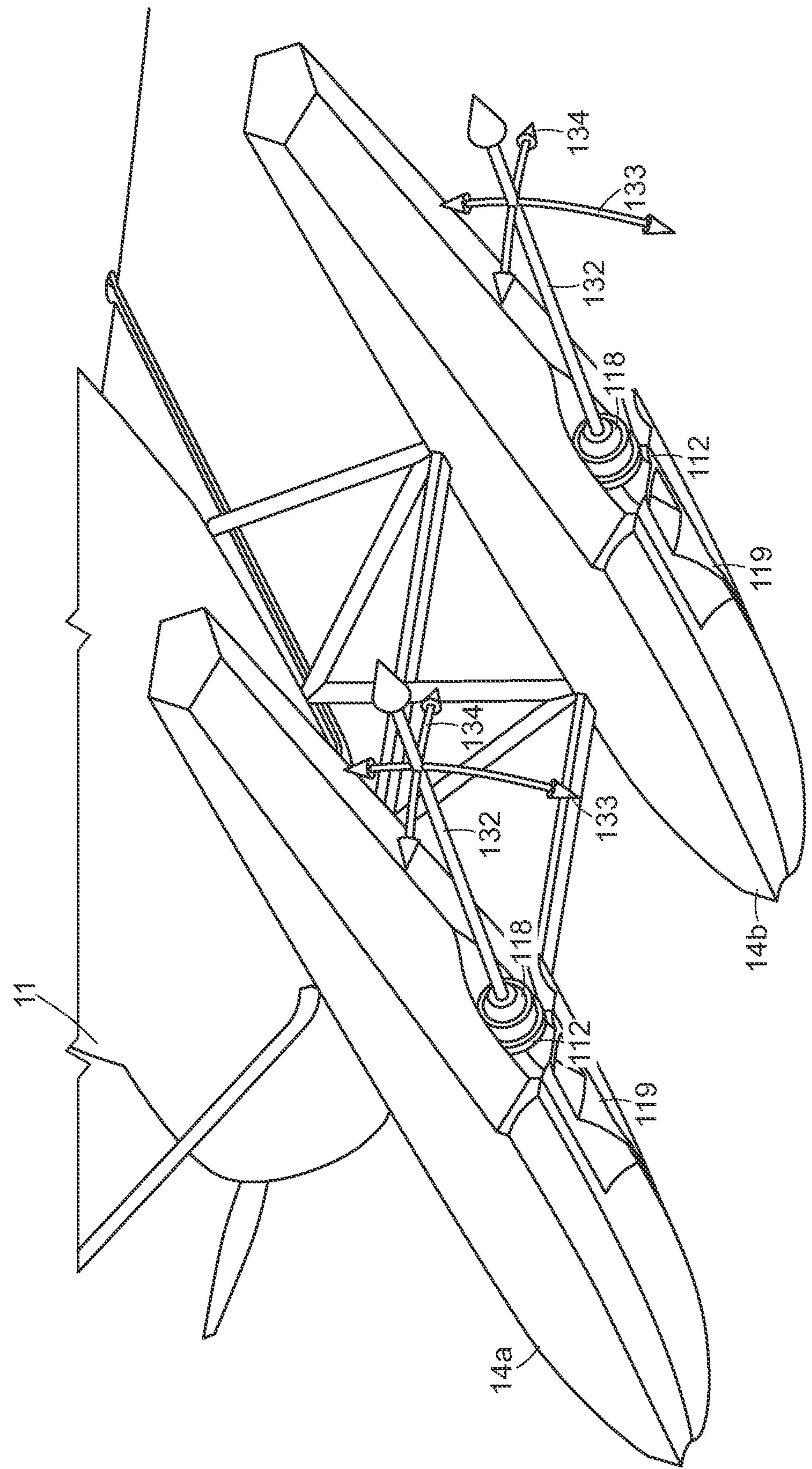
FIG. 4 is a view from the rear underside of the aircraft with propulsion system illustrating adjustability of the exhaust direction in accordance with some embodiments described herein.

FIG. 4 is a view from the rear underside of the aircraft with water propulsion system illustrating the adjustability of the exhaust direction. In some embodiments, the water propulsion device 110 can include a thrust director that controls the output direction of an exhaust vector 132 produced by the water propulsion system 110 and thus enables control of the direction of thrust for the aircraft. For a water propulsion system 110 that includes a waterjet 112, a controllable nozzle 118 can be fitted at the output of the waterjet 112 to control the direction at which water is emitted from the waterjet 112. The nozzle 118 is a rotary outlet nozzle in some embodiments. The nozzle 118 is connected to the electronic controller 120, and the electronic controller 120 can send control signals to the nozzle 118 to change tilt position in a vertical direction 133 or in a horizontal direction 134. In FIG. 4, both floats 14*a*, 14*b* include a waterjet 112 and nozzle 118. In embodiments with more than one nozzle 118, each nozzle 118 can be independently controlled by the electronic controller 120. The pilot or user can adjust the vector 132 of the thrust output through the electronic controller 120 to move the aircraft in different directions or perform other maneuvers as described in greater detail below with respect to FIGS. 8A-9E.

Figure 5:
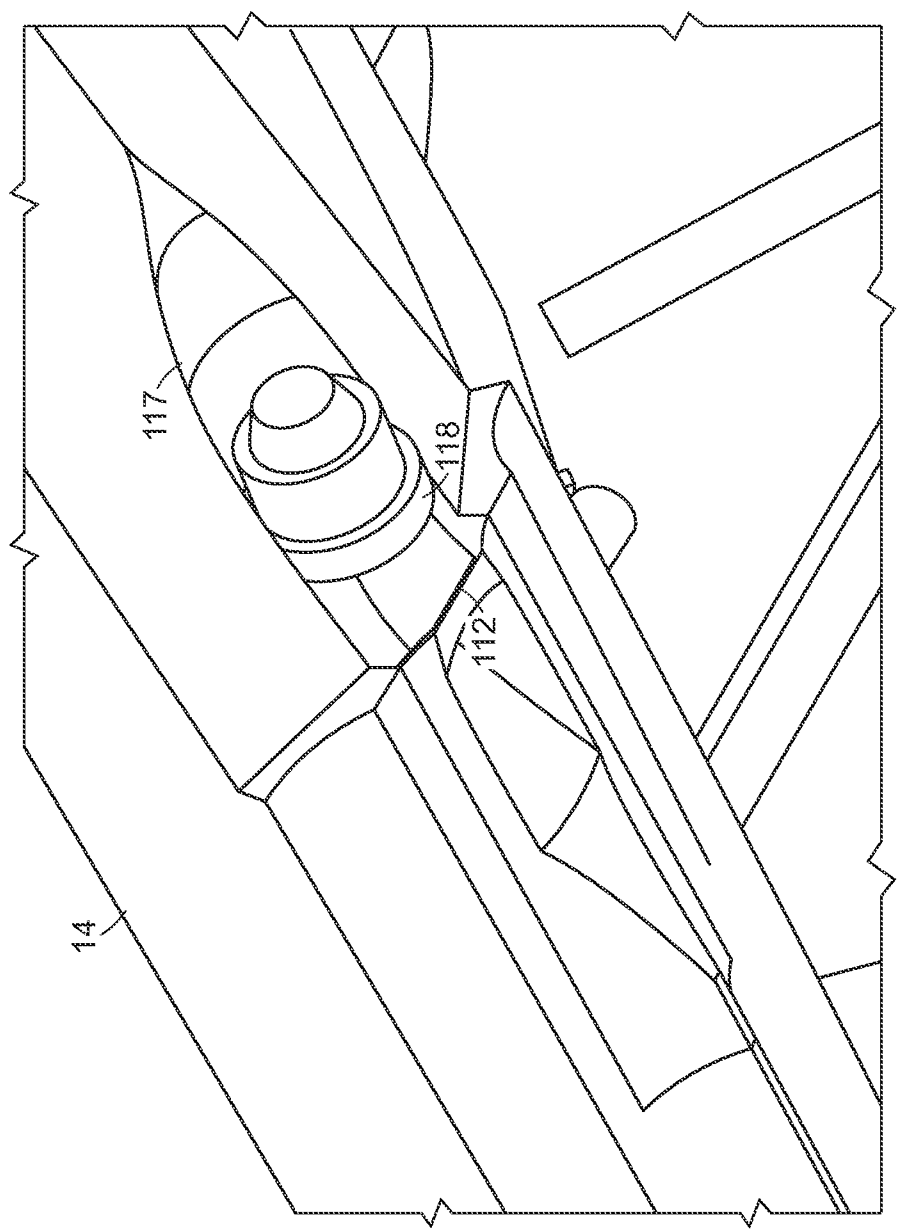
FIG. 5 illustrates a water propulsion device of the propulsion system including a reverse deflector in the unactuated position according to some embodiments of the current disclosure.
Figure 6:
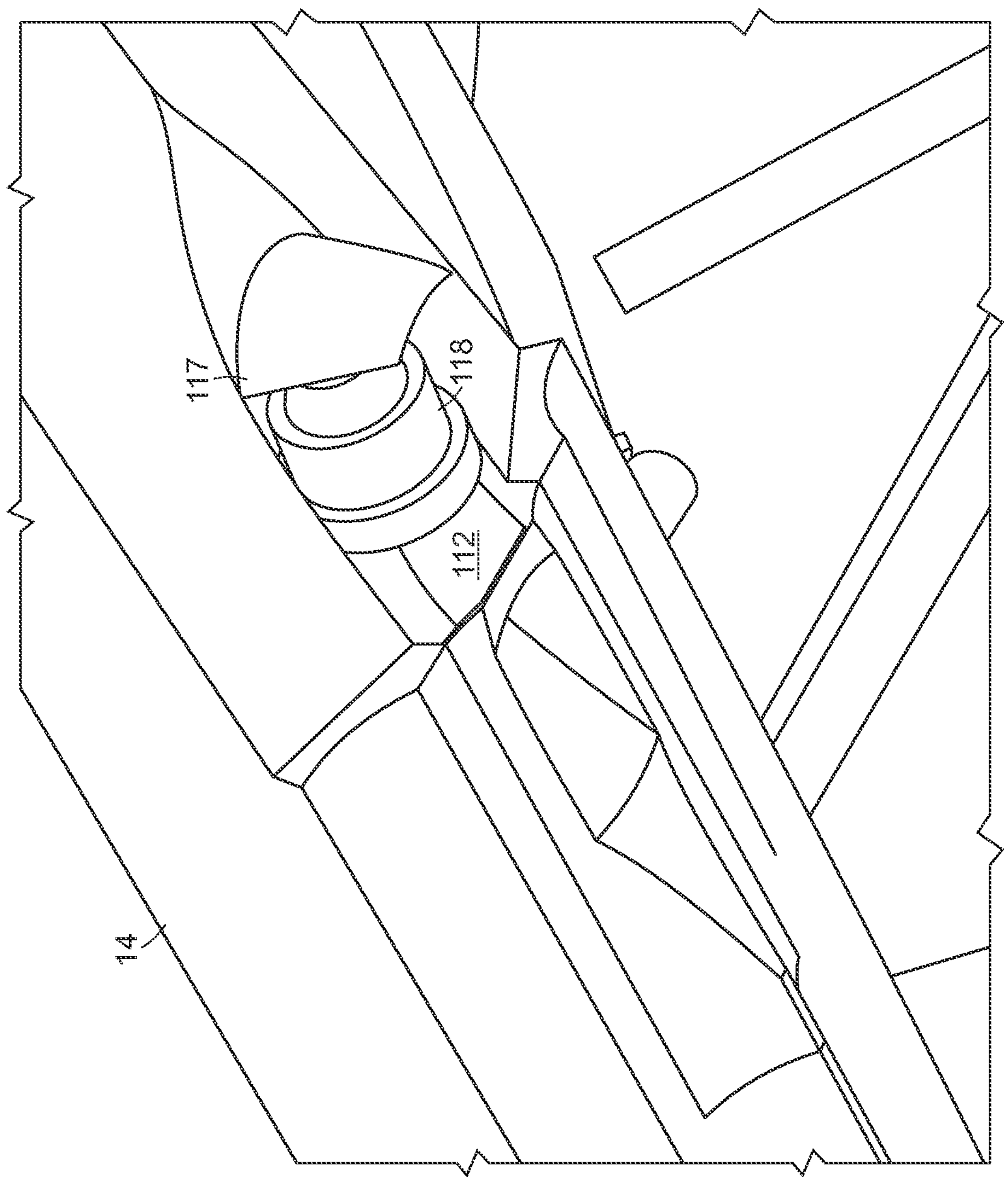
FIG. 6 illustrates the water propulsion device including the reverse deflector in the actuated position according to some embodiments of the current disclosure.
Figure 7:
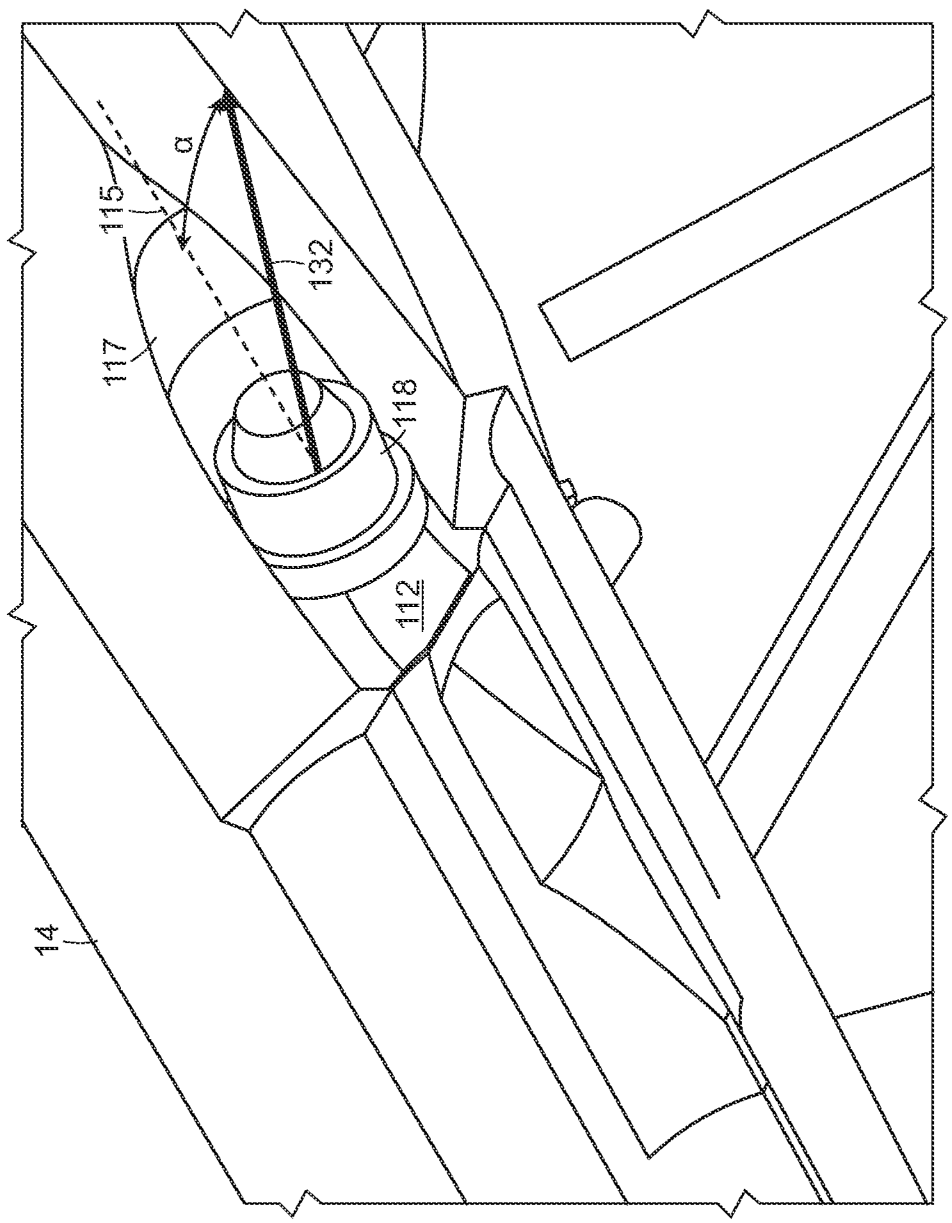
FIG. 7 illustrates the water propulsion device with adjustable thrust direction according to some embodiments of the present disclosure.

FIG. 5 illustrates a magnified view of a preferred embodiment of the water propulsion system 110 including the waterjet 112, the nozzle 118 and a reverse deflector 117. In FIG. 5, the reverse deflector 117 is in a stowed position that does not interfere with the thrust direction produced by the waterjet 112. In FIG. 6, the same system is illustrated with the reverse deflector 117 in the active position to deflect the thrust produced by the waterjet 112. The reverse deflector 117 can deflect the water flow such that the deflection of the exhaust vector 132 points towards the front of the aircraft and the aircraft moves backwards. The electronic controller 120 is connected to the reverse deflector 117 to engage or stow the reverse deflector 117. In some embodiments, the reverse deflector 117 can be adjusted and held at a continuum of positions spanning the fully engaged and stowed states. In other words, the reverse deflector 117 need not be used in only a binary on/off manner. FIG. 7 illustrates the system of FIG. 5 with the nozzle 118 adjusted to direct the exhaust vector 132 at an angle $\alpha$ with respect to a centerline 115 of the float 14.

Figure 8A:
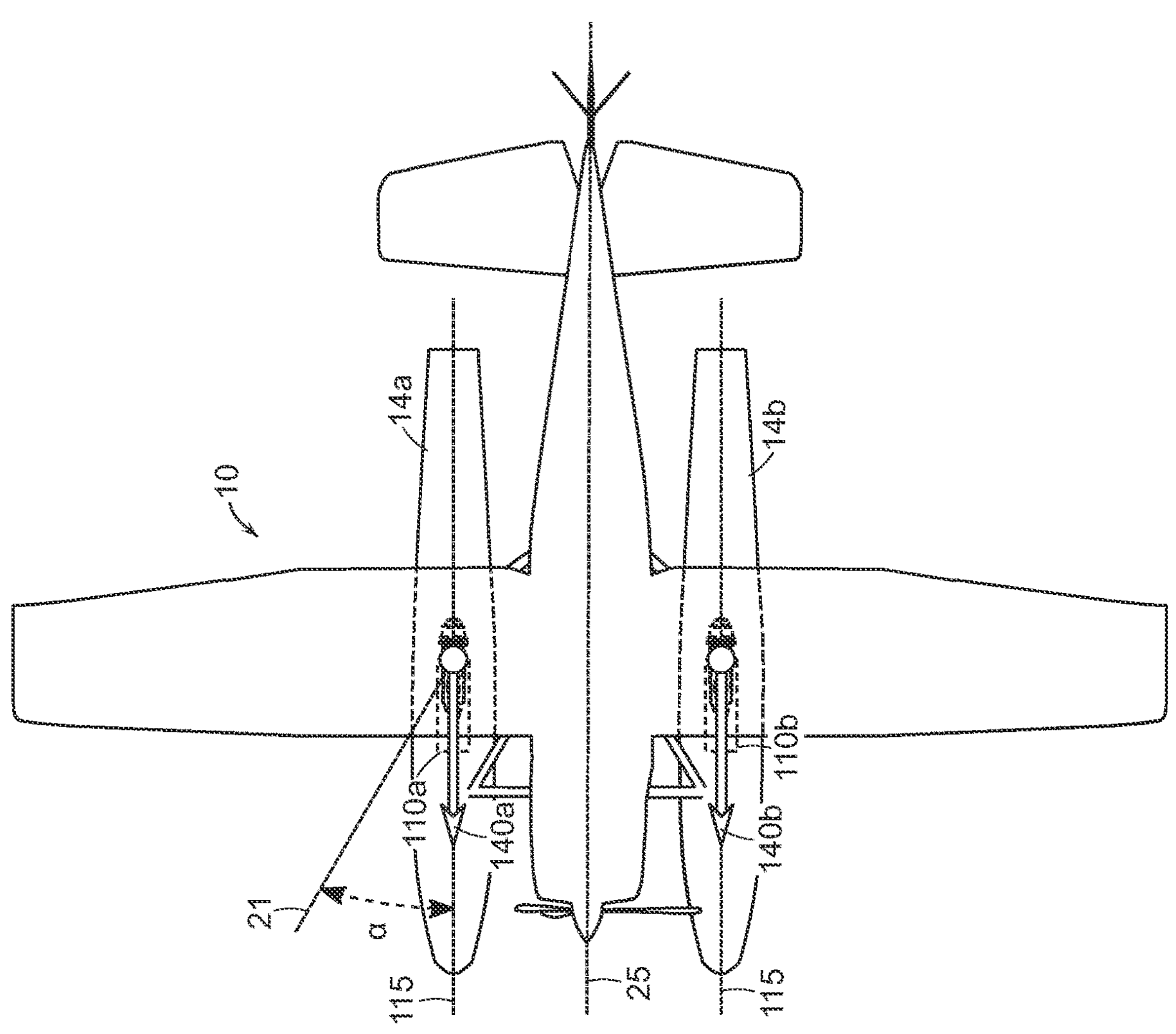
FIG. 8A illustrates a control mode where the thrust vectors provided by both water propulsion devices are in the same forward direction and parallel to a centerline of the fuselage according to some embodiments of the present disclosure.

Independent control of different water propulsion devices 110 by the electronic controller 120 enables a range of motion and maneuvering modes. FIG. 8A shows a schematic representation of the aircraft 10 with two floats 14*a*, 14*b* each equipped with a respective water propulsion device 110*a*, 110*b*. Each water propulsion system 110*a*, 110*b* produces a respective thrust vector 140*a*, 140*b*. In the motion mode illustrated in FIG. 8A, both water propulsion devices 110*a*, 110*b* are producing thrust vectors 140*a*, 140*b* that are aligned along a centerline or axis 115 of its respective float 14*a*, 14*b*. The aircraft 10 also has a centerline 15, which may or may not be parallel to the centerlines 115 of the floats.

FIG. 8A shows the case of a longitudinal position of the thrust vectors in the forward direction (i.e., for forward aircraft movement). However, as described herein, each waterjet can be coupled to a reverse deflector 117 and a rotary outlet nozzle 118 simultaneously to enable a range of options for the movement of the aircraft. For example, control of the nozzle 118 and reverse deflector 117 can enable rotation of the thrust vector around the point of its application to the float (i.e., at the exit of the waterjet). Line 21 illustrates a portion of the possible range for the thrust vector 140*a* as it rotates around the point of application to the aircraft in the clockwise direction by angle α with respect to the axis 115. The thrust vectors 140*a*, 140*b* can rotate in both clockwise and counterclockwise directions in various embodiments.

Figures 8B, 8C:
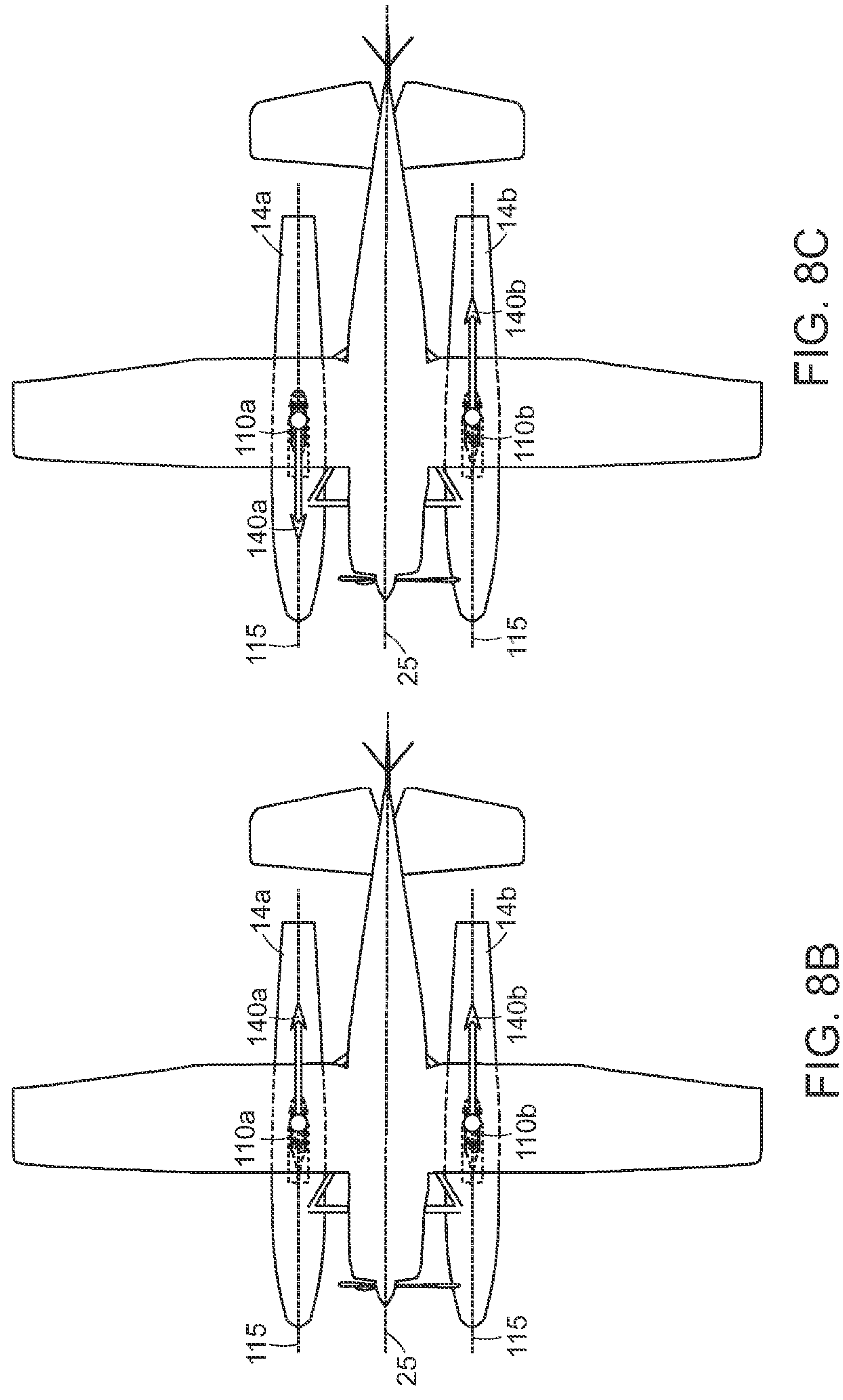
FIG. 8B illustrates a control mode where the thrust vectors provided by both water propulsion devices are in the same backward direction and parallel to a centerline of the fuselage according to some embodiments of the present disclosure.
FIG. 8C illustrates a control mode where the thrust vectors provided by both water propulsion devices are in opposite directions and parallel to the centerline of the fuselage according to some embodiments of the present disclosure.

FIG. 8B illustrates the scenario where thrust vectors 140*a*, 140*b* are parallel to the float axes 115 in a backward direction (i.e., thrust is directed towards the rear of the aircraft). In this configuration, aircraft backward movement is implemented without having to turn the aircraft around the center of mass. FIG. 8C shows the scenario where thrust vectors 140*a* and exhaust vector 132 are both aligned parallel to the axes 115 their respective floats 14*a*, 14*b* but are aligned antiparallel to each other. The result of the configuration of exhaust vector 132 and thrust vector 140*b* shown in FIG. 8C is that the aircraft will turn in place around its center of gravity. The ability to turn in place without moving forwards or backwards enables maneuvering in a limited space.

Figures 8D, 8E:
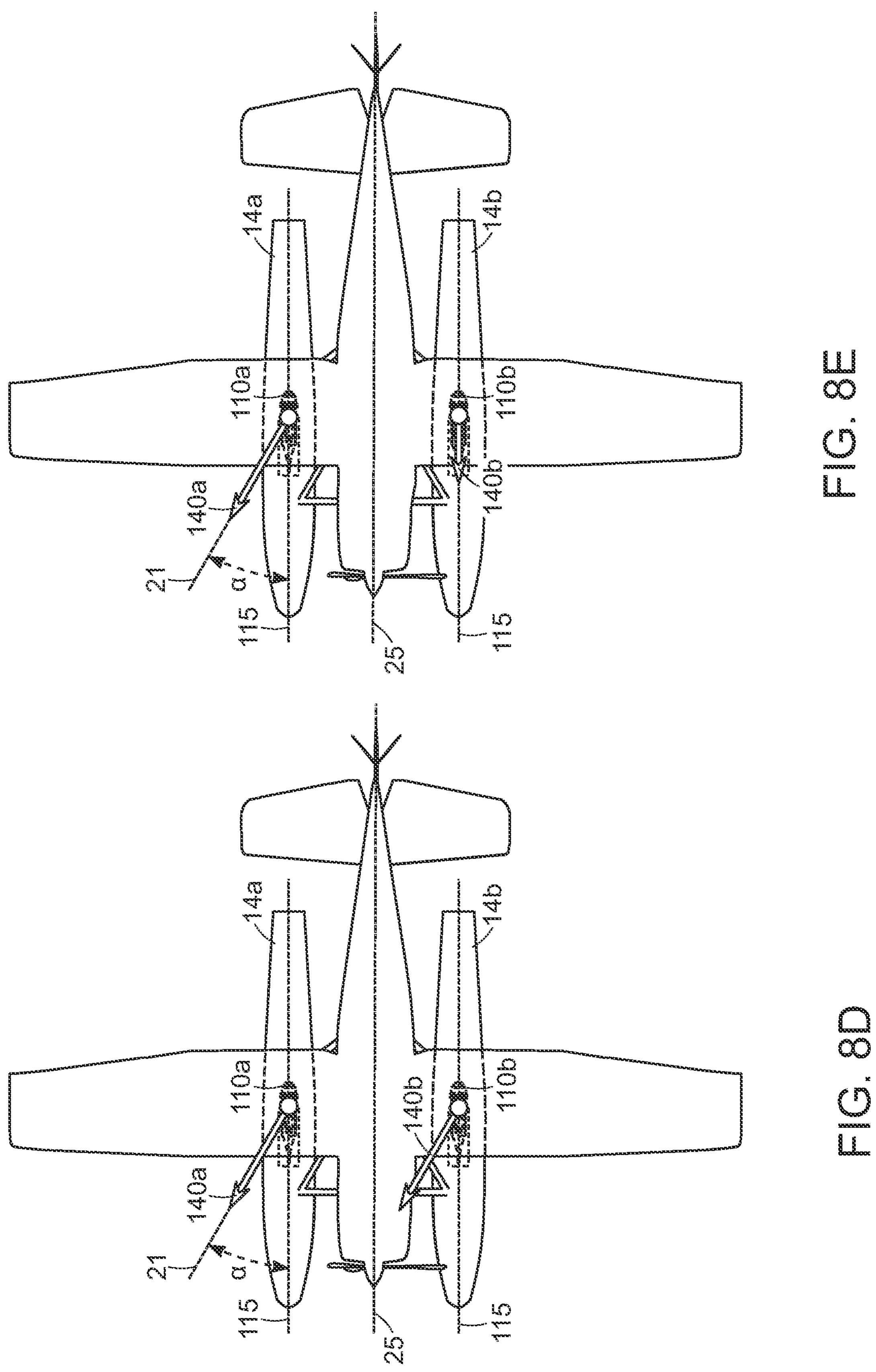
FIG. 8D illustrates a control mode where the thrust vectors provided by both water propulsion devices are in the same direction at an angle with respect to the centerline of the fuselage according to some embodiments of the present disclosure.
FIG. 8E illustrates a control mode where one water propulsion device produces a thrust vector at an angle with respect to the centerline of the fuselage while the other water propulsion device produces a thrust vector parallel to the centerline according to some embodiments of the present disclosure.

FIG. 8D shows the scenario of synchronous clockwise rotation of the thrust vectors 140*a*, 140*b* by α angle. While the directions of individual thrust vectors 140*a*, 140*b* can be individually controlled as described above, the directions of the individual thrust vectors 140*a*, 140*b* can also be locked and/or adjusted synchronously. Locking the thrust vectors to one another can simplify control for a user and enable more streamlined or rudimentary control schemes or inputs such as a joystick to move the aircraft.

FIG. 8E shows the scenario where the magnitude of one thrust vector 140*b* is reduced with respect to the other thrust vector 140*a*. The smaller thrust vector 140*b* is aligned with the float axis 115 while the larger thrust vector 140*a* is oriented at an angle α with respect to its float axis 115. Relative adjustment of the magnitudes of the thrust vectors 140*a*, 140*b* can be used to more smoothly control turning or motion of the aircraft.

In some embodiments, changes in direction of movement for the aircraft (for example, a smooth turn) can be achieved by using the electronic controller 120 to increase or decrease the rotation speed of the electric motor 110*a* associated with one float 14*a* with respect to the rotation speed of the electric motor 110*b* of the other float 14*b*. In some embodiments, change in direction can be achieved by using the electronic controller 120 to adjust the positioning of one or more nozzles 118 associated with the waterjets 112 continuously over time. In other words, the electronic controller 120 can manipulate the magnitude or direction of one or more thrust vectors 140*a*, 140*b* individually or in combination to create changes in direction of the aircraft.

Figure 9A:
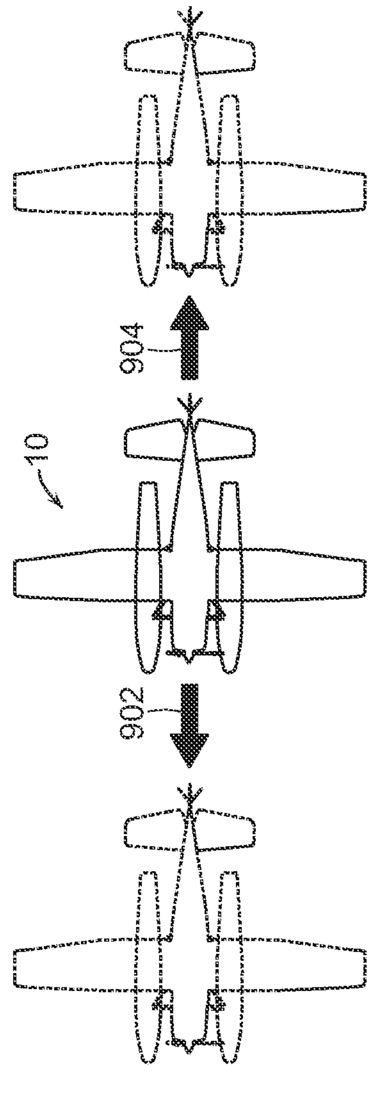
FIG. 9A illustrates a forward-reveres linear motion mode produced by the propulsion system according to some embodiments of the present disclosure.
Figure 9B:
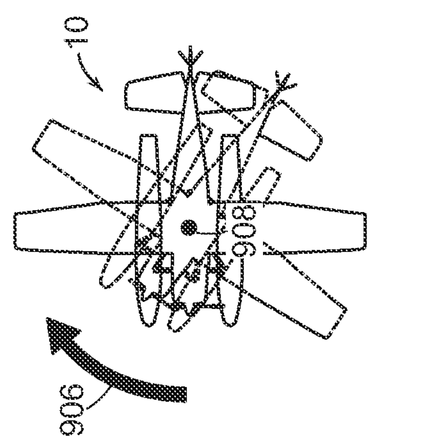
FIG. 9B illustrates an in-place rotation motion mode produced by the propulsion system according to some embodiments of the present disclosure.

The use of two independently controlled waterjets allows various options for the movement of the aircraft on the water as shown in FIGS. 9A-9E. FIG. 9A shows longitudinal motion (i.e., motion along the central axis 25 of the aircraft 10) in forward 902 and backward 904 directions with no rotation around the center of mass of the aircraft 10. FIG. 9B shows the scenario of a turn 906 around the center of mass 908 with no translational movement.

Figure 9E:
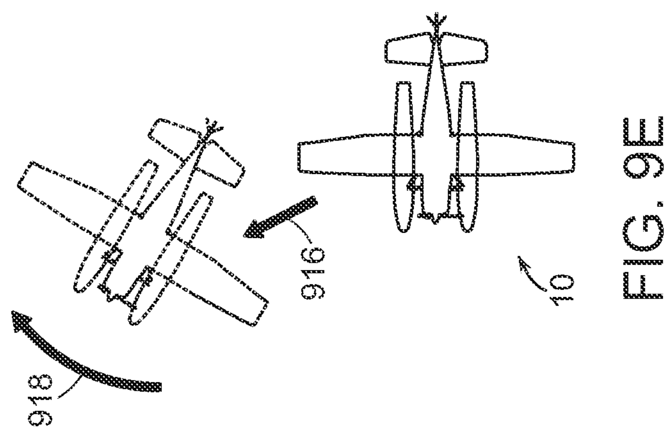
FIG. 9E illustrates a combination of linear motion and rotation produced by the propulsion system according to some embodiments of the present disclosure.
Figure 9D:
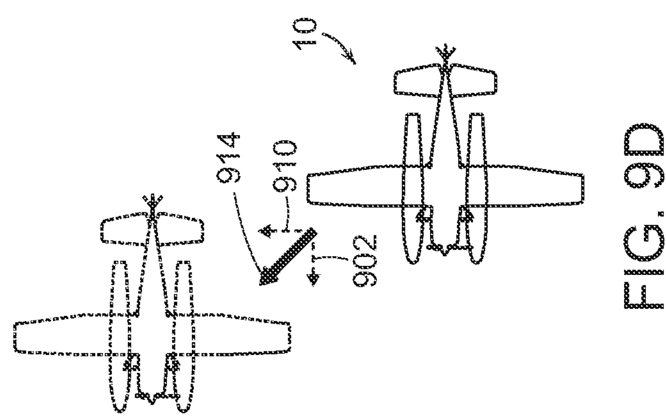
FIG. 9D illustrates linear motion along an arbitrary direction produced by the propulsion system according to some embodiments of the present disclosure.
Figure 9C:
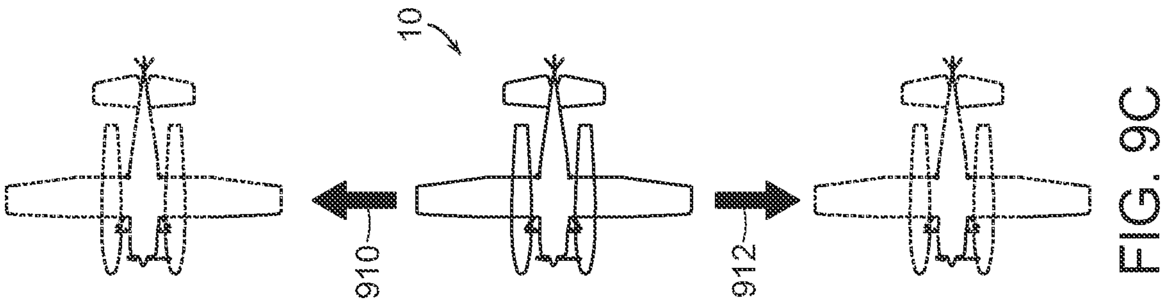
FIG. 9C illustrates a lateral linear motion mode produced by the propulsion system according to some embodiments of the present disclosure.

FIG. 9C shows the scenario of lateral movement (i.e., movement perpendicular to the central axis 25 of the aircraft 10) to the left 912 or right 910 without no motion in the longitudinal direction. FIG. 9D shows the scenario of combined longitudinal and lateral motion. In this case, the water propulsion system 100 is used to move the aircraft 10 in simultaneous forward 902 longitudinal and right 910 lateral directions resulting in a diagonal movement direction 914. FIG. 9E shows a scenario wherein the water propulsion system 100 can maneuver the aircraft 10 in a diagonal direction 916 as shown in FIG. 9D with simultaneous rotation 918.

Figure 10A:
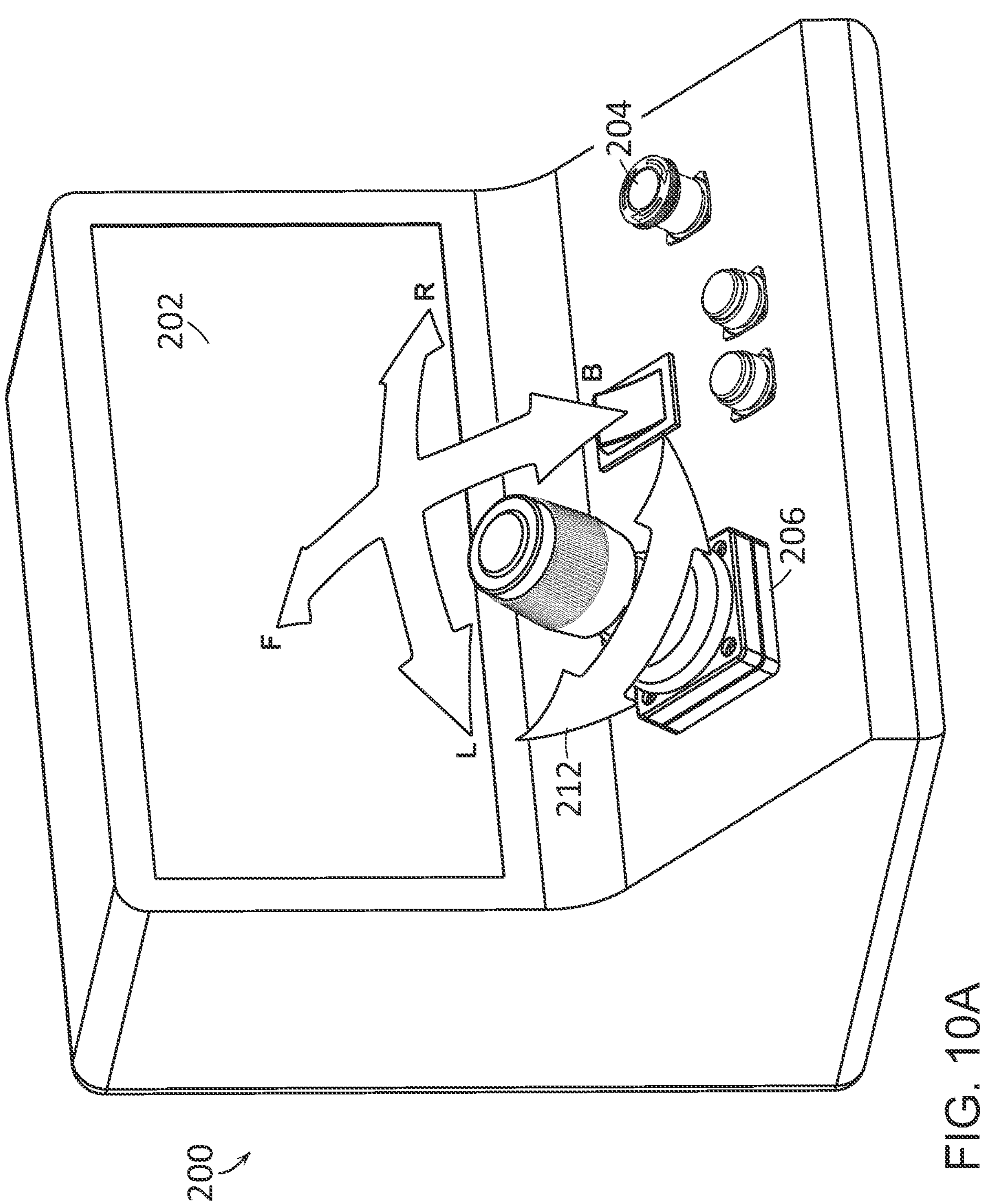
FIG. 10A illustrates a manual control unit for the propulsion system according to some embodiments of the present disclosure.

FIG. 10A shows a manual controller 200 that connects to the electronic controller 120 and enables control of the water propulsion system 100 by the pilot in the cockpit of the aircraft. The manual controller 200 includes a joystick 206 and a display screen 202. The screen 202 can comprise a touchscreen that is responsive to touch gestures applied to the screen surface by a user. A plurality of touch actuated icons or moving gestures applied to the screen surface can be used to enter information or control operations of the aircraft including operation of the water propulsion system. The display screen can be operated using a graphical user interface that can be actuated to select information to be displayed in one or more portions of the screen. The user can actuate the graphical user interface to select a menu for a plurality of display operations. The manual controller can include one or more processors including a touch processor to control touchscreen display operations and a data processor to operate the graphical user interface, to communicate with one or more memory devices and the electronic controller for the water propulsion system. In various embodiments, the manual controller can operate independently of the aircraft flight control system, or can communicate with the aircraft flight control system, or alternatively, one or more components and operations thereof can be integrated into the aircraft flight control system. Such a fully integrated system incorporates control of the water propulsion and energy management control into the aircraft flight control system. The water propulsion system operations and flight control system operations can be configured to collaborate such as, for example, in the takeoff mode where the water propulsion system can assist with takeoff, but would not be used in takeoff mode to steer the aircraft. The flight controls and aircraft cockpit instrument panel used by the pilot to fly the aircraft can include the water propulsion system control and status indicators such as battery power level, motor rpm (rotations per minute), battery charging status, aircraft fuel tank level, airspeed or water speed, heading and altitude, etc. The flight control stick or yoke that controls the ailerons or flight control surfaces can, for example, be switched to control steering of the water propulsion system where sensors that detect motion of the stick or yoke can be actuated to monitor the stick or yoke motion to deliver control signals to the electronic controller. For embodiments in which a pair of water propulsion thrusters are used in takeoff, they can both be locked in the same orientation to be aligned to the direction of flight and set at the same velocity to increase stability during takeoff. The system can be configured to sense when the water propulsion system is no longer aiding in propulsion, such as when the system exits the water, to automatically shut off. An electronic sensor can detect when the speed of water propulsion motor rotation increases due to the loss of water resistance and consequently trigger a switch to shut off power to the electric motor of the water propulsion system. In some embodiments, the manual controller 200 can include other controls such as an emergency shutdown button 204. Activation of the emergency shutdown button 204 can shut off the power supplies to prevent an abnormal or emergency situation in the water propulsion system 100. Additional buttons or display icons can used to turn on/off the system or the remote control operation, or used to select a mode of operation as described herein, or can enable the user to designate a hold position for the aircraft on the water surface or to release the hold position. Given that the aircraft will continue to move on a water surface due to momentum on receipt of the hold instruction, the software subroutine controlling the fine positioning of the can use the motion sensor of the sensed GPS coordinates, or a combination thereof, to identify the hold position and selectively actuate the water propulsion to move the aircraft to the recorded hold position by iteratively operating the water propulsion system and sensing the corrected position until the hold position is achieved. The propulsion system can be periodically actuated at a fixed sensed distance from the hold position to automatically correct for current and/or wind conditions.

The pilot or operator can tilt the joystick 206 in the forward F, backward B, left L, and right R directions or any combination thereof. The joystick 206 can be rotated in a rotation direction 212 around the longitudinal axis clockwise or counterclockwise. The joystick 206 can be moved in the rotation direction 212 simultaneously in combination with tilting with any of the left L, right R, forward F, or backwards B directions. In some embodiments, the amount of angular rotation 212 of the joystick 206 from the neutral position or the degree of tilt (i.e., as a proportion of the maximum possible tilt) can determine the amplitude of the issued command to move. The tilt and rotation movements of the joystick 206 allow the pilot or operator to implement any possible movement of the aircraft on the water. In particular, deflection of the joystick in the For B directions can implement the movement shown in FIG. 9A, rotation of the joystick in the rotation direction 212 can implement the movement scenario shown in FIG. 9B, movement of the joystick in the L or R directions can implement the movement scenario shown in FIG. 9C, combinations of movement in the F, L, B, and R directions can implement the movement scenario shown in FIG. 9D, and combinations of motion in the F, L, B, and R directions and the rotation direction 212 can implement the movement scenario shown in FIG. 9E.

The screen 202 of the manual controller 200 can display status information and other information for benefit of the pilot or operator. Information displayed by the screen 202 can include, but is not limited to, current revolutions per minute of each waterjet 112, an indicator of reverse deflector 117 activation status, battery charge level, status of a battery charging process, status of the batteries received from an internal/external source, failure indicators based upon feedback received from a sensor such as a temperature sensor that can detect overheating of batteries, and current speed or direction of motion. In some embodiments, the manual controller 200 can include digital and/or analog indicators to display parameter values as an alternative to or in addition to the screen 202.

Figures 10B, 10C:
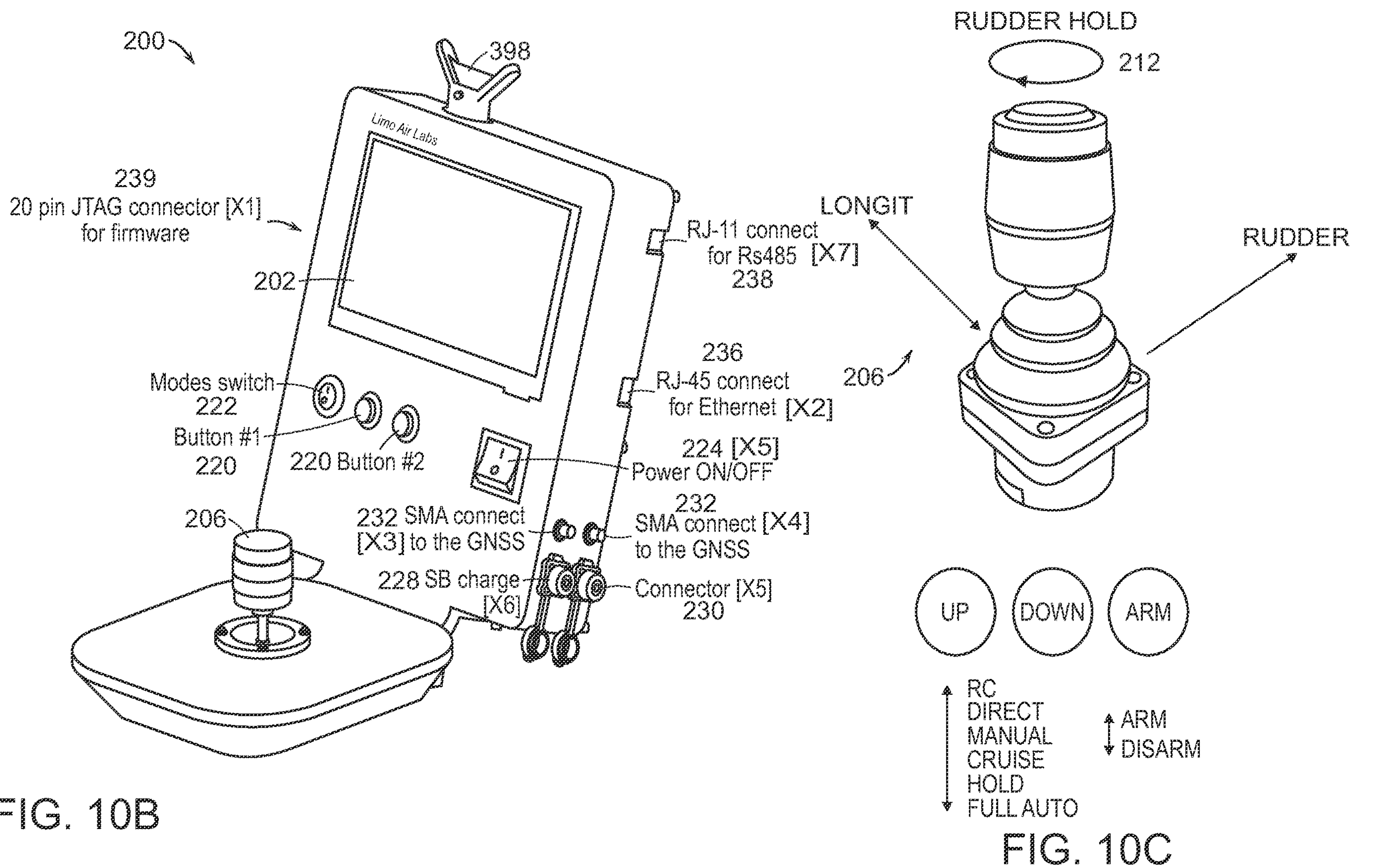
FIG. 10B illustrates an alternative embodiment of the manual control unit for the propulsion system according to some embodiments of the present disclosure.
FIG. 10C illustrates a joystick for manual control in accordance with some embodiments of the present disclosure.

FIG. 10B shows another embodiment of manual controller 200, which is sometimes referred to herein as a control panel. The controller 200 is a complete instrument that is designed for convenient and compact placement of controls and information display. The controller 200 can receive and transmit control commands from the operator to the PCS 350. The controller 200 can also display telemetric information and parameters from the PCS 350 for monitoring the operation of seaplane systems in a form convenient for the perception of the operator. The controller 200 can be constructed of body elements made using additive technologies, fasteners and/or electrical connectors.

The display 202 can be a 7-inch capacitive touch liquid crystal display (LCD) or other electronic display to display the information necessary for the operator to properly operate the seaplane and to quickly identify errors. Additional buttons 220 (e.g., PBS26B) and switches 222 (e.g., MIRS-101A-8C3) can be provided as input devices and are designed to change the settings of the control system, select control modes and change the type of information displayed on the display. Schematically, in the unpressed state, the button 220 is pulled up through a resistor to a stabilized voltage level of 3.3 V and generates a 3.3 V signal. When pressed, the button is short-circuited to ground (0 V). The switch 222 is similarly implemented. In the off position, the switch generates a signal of 3.3 V whereas the switch generates a signal of 0 V in the on position. The power switch 224 (e.g., KCD2-302-9P) can operate three channels and simultaneously performs three functions: power switching of the controller 200; generating a signal for a battery management system (BMS) 302 of the left float to switch the power supply of the left float; and signal generation for the BMS 302 of the right float to switch the power supply of the right float. In the off position, the switch 224 can open the 12 V voltage line at the output of the BMS of the control panel on the first channel, and also closes the output contacts on the second and third channels to the float ground, thereby generating signals with a level of 0 V for the BMS in each floats. In the on position, the 12 V line on the first channel is closed, and on the second and third channels, the output contacts are in the open drain position.

The joystick 206 (e.g., OM300B-M1 from Omter Group Ltd (Omter TYXN), China) is an input device designed to change the magnitude and direction of thrust of the propulsion system by the operator. The joystick 206 can have three independent control channels around three orthogonal axes X, Y and Z as shown in FIG. 10C. For each channel there is a variable resistor with a total resistance of 5 kOhm (5.6 kOhm for the Z-axis), connected as a potentiometer to a stabilized voltage of 3.3 V. The resistance values of the potentiometer and the voltage on output depending on joystick stick deflection are measured to determine the user's commands. The axes can correspond to different combinations of directions or commands such as x-axis: longitude, y-axis: rudder, rotation axis 212: rudder hold.

In various embodiments, the controller 200 can also include a 20 pin JTAG connector [X1] 239 for firmware updates that connects to a flat cable, an antenna 396 to receive and transmit remote control commands, an RJ-11 connector [X7] for RS-485 bus 238, an RJ-45 connector [X2] 236 for Ethernet, one or more SMA connectors [X3, X4] 232 leading to one or more Global Navigation Satellite System (GNSS) antennas, an SB charge connector [X6] 228, and connectors [X5] 230 leading to the floats. Hardware described below including the system control unit 382 can be housed within the controller 200.

Figure 11:
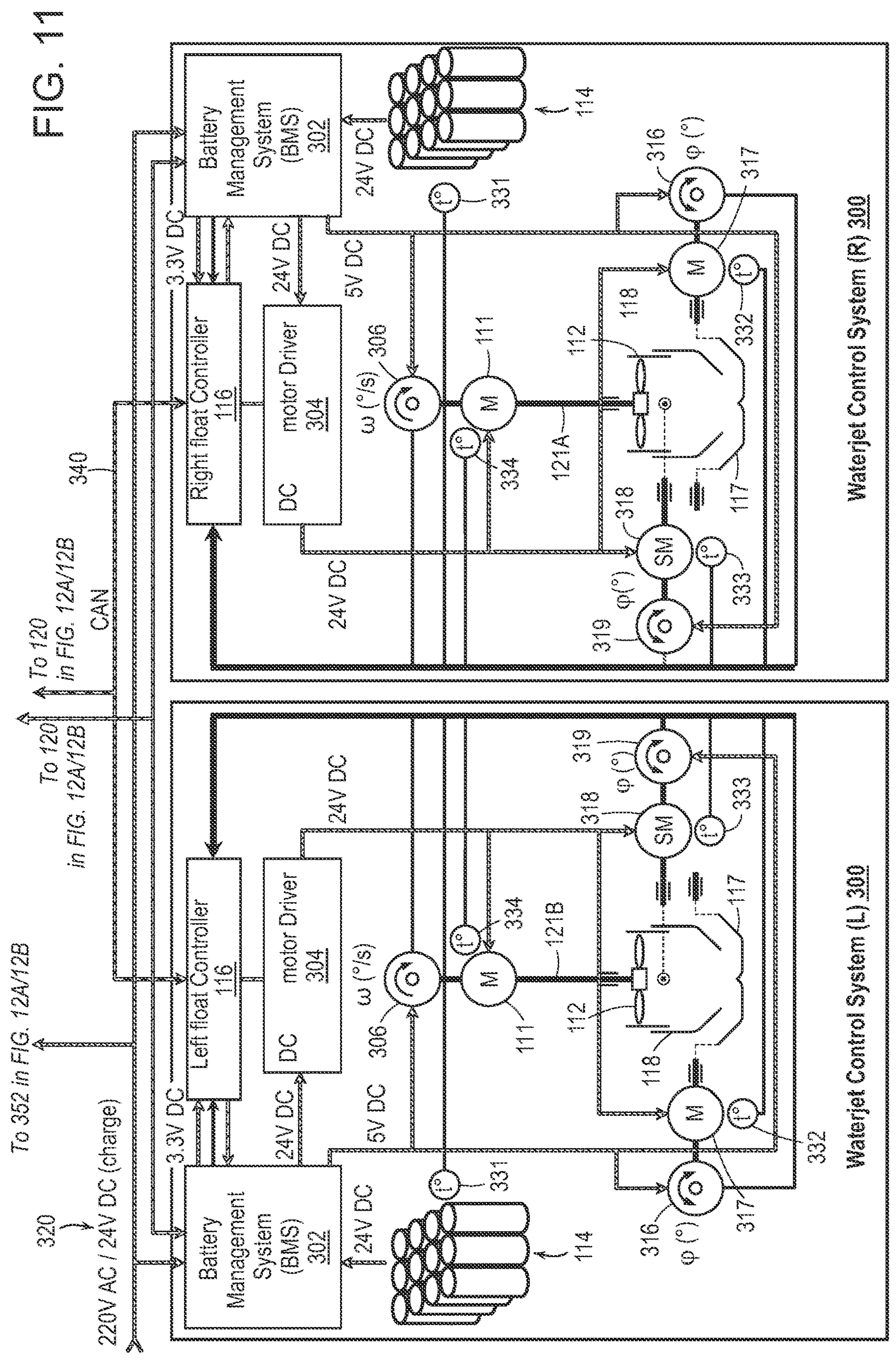
FIG. 11 schematically illustrates a waterjet control system of the water propulsion system according to some embodiments of the present disclosure.

In some embodiments, the water propulsion system 100 can be implemented as one or more separate waterjet control systems (WCS) 300 connected to a main propulsion control system 350. FIG. 11 illustrates example left and right waterjet control systems 300 suitable for use in certain embodiments of the present disclosure. The waterjet control system 300 can include the motor controller 116, the batteries 114, and a battery management system (BMS) 302. The waterjet control system can also include the water propulsion device 110 having the electric motor 111, waterjet 112, nozzle 118, and reverse deflector 117. Each motor 11 is connected to an impeller with a respective rod or drive shaft 121A, 121B. A stator can be positioned adjacent each impellor to limit turbulence. The system 300 includes an encoder 306 and a DC motor driver 304 to control the electric motor 111. The system 300 includes motor 317 and encoder 316 to control the reverse deflector 117. The system 300 includes a linear motor 318 and an encoder 319 to control the nozzle 118. Sensors 331, 332, 333, 334 can provide feedback as to physical characteristics of components of the system such as temperature to prevent overheating. An external power source 320 can provide power to the BMS 302 for recharging batteries 114. A bidirectional communications network 340 such as a controller area network (CAN) bus connects the controllers 116 for each waterjet control system 300 to the electronic controller 120. A waterjet control system 300 can be located within each float 14*a*, 14*b* of the aircraft in some embodiments or can be used in a monohull seaplane design having a single flotation surface.

The BMS 302 monitors and manages battery health and capacity. The BMS 302 can receive power from the power source 320 such as an onboard generator of the aircraft (or an external power supply to enable charging of the batteries 114. During operation, the BMS 302 provides power from the batteries 114 to components of the waterjet control system 300 including the motor driver 304 and encoders 306, 316, 319. The BMS 302 provides control of the discharge, charge and balancing of the battery or batteries 114, protects against short circuits, and outputs stabilized power lines. For example, the power line can power the manual controller 200, the electronic controller 120, and the motor controller 116, the power line can power the encoder 306, 316, 319 commutation, and the higher voltage line can power the DC motor driver 304 that then controls the motors 111, 317, 318. In some embodiments, the batteries 114 are lithium ion batteries. In some embodiments, the BMS 302 can include a HY2120-CB Li-ion battery protection integrated chip (Hycon Technology, Taipei, Taiwan) and a HY2213-BB3A Li-ion battery integrated balancing chip (Hycon Technology, Taipei, Taiwan) or other equivalent circuit devices. The BMS 302 can collect and transmit telemetry information from current and voltage sensors related to the electronic controller 120 or the motor controller 116.

The rotary outlet nozzle 118 can be driven by the geared stepper motor 318 in some embodiments. The reverse deflector 117 can be driven by the geared stepper motor 317 in some embodiments. In other embodiments, the nozzle 118 and deflector 117 are driven by linear actuators that do not involve stepper motors. The encoder 316 can be installed on the motor 317 to determine the angular position of the reverse deflector 117. The encoder 319 can be installed on the motor 318 to determine the angular position of the rotary outlet nozzle 118. The encoder 306 is installed on the electric motor 111 to determine the angular rotation speed of the waterjet turbine.

The DC motor driver 304 controls the supply of power to windings of the motors 317, 318 and the DC motor 111 based upon telecommands received from the electronic controller 120.

The sensor 334 is installed on the electric motor 111 to detect physical parameters of the electric motor 111 such as temperature. The sensor 333 is installed on the motor 318 to detect physical parameters of the motor 318 such as temperature. The sensor 332 is installed on the motor 317 to detect physical parameters of the motor 317 such as temperature. The sensor 331 is installed on the batteries 114 to detect physical parameters of the batteries 114 such as temperature. Each sensor is connected to the motor controller 116 to provide feedback on the status of its respective motor or battery. Signals from the sensors 331, 332, 333, 334, such as signals corresponding to a temperature, can help the controller 116 detect errors in motor or battery operation or detect overheating conditions, which enable controlled shutdown before heat can cause damage or injury to the component. In some embodiments, the sensors 331, 332, 333, 334 are connected directly through a wired or wireless connection to the electronic controller 120.

In some embodiments, the controller 116 can include a microcontroller such as a STM32F405 chip (STMicroelectronics SA), for example. In some embodiments, the controller 116 can include a microcontroller or microchip with Wi-Fi or Bluetooth® connectivity such as the ESP32 MCU (Espressif Systems (Shanghai) Co., Ltd.). The controller 116 of the waterjet control system 300 can collect and process telemetric information from the encoders, 306, 316, 319, the thermal sensors 331, 332, 333, 334, and current and voltage sensors associated with the BMS 302. The controller 116 can send raw or processed telemetry data related to the current state of components of the waterjet control system 300 to the electronic controller 120. The controller 116 can receive and execute control commands from the electronic controller 120. The controller 116 can issue control commands to the DC/Step motor driver 304, which can then relay those commands to the motors 111, 317, 318. The controller 116 can prevent overheating of the batteries 114 by determining an overheating condition based on signals received from the sensor 331.

Figure 12A:
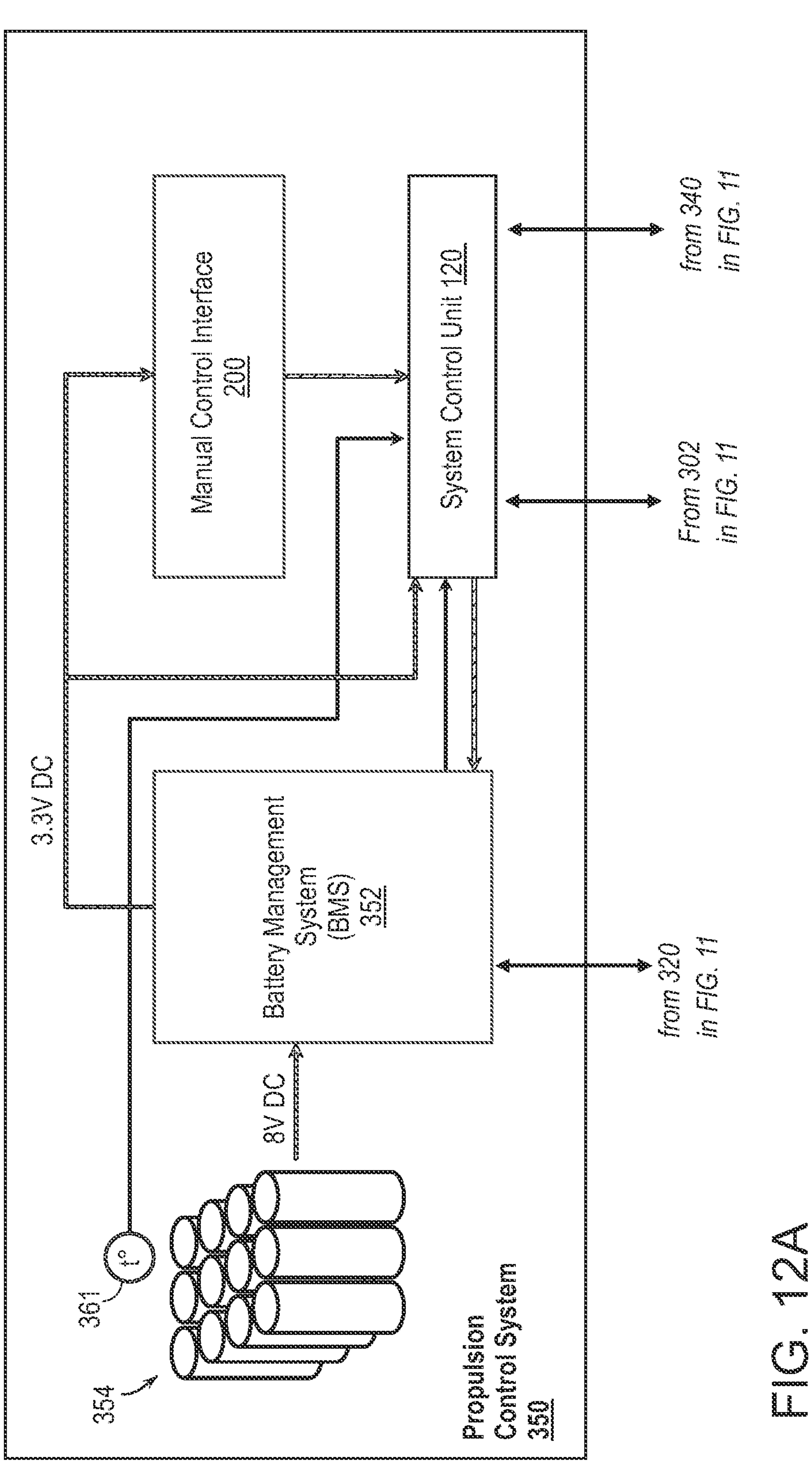
FIG. 12A schematically illustrates an embodiment of a control system of the water propulsion system according to some embodiments of the present disclosure.

FIG. 12A illustrates an example propulsion control system (PCS) 350 that interfaces with one or more waterjet control systems 300 in some embodiments of this disclosure. The Propulsion Control System is a set of hardware with information and mathematical support and is designed to solve the problems of controlling the movement of a seaplane on the water due to the thrust created by waterjets. The PCS 350 includes a battery management system (BMS) 352, the manual controller 200, and the electronic controller 120 (referred to in some embodiments herein as a system control unit (SCU) or control unit). The PCS 350 of the water propulsion system 100 is designed to transmit telecommands and to distribute power to the executive equipment of the propulsion system (e.g., waterjets 112, electric motors 111, reverse deflectors 117, etc.) and to control the propulsion subsystems such as the waterjet control systems 300 through telemetry. In some embodiments, operation of the PCS 350 is based on the electronic controller 120 (e.g., a microcontroller) receiving commands from the manual controller (200) such as a manual control interface (MCI). The electronic controller 120 generates telecommands for components of the WCS 300 taking into account available telemetry information about the current state of components in the WCS 300.

The SCU 120 can perform all of the following functions: management of procedures for turning on (activating) and turning off (deactivating) the equipment of the seaplane; interpretation of control commands coming from MCI 200 and, in certain driving modes, from automated control software; receiving data from the navigation unit in terms of current values of speeds and accelerations in the directions of movement (in the coordinate system associated with the aircraft) and actual positioning data, speed and direction of movement (in the coordinate system associated with the ground); testing the selected motion mode, as well as real-time changes in motion modes—by converting the results of interpretation of the received commands and data into commands that set the operating modes of the actuators located in the floats (this takes into account the current state and position of the seaplane, as well as the general condition of the equipment); receiving and processing telemetric information coming from the WCS 300; formation of a stream of telemetric information in real time for its subsequent processing, recording to an external medium and analysis by the operator; determination of the status of the seaplane's equipment, including identification of accidents and pre-emergency situations; and generation of data for transmission to MCI 200. The SCU 120 can include a microcontroller such STM32F746ZGT6 by ST Microsystems.

In some embodiments, the PCS 350 can receive commands from a user at the manual controller 200, for example, as described above in relation to FIG. 11. The PCS 350 can collect telemetric information from the components of the PCS 350 or WCS 300 and this information can be displayed to the user. The PCS 350 can control switching and power control of the components of the propulsion system. The PCS 350 can control formation of the telecommands to transmit to the WCS 300. The PCS 500 can prevent overheating of battery cells 354.

The BMS 352 of the PCS 350 can control charging and discharging of the batteries 354 and balancing among batteries 354. The BMS 352 can provide protection against short circuits. The BMS 352 can receive power from the external source 320 to perform charging of the batteries 354 or the batteries can be charged using an aircraft alternator connected to the aircraft engine during flight. In operation, the BMS 352 can receive power from the batteries 354 and can form stabilized power supply buses for supply to other components of the PCS 350. In some embodiments, the BMS 352 forms one or, optionally, two stabilized 3.3 V and/or 5 V power lines. The stabilized power lines are connected to the manual controller 200 and the electronic controller 120.

In some embodiments, the PCS 350 is located inside the aircraft fuselage 12. The electronic controller 120 can include a microcontroller such as a STM32F405 chip (STMicroelectronics SA) in some embodiments. In some embodiments, the electronic controller 120 can include a microcontroller or microchip with Wi-Fi or Bluetooth® connectivity such as the ESP32 MCU (Espressif Systems (Shanghai) Co., Ltd.). The electronic controller 120 can also send and receive telemetry data to the BMS 302 of the WCS 300. There are circumstances where higher speed signal processing are necessary, such as the use of water propulsion to obtain higher speeds during takeoff, where a field programmable gate array (FPGA) or an application specific integrated circuit (ASIC) to provide one or more signal/data processor functions in certain preferred embodiments.

Telemetry and telecommand exchange between the propulsion systems (PCS and WCS) is carried out via the controller area network (CAN) bus (or via another bus protocol, Wi-Fi or Bluetooth wireless network). For example, the electronic controller 120 can send and receive commands to the controllers 116 of the WCS 300 using the CAN bus 340.

The PCS 350 can include a sensor 361 attached to the batteries 354 to detect a physical parameter of the batteries 361 such as a temperature. Output from the sensor 361 to the electronic controller 120 can help the controller 120 stop operation to prevent overheating of the batteries 354. The level of charge can also be continuously monitored as indicated on an instrument panel gauge or display.

Figure 12B:
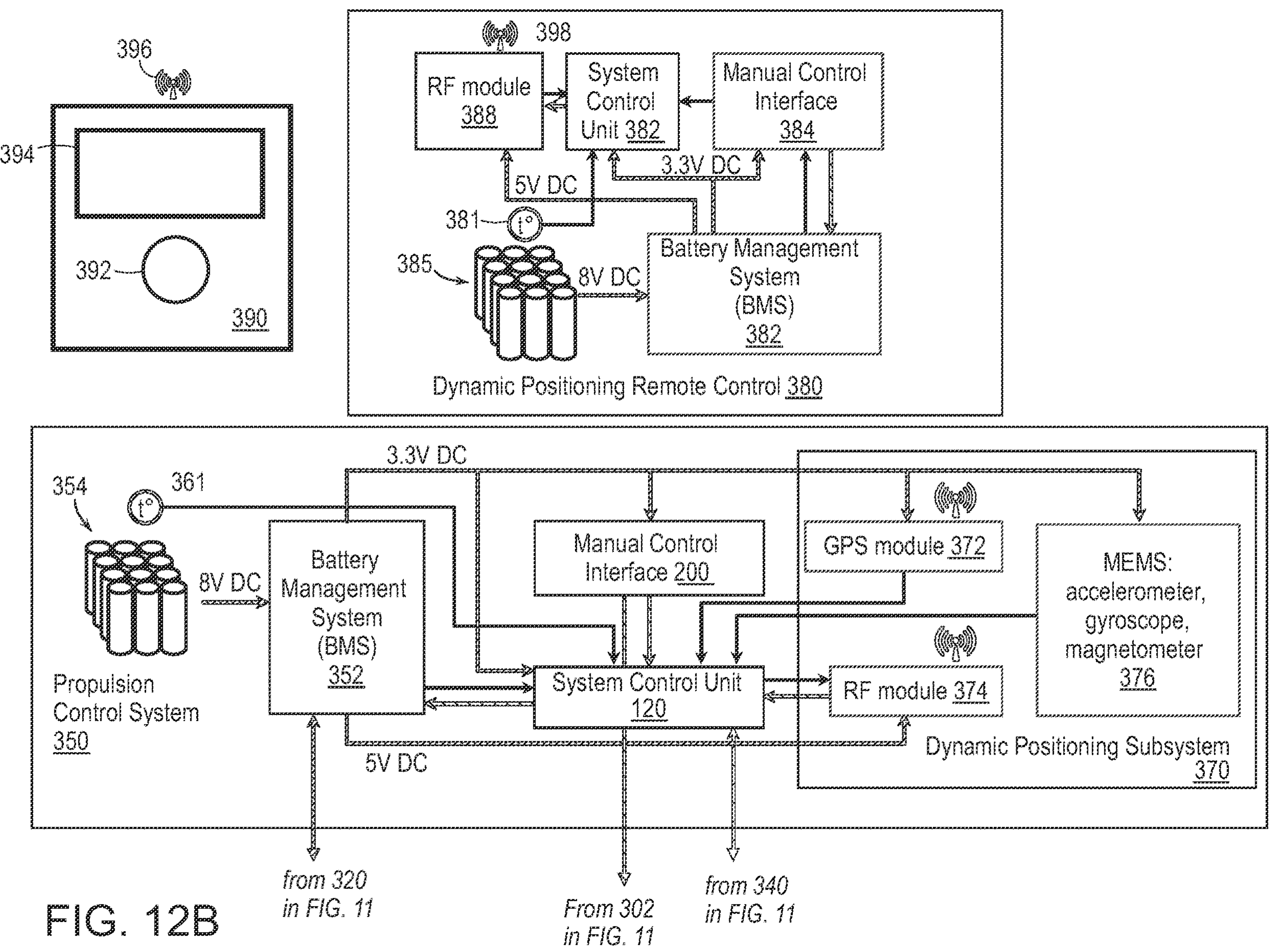
FIG. 12B schematically illustrates an embodiment of a control system of the water propulsion system and a remote control system according to some embodiments of the present disclosure.

FIG. 12B illustrates an example embodiment of a PCS 350 including a dynamic positioning subsystem (DPS) 370 that can optionally interface with a dynamic positioning remote control (DPRC) 380. The DPS 370 includes a global positioning system (GPS) module 372, an RF communication module 374, and one or more sensors 376. The DPS 370 can enable active stabilization of aircraft position on the water surface by measuring the aircraft's position and activating the water propulsion devices 110 to autonomously counteract drift of the position arising from currents, wind, or other forces. Note that the aircraft can optionally be equipped with an anchor that can be raised and lowered remotely if conditions require anchoring of the aircraft to maintain its position. In some embodiments, the DPS 370 can receive commands from the DPRC 380. In some embodiments, the DPS 370 can provide autonomous (i.e., without operator participation) positioning and movement of the aircraft on the water surface.

Figure 37:
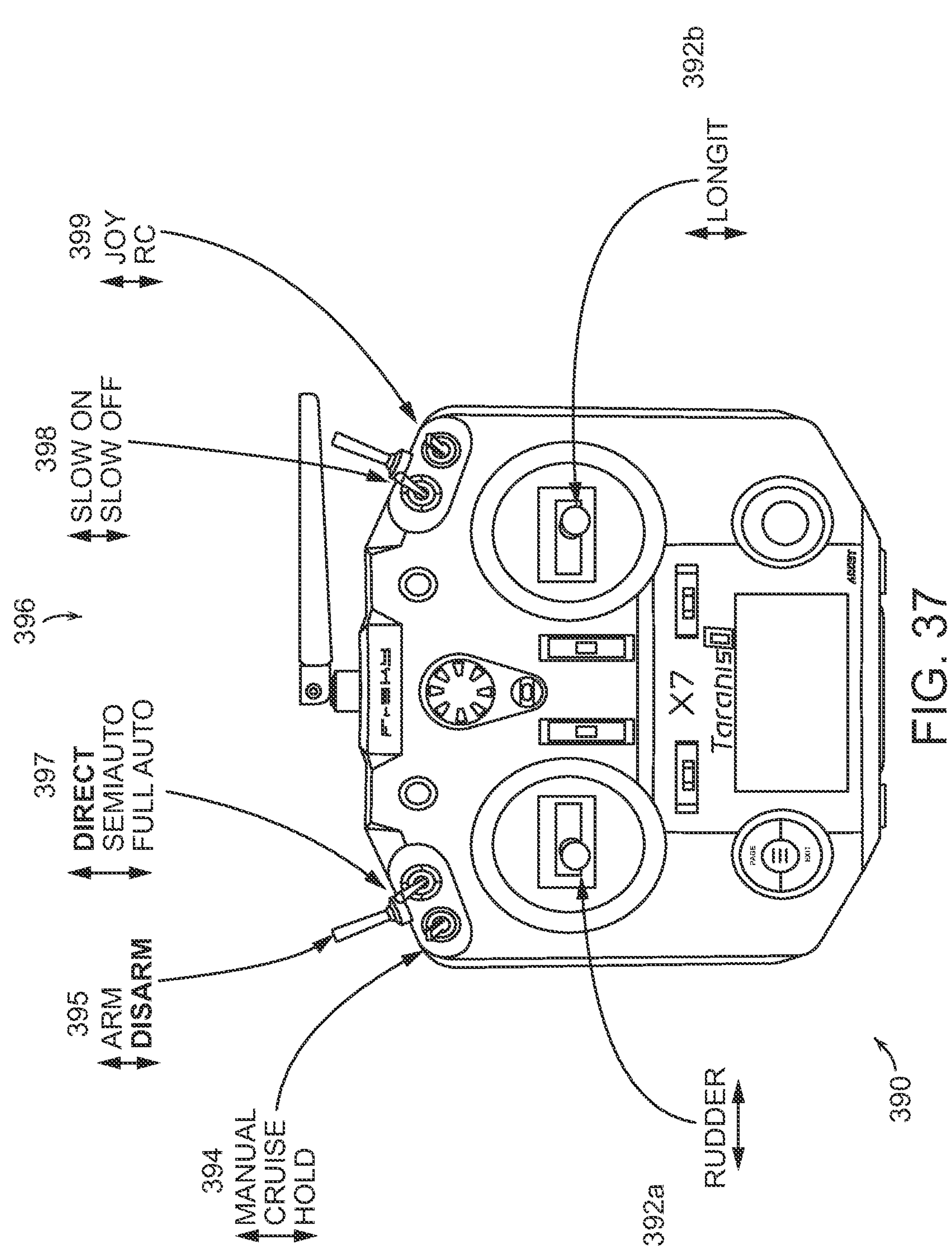
FIG. 37 illustrates an example dynamic positioning remote control (DPRC) in accordance with some embodiments herein.

FIG. 37 illustrates the DPRC 380 in accordance with some embodiments herein. The DPRC 380 can include one or more joysticks **392*a*, 392*b*, one or more switches 394, 395, 397, 398, 399, and an antenna 396. In one embodiment, a first joystick 392*a* can control rudder motion while a second joystick 392*b* can control longitudinal motion. An arming switch 395 can toggle the readiness state of the SCU 120 or the ACSW between armed and disarmed. A mode selection switch 394 can toggle the motion control states of the system between manual, cruise, and hold. A mode selection switch 397 can toggle the motion assistance state of the system between direct control, semi-automatic control, and fully automatic control. A speed switch 398 can toggle the system between slow on and slow off. An operator selector switch 399 can toggle control functions between the DPRC 380** (RC mode) and the cockpit controls (joystick).

When the PCS 350 is under control of the automated control software of the DPS 370, the following tasks are solved: control of systems of the seaplane based on algorithms that implement the transfer of commands and control actions from MCI 200 controls and monitoring and diagnostic algorithms; collection of telemetry information about the state of the systems of the seaplane; transmission to MCI 200 of information about the execution of modes, calculated values of control parameters, and diagnostic information; and control of systems of the seaplane based on algorithms that process information and commands from devices of the Dynamic Positioning System 370.

The GPS module 372 is used by the DPS 370 to determine the aircraft's location. The GPS module 372 can receive power from the BMS 354 and provides location data to the electronic controller 120. In some embodiments, the GPS module 372 can include a NEO-6M, NEO-7M, or NEO-8M module (U-blox AG), for example. The one or more sensors 376 can also receive power from the BMS 354 and provide telemetry data to the electronic controller 120. The one or more sensors 376 can include three-axis MEMS accelerometers, gyroscopes, or magnetometers that send signals to the controller 120 to enable the controller 120 to determine the aircraft's orientation or motion in space. The sensor 376 can include a MEMS LSM6DS3 or LIS3MDL (STMicroelectronics SA) in some embodiments, for example.

In some embodiments, the DPS 370 interfaces directly with the manual controller 200 and does not utilize remote control. In other embodiments, the DPS 370 can communicate with the DPRC 380. The DPS 370 can include a radio (RF) module 374 to facilitate wireless communication of commands and/or telemetry data between the DPS 370 and the DPRC 380. The RF module 374 can receive stabilized 5

V power from the BMS 354. In some embodiments, the RF module 374 can include an E22-400T30S chip (Chengdu Ebyte Electronic Technology Col, Ltd.), for example.

The DPRC 380 can include batteries 385, a sensor 381, an RF module 388, a system control unit 382, a manual control interface 384, and a battery management system (BMS) 382. The manual control interface 384 sends and receives commands and telemetry data to the BMS 386 and system control unit 382. The BMS 386 provides stabilized power at 3.3 V or 5 V to the manual control interface 384, system control unit 382, and RF module 388. The sensor 381 measures physical parameters (such as temperature) of the batteries 385 and sends telemetry data to the system control unit 382, for example, to avoid overheating. The RF module 388 can communicate with the RF module 372 of the DPS 370. A user controlling the manual control interface 384 of the DPRC 380 can generate motion commands that are transmitted from the DPRC 380 to the DPS 370 and implemented by the electronic controller 120. The system control unit 382 can include a STM32F103 microcontroller (STMicroelectronics SA or equivalents), for example, to convert the control signals of the manual control interface 384 into digital control commands and transmit them via the radio module 388 to the electronic controller 120. The DPRC 380 can optionally communicate by wireless transmission via antenna 398 with a hand portable remote controller 390 that can be used to remotely operate the aircraft water propulsion system. The remote controller 390 can include an antenna and a display 394 that serves to display information regarding the operation of the water propulsion system and the location of the aircraft in response to remote control operation. The remote controller 390 can be implemented as a mobile phone or tablet display device wherein operating software can be downloaded onto a commercially available device that communicates via a public access communications network such as a web based application. The device 390 can include a touchpad or other manually operated controller 392 to directly control movement of the aircraft on the water or remotely set or adjust operating parameters of the aircraft and/or water propulsion system. The display 394 can present information such as the level of battery charge or fuel level in the aircraft engine fuel tank. The amount and direction of thrust from the propulsion elements in each float can also be presented for viewing by the user. The DPRC manual interface 384 can comprise manual controller such as a hand operated control stick such as illustrated and described in connection with FIG. 10. The DPRC can optionally be connected to a camera that monitors the area surrounding and including the aircraft so the user can watch the movement of the aircraft relative to a dock or shoreline or other obstruction that the aircraft is moving towards, around or away from, depending upon the circumstances. The handheld controller 390 can be implemented via handheld tablet wireless communication device or a handheld cellular telephone that can also directly communicate with RF module 374 to send commands to controller 120 and to receive acknowledgement of such commands in addition to data concerning the movement of the aircraft. The remote controller 390 and/or system control unit 382 can thus include a data processor, a user interface such as a touchscreen display, a memory for storing instructions to be executed by the data processor to control operations of the water propulsion system as described herein.

Shown in FIG. 13 that illustrates an exemplary process flow sequence 400 for operating an aircraft water propulsion system as generally described herein. The water propulsion system operates in response to an electronic controller, which in preferred embodiments, can execute instructions to operate in different operating modes in accordance with programmable instructions 402. By selecting different operating modes, the water propulsion system can assist with takeoff or perform other maneuvers 404 on a water surface as described herein. In further embodiments, the system can be operated by remote control 406 to perform unmanned operations including remotely controlled flight or transport across a water surface on which the aircraft floats. A remote controller can be used to remotely actuate the electronic controller to operate 408 the water propulsion system.

Figure 14:
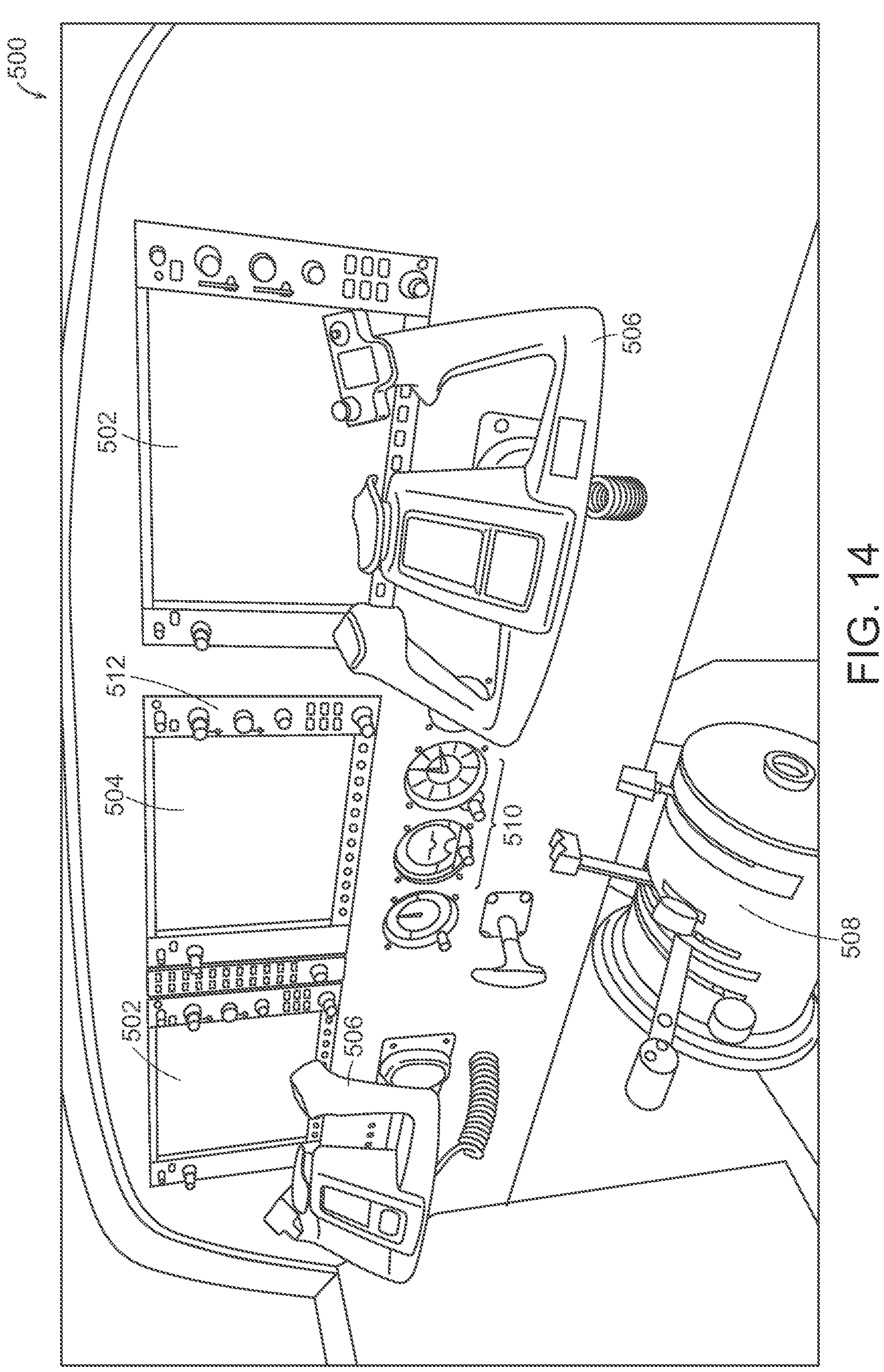
FIG. 14 is a schematic diagram of an aircraft cockpit instrument panel and flight control systems for operation of embodiments of aircraft utilizing a water propulsion system.

In an exemplary piloted aircraft, FIG. 14 illustrates the instrument panel and flight control systems 500 in a seaplane as generally described herein. In this exemplary embodiment, flight controls for a pilot and copilot can be employed where each has a primary flight display 502 and can view and operate the central multi-function display 504 which can be programmed to display operation of the water propulsion system, the status of battery power available for operation of this system as well as the functional status and operation of other aircraft systems. Display controls 512 enable the user to select between water propulsion system operation and standard flight operation functions. A pair of flight controls 506 operated by the pilot or copilot to manipulate flight control surfaces, engine operation controls 508 as well as gauges 510 to indicate airspeed, altitude, fuel level, etc. When not in flight, the controls 506 can also be configured to operate the water propulsion system in which sensors can be used to measure position and movement of the controls wherein the sensed signals are communicated to the electronic controller to cause the water propulsion system to increase or decrease speed on the water surface and/or to cause a change in the direction of movement as described generally herein. Alternatively, the controls 508 can include manually operated control levers to operate each of the water propulsion units. The aircraft can have one or more computers that each control one or more aircraft system operations. In further embodiments, at least one aircraft computer, such as the computer connected to the multi-function display 504, can be connected to the electronic controller 120 of the water propulsion system. In one embodiment, an aircraft computer can comprise the system controller 120 as described in connection with FIG. 12B, for example, wherein the controller 120 is programmed to control both manned and unmanned operations of the aircraft, including remote control of the water propulsion system.

Table 1 below illustrates the mass allotment for components of an example water propulsion system 100 flight for an exemplary system:

TABLE 1

Mass allotment for components of the water propulsion system.

| # | Name | Mass, kg (pcs) | Pcs | Total, kg |
|---|---|---|---|---|
| 1 | Waterjet | 35.0 | 2 | 70.0 |
| 2 | Electric motor | 14.0 | 2 | 28.0 |
| 3 | Storage batteries | 7.0 | 2 | 14.0 |
| 4 | Electric motor controller | 2.5 | 2 | 5.0 |
| 5 | Main control system | 5.0 | 1 | 5.0 |
| 6 | Remote control unit | 0.1 | 1 | 0.1 |
| 7 | Cables | 10 | 1 | 10.0 |
| | Total mass | | | 132.1 |

FIGS. 15-19 illustrate example graphical informational display windows 700 presented to a user on a display 202 according to some embodiments of the present disclosure. The display window 700 can include one or more graphical display areas 701*a*-701*e* that present status information to the user. The status information can be updated in real time. A first graphical display area 701*a* can include control panel status 702 such as the control panel battery status or up-time; remote control connection status 704; and the current (or active) control mode 706. A second graphical display area 701*b* can include the current coordinates 730 of the seaplane such as by latitude and longitude or by using alternative geocode systems such as what3words. The second display area 701*b* can also include target coordinates 728, which may be used in remote control or automated control modes. A third graphical display area 701*c* can include an error field 726 that displays error codes or error descriptions when the system is not functioning properly.

A fourth graphical user area 701*d* can include the movement speed 712. In some embodiments, the user can select the units of the movement speed 712 display including, but not limited to, miles per hour, kilometers per hour, or knots. The fifth graphical user area 701*e* can include graphical information related to direction, heading, and motion of the seaplane. For example, an arrow 710 can show direction and magnitude of the desired movement relative to the position of the joystick 206 controlled by the operator. Other indicators proximate to the arrow 710 can include an indicator 720 of applied forces from the external environment (such as wind or water current flow) and a compass direction 708 indicator that shows, for example, current heading or north direction. Each float can have a respective float status field 714 that includes a waterjet flow direction and magnitude indicator 716, a motor speed indicator 718 (such as in RPMs), a float battery status indicator 724, and a CAN connection status indicator 724.

Figure 15:
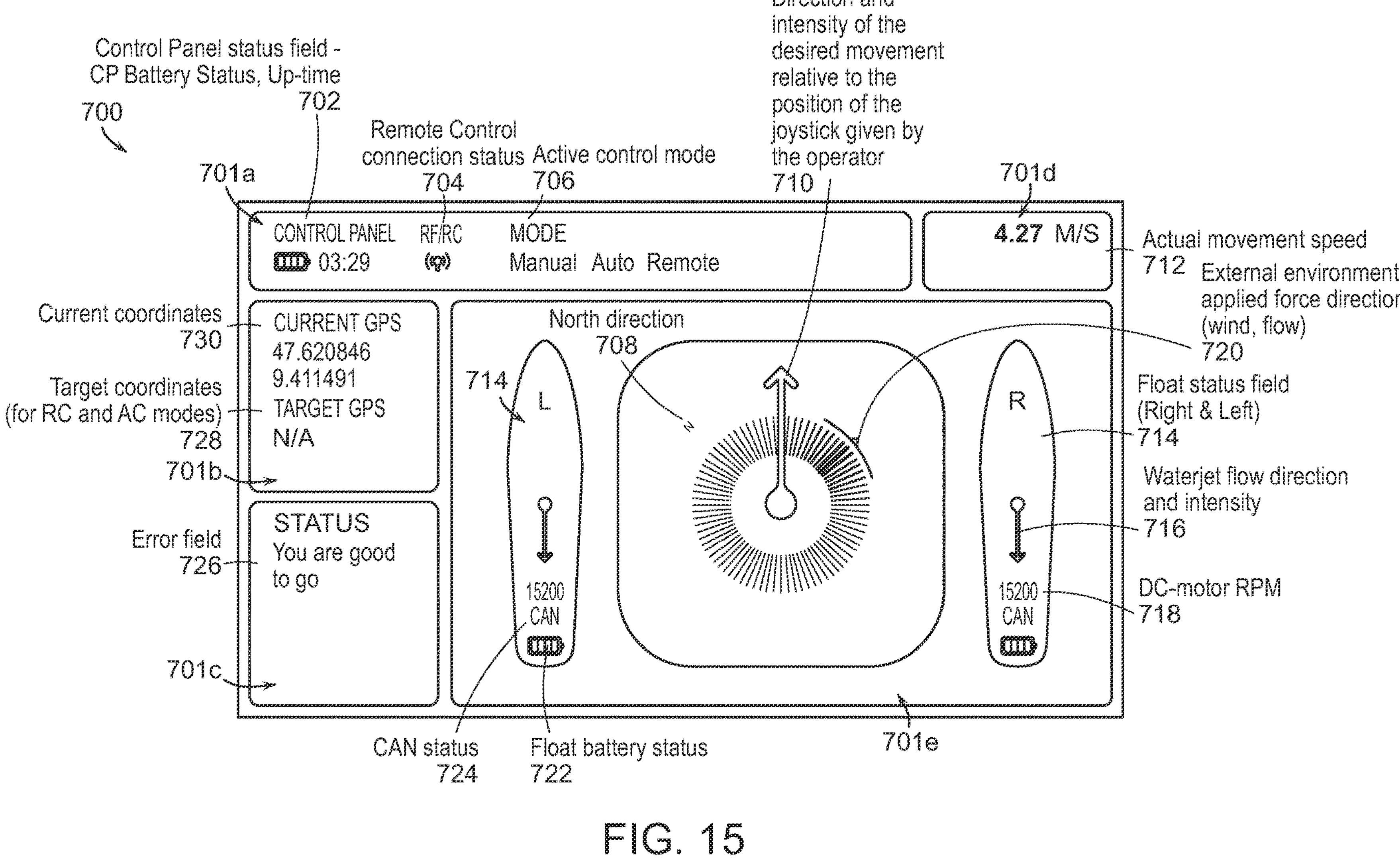
FIGS. 15-19 illustrate example graphical informational display windows 700 presented to a user on a display 202 according to some embodiments of the present disclosure.
Figure 16:
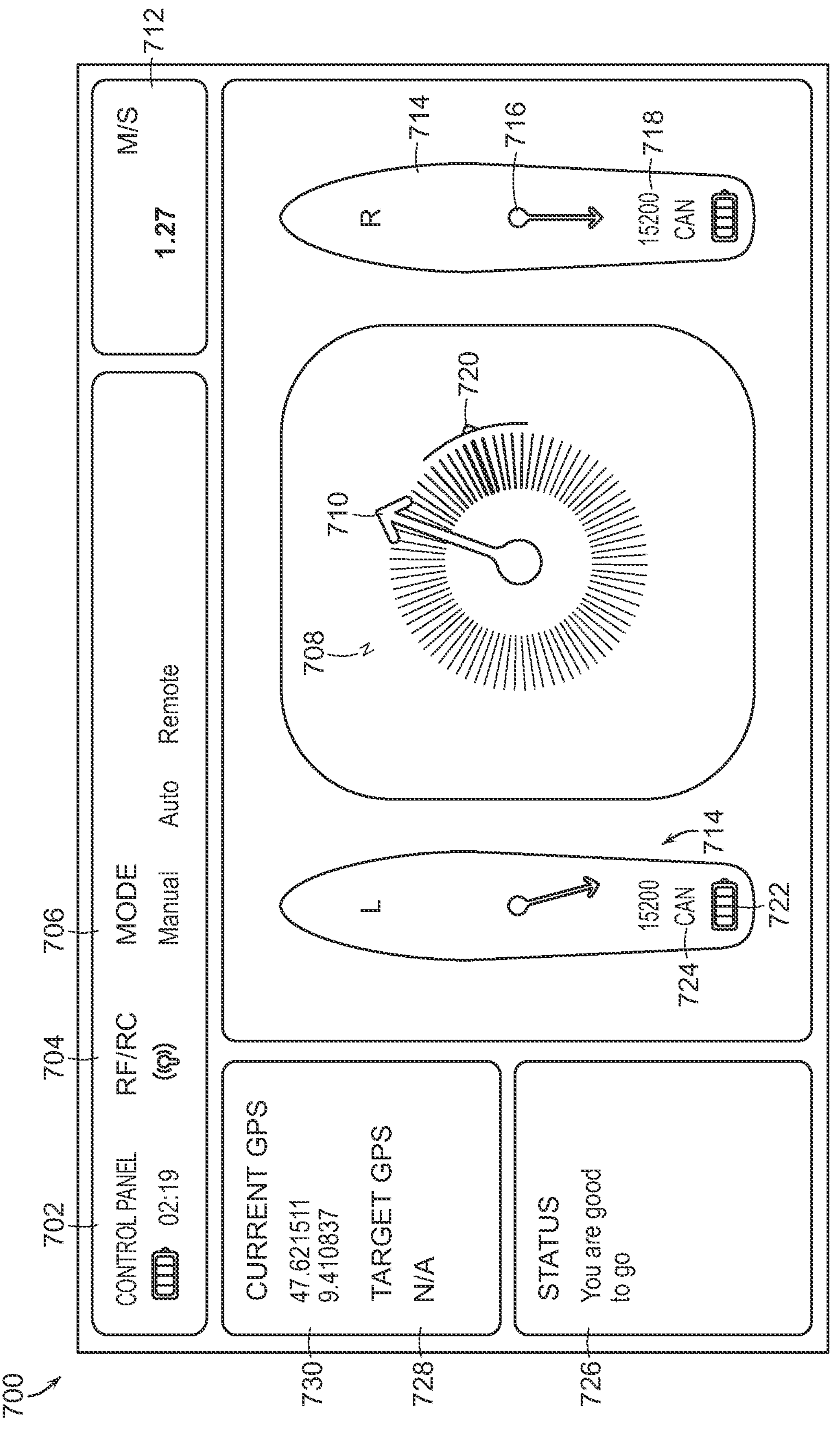
Figure 17:
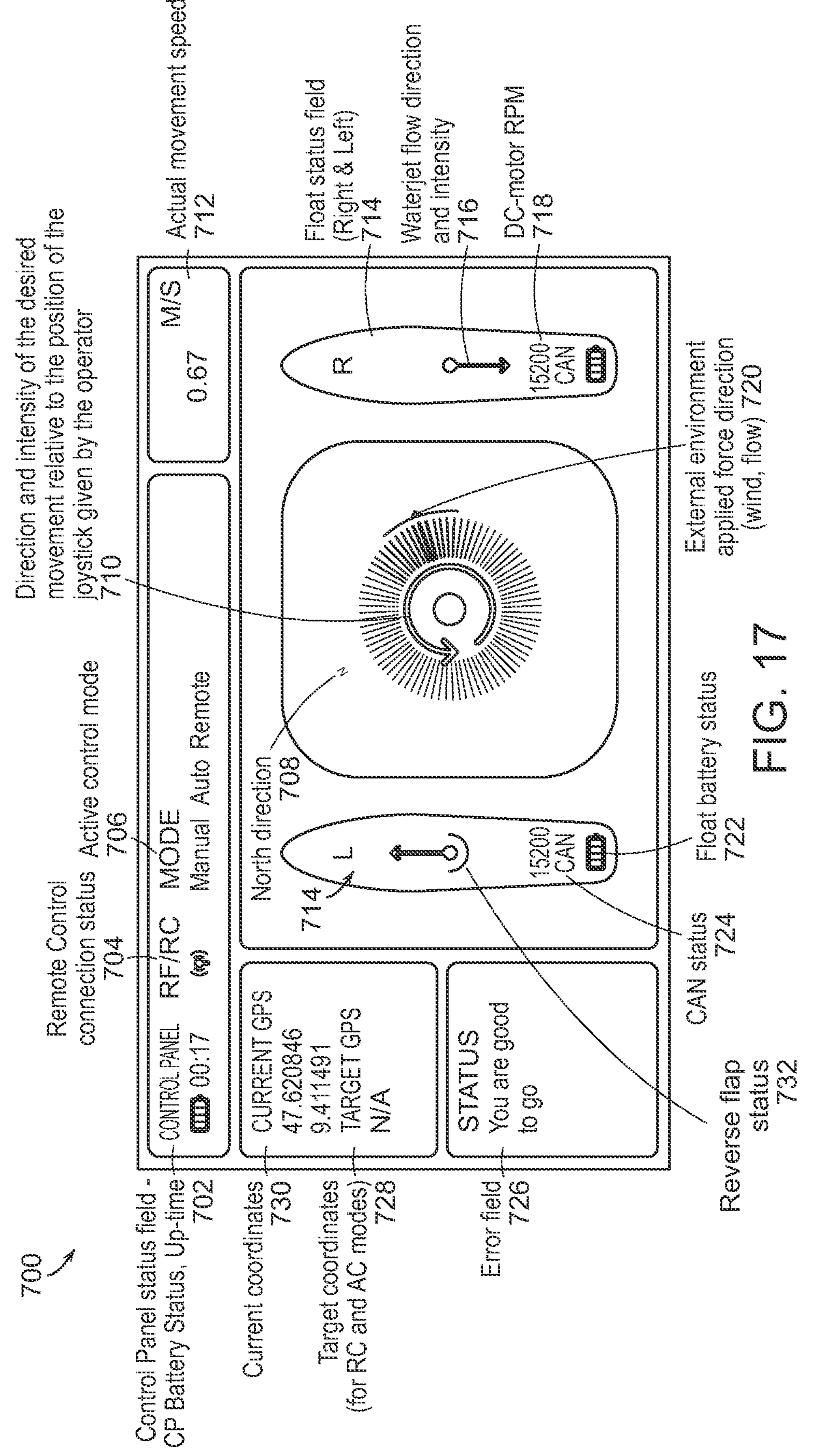
Figure 18:
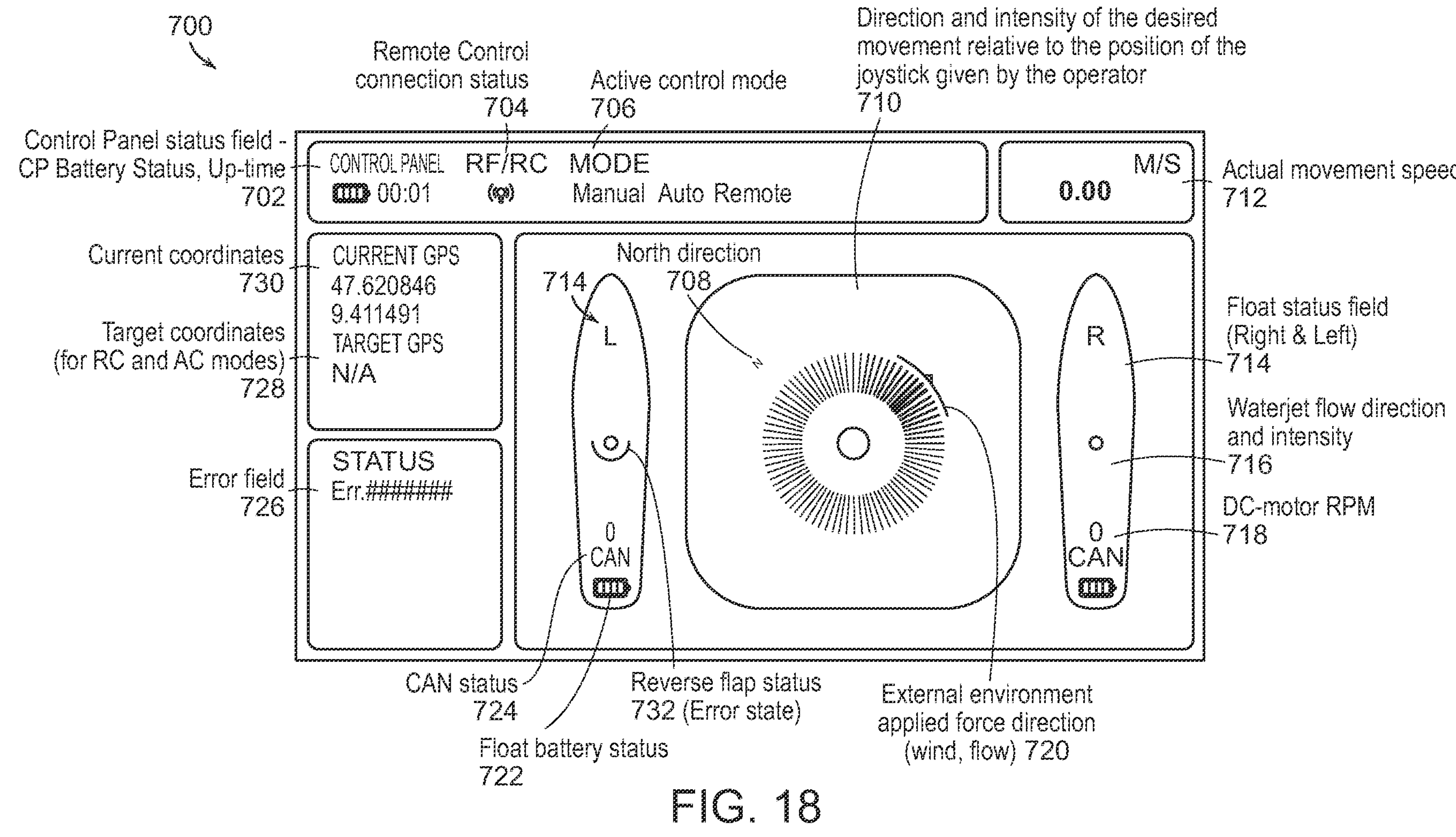

In FIG. 15, the seaplane is proceeding in a forward direction along the course set by the operator using the joystick as indicated by the arrow 710. In FIG. 16, the seaplane is proceeding generally forward by slightly rightward. The left float indicator 724 shows that the thrust is adjusted on this float to create the appropriate motion. In FIG. 17, the seaplane is turning-in-place as shown by the circular arrow 710. In addition, the left float status display 714 shows the reverse flap status 732 to indicate that the reverse flap has been actuated. FIG. 18 illustrates the situation when an error has occurred. The error status field 726 can include a direct description of the error or an error code that can be cross-referenced with a database of codes. The graphical window 700 can also provide an additional visual indication of the element of the seaplane experiencing the error using highlighting, flashing, color change, or other attention-grabbing changes. For example, if the reverse flap is stuck or otherwise unable to move, the flap status indicator 732 can change color to red. In some embodiments, a visual indicator displayed in white means that the related parameter or equipment is active; the visual indicator displayed in gray means that the related parameter or equipment is inactive; the visual indicator displayed in green means that the related equipment is working properly or is full charged; and the visual indicator displayed in red means that the related equipment is not working properly or is discharged.

Figure 19:
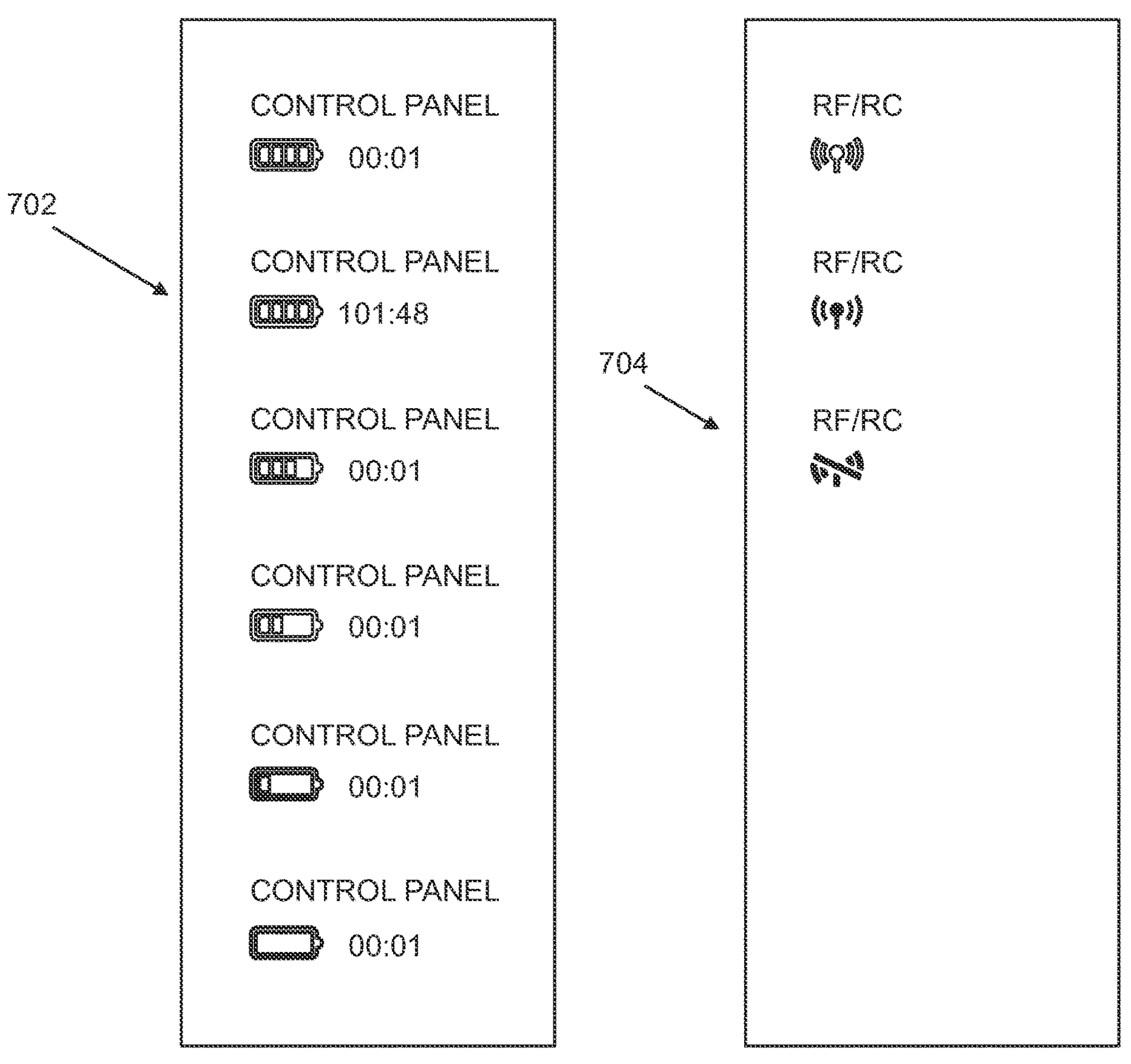

FIG. 19 illustrates icons that can be used to convey information in the graphical window 700 according to some embodiments described herein. In the left panel, various battery status icons 702 are illustrated having different numbers of "segments" in the icon to illustrate remaining battery life. The icon may also change in color and/or line thickness to convey battery usage or condition. In the right panel, various icons for remote control connection status 704 are illustrated. The changes in shape, color, or line thickness of the icons can visually convey whether the remote control connection is present and/or active and the strength of the connection.

In various embodiments, the graphical window 700 can be displayed on a touch-enabled display or a non-responsive (standard) display. When the graphical window 700 is displayed on a touch-enabled display such as a touchscreen, a user can adjust display options or interact with the graphical display areas 701*a-e* by touching the display areas.

Figure 20:
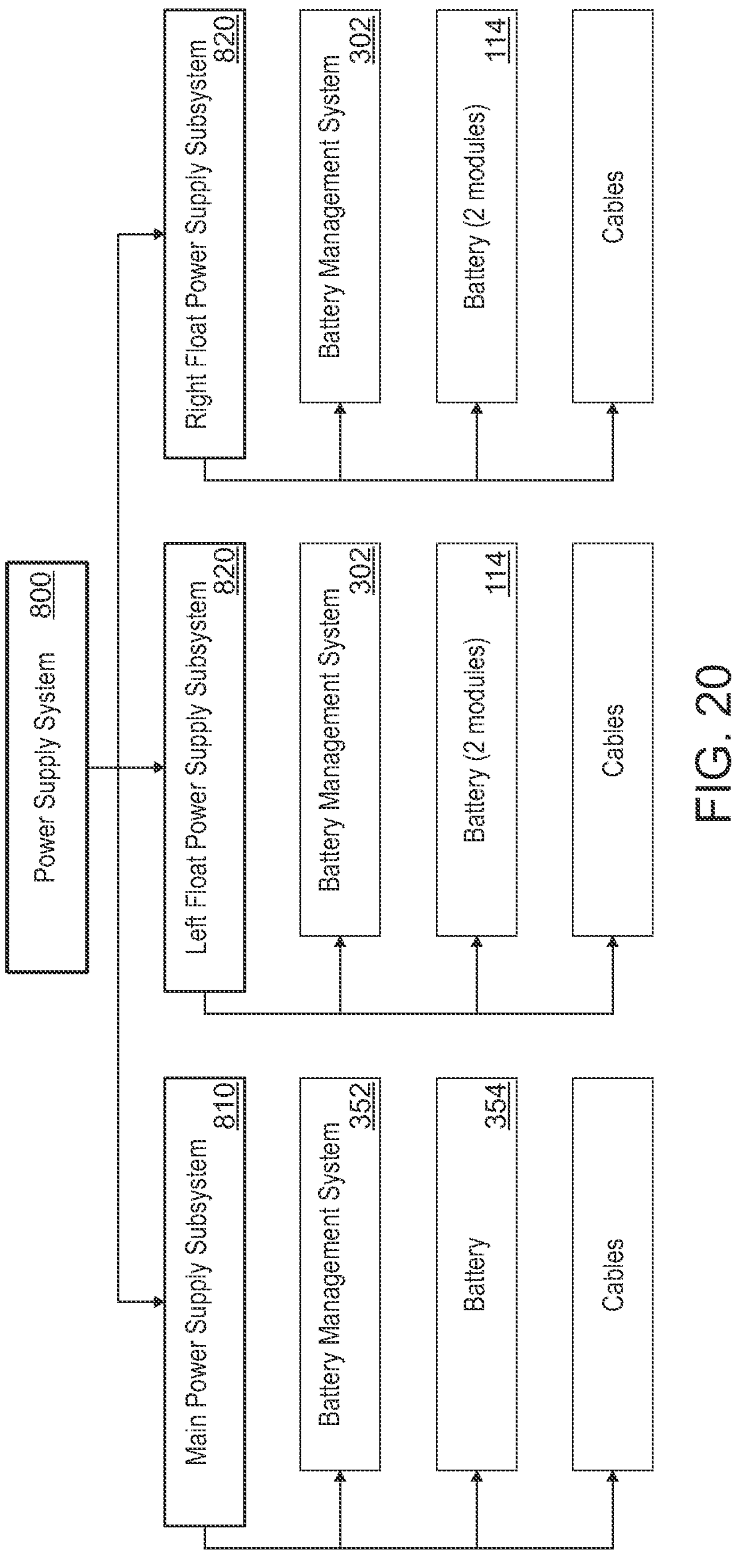
FIG. 20 illustrates a graphical representation of a power supply system 800 for use with some embodiments taught herein.

FIG. 20 illustrates a graphical representation of a power supply system 800 for use with some embodiments taught herein. The power supply system includes a main power supply subsystem 810, a left float power supply subsystem 820, and a right float power supply subsystem 820. The main power supply subsystem includes a battery management system 352, a battery 354, and cables for intraconnection of components in the subsystem and interconnection of components to other subsystems. The left and right float power supply subsystems each include a battery management system 302, one or more battery modules 114, and cables for intraconnection of components in the respective subsystem and interconnection of components to other subsystems.

The main power supply subsystem can be integrated into the control panel and is designed to power devices installed in the control panel. The left and right power supply subsystems are associated with left and right floats, respectively. The left and right power supply subsystems are designed to provide power to one or more of the following systems and devices in each of the floats: components of the propulsion control system 350 including float control unit 120 or speed sensor (e.g., RPM sensor); and components of the float power unit including motor driver, motor, reverse actuator, or rudder actuator. The left and right power supply subsystems can be identical to one another in some embodiments.

In some embodiments, the left and right power supply subsystems can operate at a nominal output bus voltage in a range of 52-59 V, or more preferably at 56 V, and at a stabilized value of 12 V. The output power of the left and right power supply subsystems can be not less than 14 kW during operation (e.g., movement of the seaplane). In some embodiments, the total power consumption of the battery modules 114 can be not less than 100 Ah. The lifetime of the left and right power supply subsystems can be not less than 1000 cycles or approximately 5 years in various embodiments. In some embodiments, the left and right power supply subsystems can have an ingress protection of at least IP68. The left and right power supply subsystems can have input charge interfaces including, but not limited to, three-phase alternating current (e.g., 380 V at 50-60 Hz), two-phase alternating current (e.g., 110-220 V at 50-60 Hz), or direct current (e.g., 27 V±2 V).

The battery management system 302 of the left and right power supply subsystems can perform several functions. The BMS 302 creates a power bus at appropriate voltages to supply other components. The BMS 302 can protect against overdischarge or overcharging of the battery cells 114. The BMS 302 can provide a continuous discharge current of at least 260 A for each battery module. The BMS 302 can balance the voltage for each battery cell in the battery during charging. In some embodiments, the BMS 302 can charge each battery module in two stages with a current not exceeding 100 A at the BMS output: first at a constant current (or constant power) value, then at a constant voltage value. In some embodiments, the BMS 302 can utilize programmatic regulation of the charging current value. The BMS 302 can terminate battery charging when the charge current drops to a threshold value set by software in some embodiments. The BMS 302 can disconnect battery modules based upon inputs from thermistors associated with the battery modules to prevent overheating.

In some embodiments, the BMS 302 can charge the batteries 114 in a normal charging mode or in any accelerated charging mode. For example, the full charge time in normal charging mode at ambient temperature (20±5)° C. can be no more than 2.5 hours while the full charge time in accelerated charging mode at ambient temperature (20±5)° C. can be no more than 0.3 h. The BMS 302 can determine the appropriate charging mode in the process of performing work. In either the normal or accelerated charging mode, the batteries 114 can be charged with constant and continuous monitoring of the battery temperature to prevent the destruction and/or ignition of the cells in the battery.

The BMS 302 can continuously transmit telemetry information via the CAN 2.0b information bus with an adjustable frequency of at least 1 Hz. In various embodiments, the transmitted telemetry information can include one or more of the following: voltage level on each serial Li-Ion cell; the value of the charge or discharge current of each Li-Ion cell; voltage values of connected thermistors; a signal about the termination of the battery charge when the threshold current value is reached; battery blocking signal in case of overdischarging, overcharging or exceeding the current limit value (i.e., short circuit); or current battery level (%). The BMS 30-2 can receive commands via the CAN 2.0b information bus and can then process and execute those commands. In various embodiments, received commands can concern one or more of the following: disconnecting the battery; battery inclusion; changing the frequency of telemetry data transmission; changing the value of the battery charge current and the threshold value of the battery charge termination current; changing the threshold values of resistance of thermistors; shutdown of the battery and BMS own power supply by zero (GND) voltage level on the dedicated line. In some embodiments, the exchange of command and telemetric information with the FCU (PCS) BMS is carried out according to the information exchange protocol via the CAN 2.0B-J1939 bus without using long frames.

In some embodiments, performance of the float power supply subsystem (FPSS) can be monitored during normal operation or for service purposes, including in the "on the actual state" mode, to assess the condition of the batteries and reduce operating costs. In one aspect, the monitoring can include control over serial numbers of critical FPSS components, including BMS and batteries, at all stages of the life cycle. In another aspect, the serial numbers of critical FPSS components are monitored every time the FPSS is enabled (e.g., started). Because unauthorized replacement of FPSS components is not allowed, such monitoring allows disabling the operation of the FPSS if a replacement with unexpected or unknown serial numbers is detected. In another aspect, the monitoring ensures continuous collection of telemetric information about the state of the FPSS, informing the pilot of the aircraft and, under certain conditions, the manufacturer of the FPSS. If a voltage imbalance occurs between battery cells, service support can be carried out by test-recovery cycles (TRC). In some instances, the frequency of the TRC is determined by the developer for each battery individually, for example.

The system's float power unit (FPU) is equipped with a waterjet driven by an electric dc-motor and installed in each float of the seaplane and creates a jet of water that sets the seaplane in motion.

In some embodiments, the battery in the float power supply subsystems are provided in a 15S10P parallel configuration wherein the battery has 15 lithium-ion cells connected in series with 10 parallel battery elements.

In each subsystem, the cables can provide an electrical interface between the system instruments and equipment installed in the floats for their joint operation. The cables can implement power interfaces and can meet one or more of the following requirements: reliable functioning of systems in operating conditions; ensuring the electrical characteristics and specifications of the electrical circuits; ensuring that the interconnections are correct; transmission of power to consumers; and connect to ground power source to charge batteries. The cables and corresponding connectors or mating parts include moisture and dust protection up to IP68 class.

In some embodiments, the components of the power subsystems are selected to provide a suitable float power budget to operate the system effectively. For example, the components can be selected to meet a performance requirement for the seaplane in terms of ensuring the duration of at least 15 minutes of regular operation of the seaplane with fully charged batteries in the mode with continuously running engines. The power budget can also take into account limitations on the number of series-connected cells in the batteries by the DC-motor driver, for example, 15 series connected cells.

Figure 21:
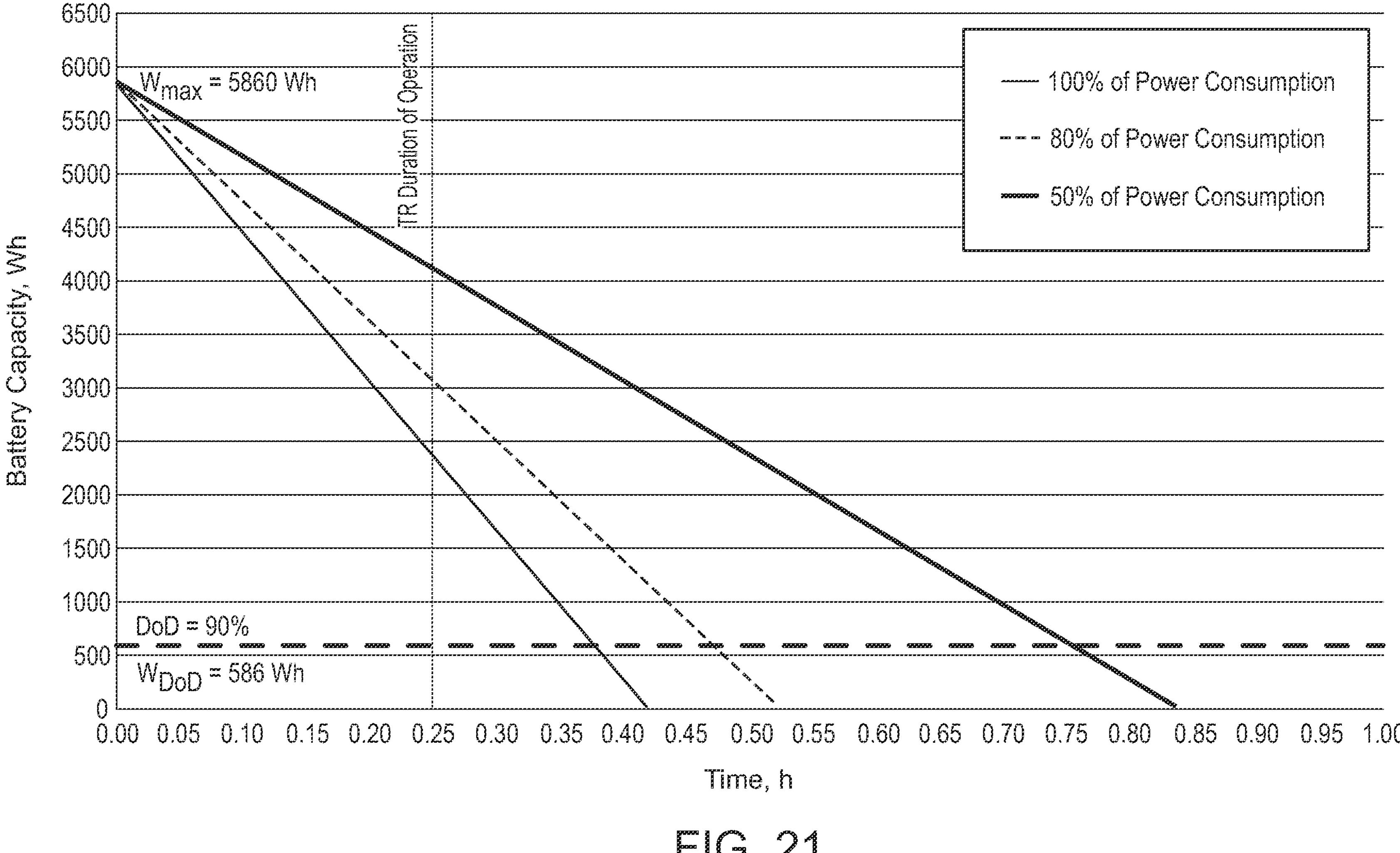
FIG. 21 illustrates the battery capacity as a function of time for a configuration with two simultaneously functioning battery modules for three different engine operating modes: full power (100%), 80% of full power, and 50% of full power (i.e., half power).
Figure 22:
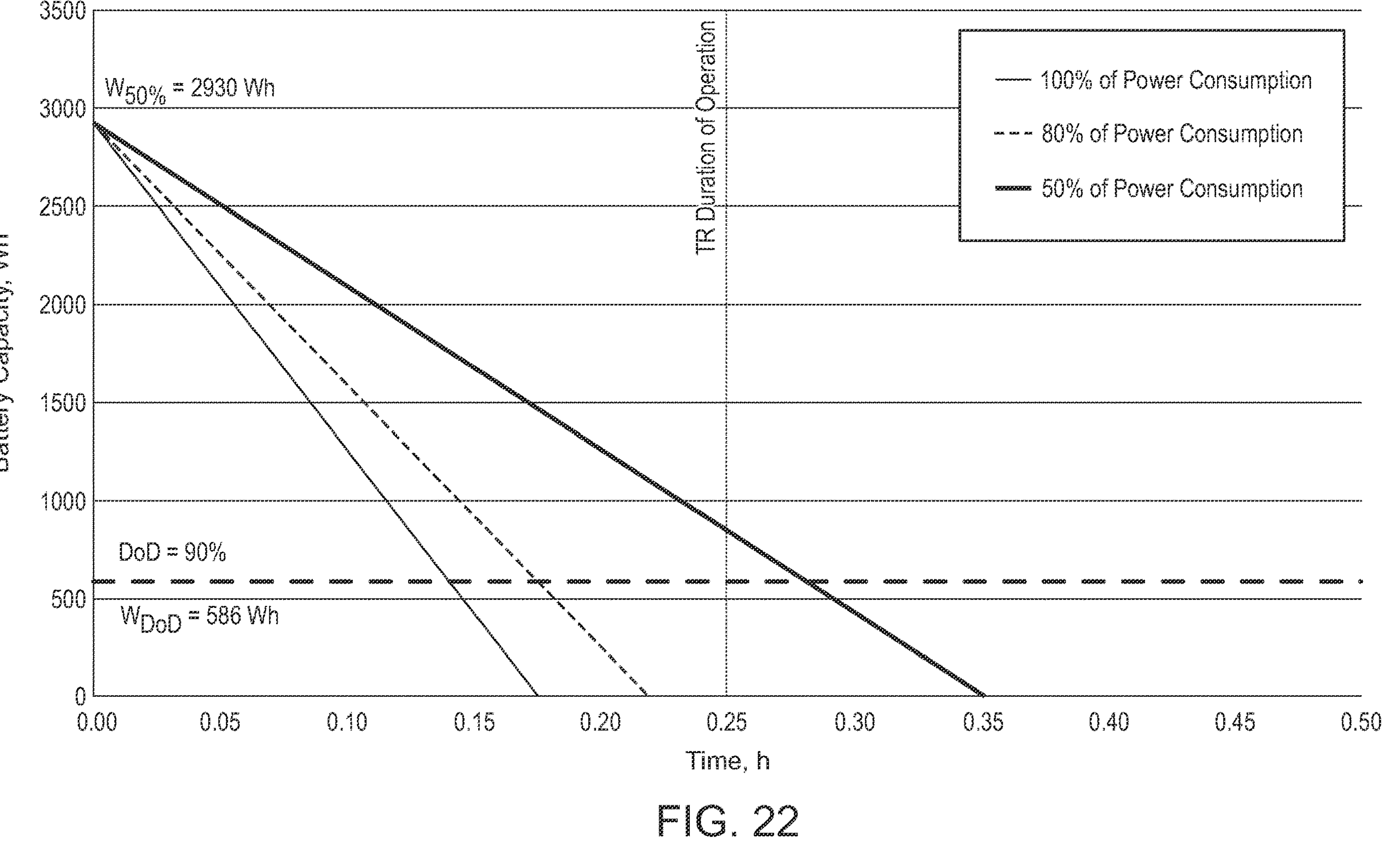
FIG. 22 illustrates the battery capacity as a function of time for a configuration with only one battery module functioning (i.e., an incomplete configuration) for the same three engine operating modes.

FIG. 21 illustrates the battery capacity as a function of time for a configuration with two simultaneously functioning battery modules for three different engine operating modes: full power (100%), 80% of full power, and 50% of full power (i.e., half power). FIG. 22 illustrates the battery capacity as a function of time for a configuration with only one battery module functioning (i.e., an incomplete configuration) for the same three engine operating modes. In some embodiments, the propulsion system will operate for at least 25 minutes with fully charged batteries in continuous engine running mode at full power, with a 40% power margin over the first 15 minutes. If only one of the two battery modules is used, the propulsion system will normally run for 15 minutes in continuous engine running mode only at half power. The duration of regular operation of the propulsion system in the mode with continuously running engines at full power, in this case, may be less than 10 minutes. In some embodiments, the FPSS has sufficient power reserve to ensure normal operation of the propulsion system with fully charged batteries in continuous running mode for 15 minutes with both a full set of batteries and a single module connected. Batteries of the selected configuration allow you to safely carry out all the necessary scheduled operations during the normal operation of the propulsion system, as well as some additional operations beyond the plan.

Figure 23:
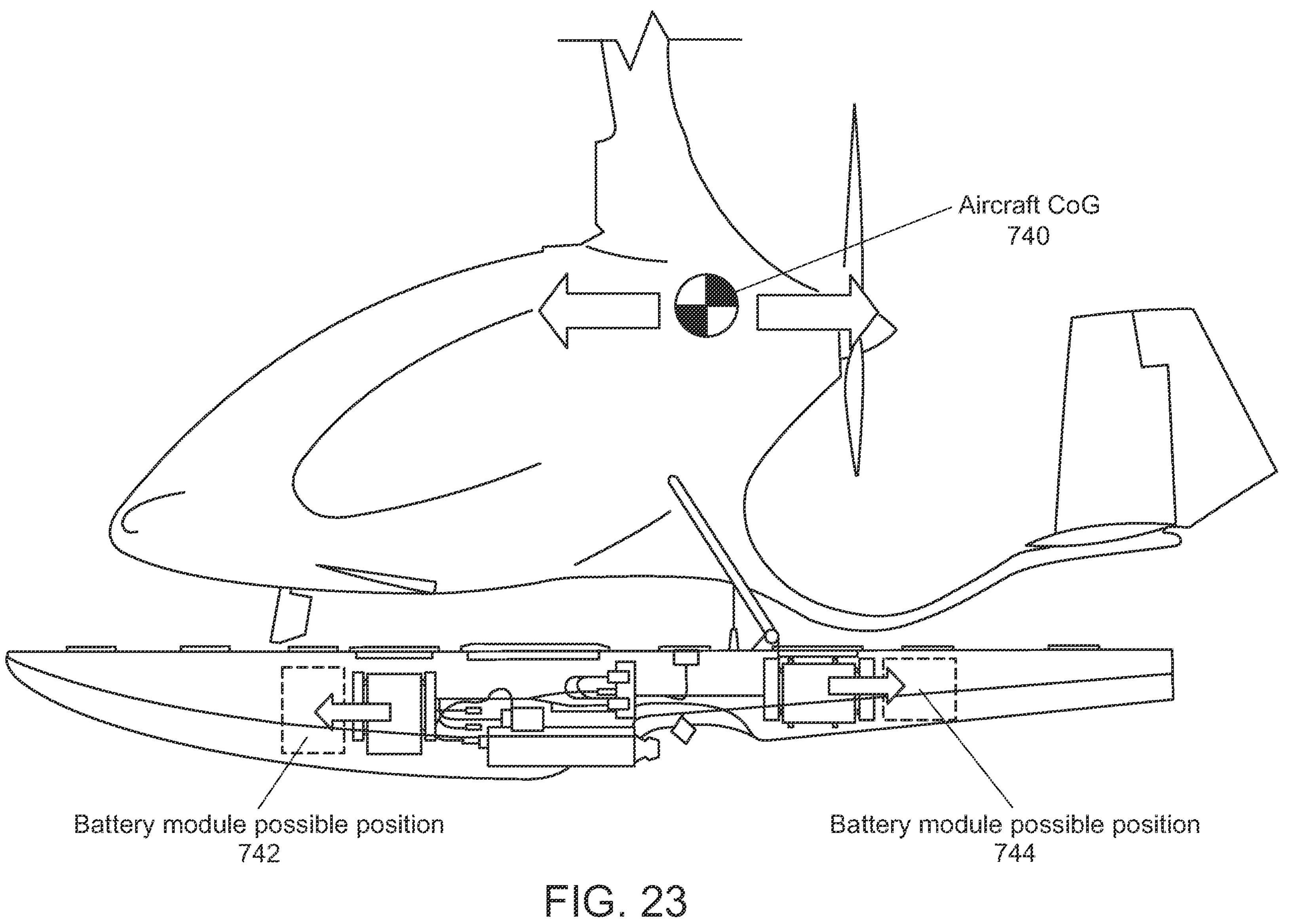
FIG. 23 illustrates battery placement in the floats of a particular embodiment of the seaplane of the present disclosure.
Figure 24:
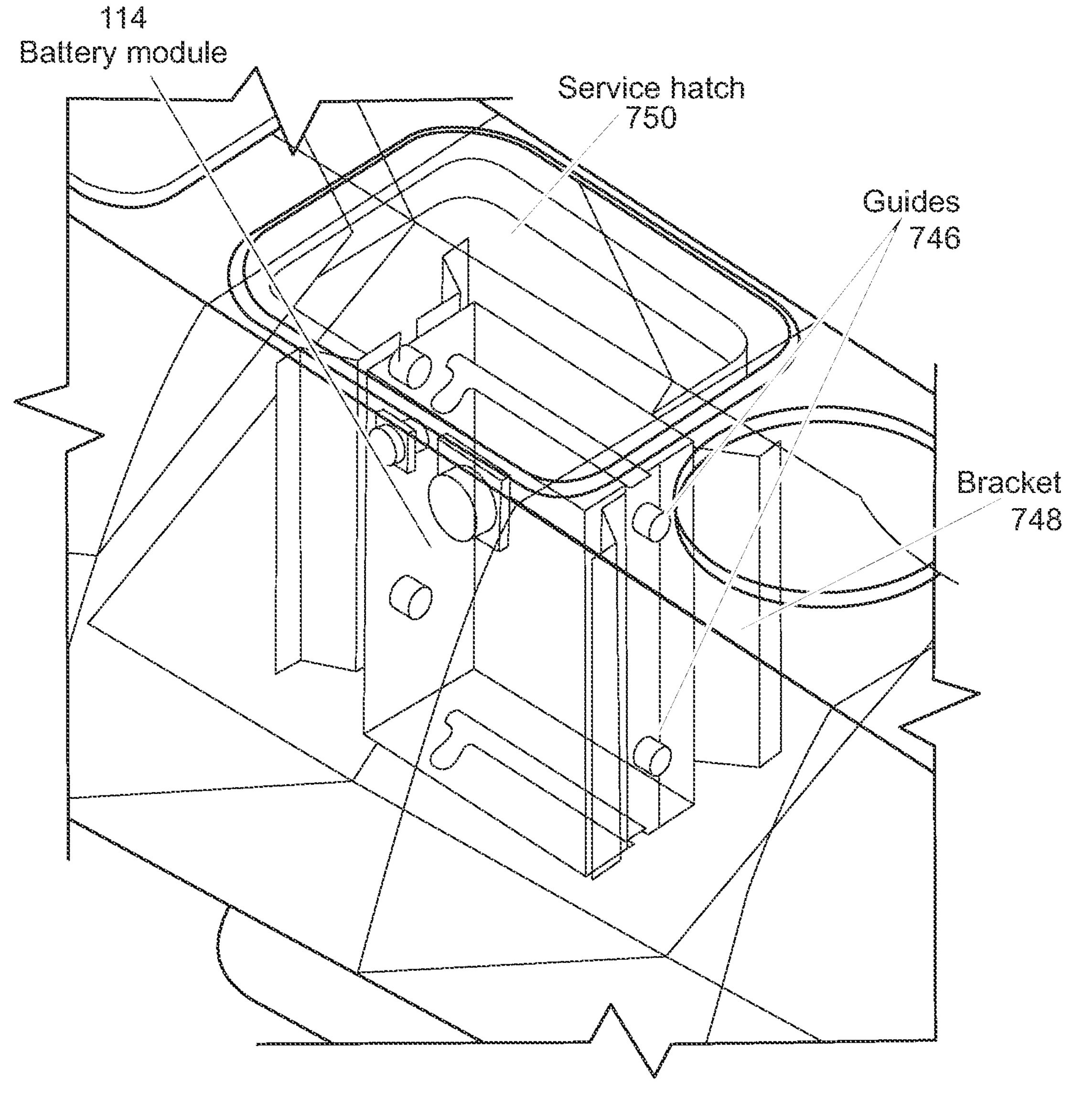
FIG. 24 illustrates the battery mounted in the float of an embodiment of the present disclosure.

In some embodiments, the floats and/or seaplane include physical accommodation for elements of the float power supply subsystems. To ensure compliance with the requirements for the position of the center of mass of the aircraft along the longitudinal axis, battery modules in each float can be spaced apart in separate float compartments located in the bow and stern of the float. The specific placement of battery modules in the float can be selected for a particular type of aircraft as shown in FIG. 23. In some embodiments, the battery module position within the float can be adjustable using, for example, an adjustable mounting system such as rails, skids, and/or brackets as shown in FIG. 24. The position 742 of the forward battery module and the position 744 of the rear battery module can be adjusted to balance the weight of the batteries around a center of gravity 740 of the seaplane or to balance against the weight of other components in the seaplane.

Figure 25:
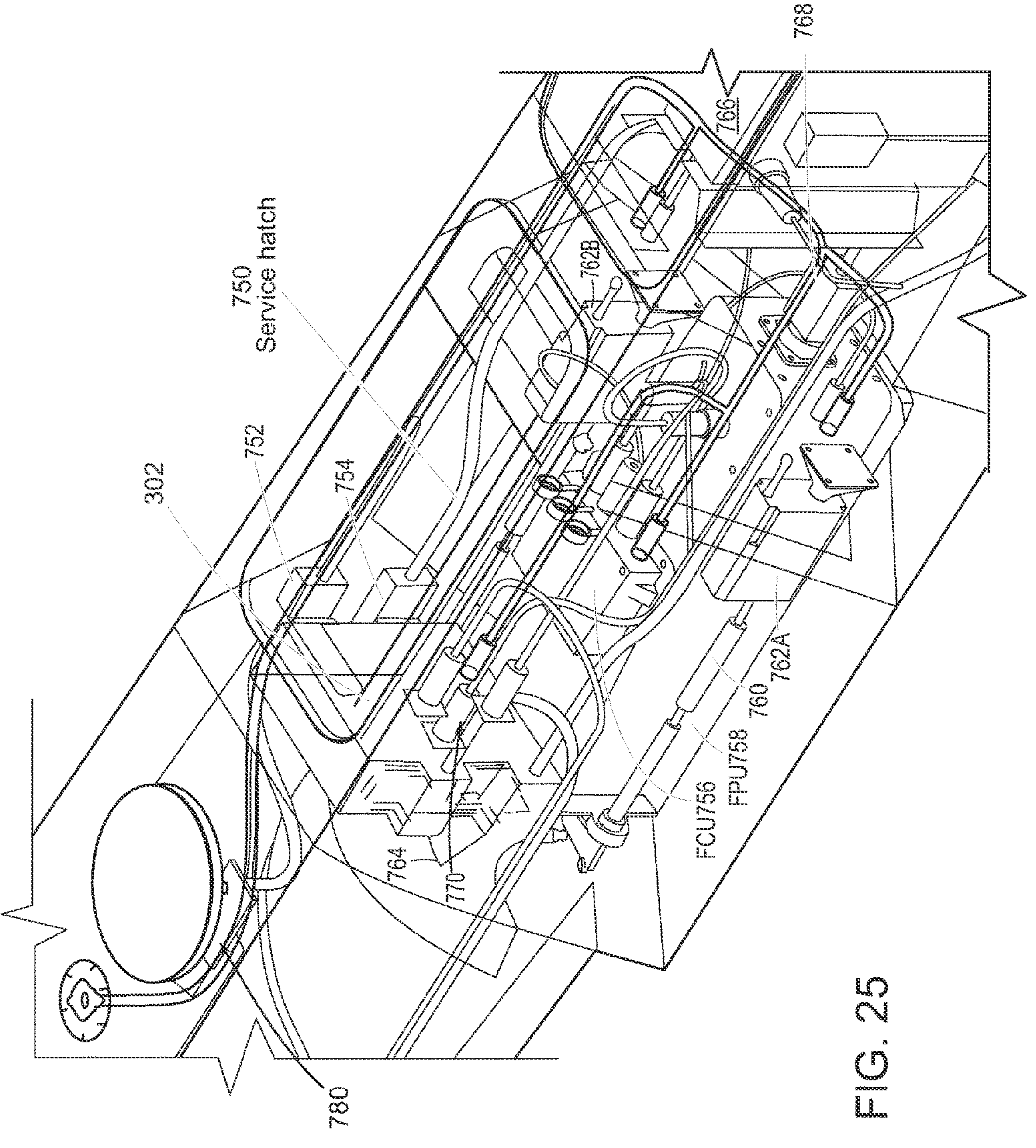
FIG. 25 illustrates the battery management system in the float of an embodiment of the present disclosure.

Mounting and dismantling of battery modules, as well as access to the batteries 114 and to the BMS 302 unit can be carried out through service hatches 750 in the float. Each of the battery modules can be installed with its guides 746 in the skids of brackets 748 fixed on the float frame as shown in FIG. 24. The BMS 302 unit can be mounted on the redan mounting frame of the float as shown in FIG. 25. Access to the BMS 302 can also be provided through a service hatch 750. The positioning of components within the float is also generally shown in FIG. 25 along with cabling for electrical connections that are shown and described in connection with the present application. A float control unit 756 includes an electronic control that generates control signals for operation of the float propulsion unit 758. A first actuator control 762A rotates a control rod 760 to adjust the axial direction of nozzle and thereby control the direction of thrust of the waterjet within the float propulsion unit 758. On the opposite side of the FPU 758 a second actuator control 762B can be mounted that rotates a second control rod to adjust the position of the reverse deflector as described previously. The BMS 302 is configured to control the distribution of power from the fore battery 766 and the stern battery for the float. The batteries can be recharged using a charge connector on the top of the float that is mounted on or adjacent to the charge connector bracket 780. The charge connector is connected to the BMS 302 with power connector 752. On opposite sides of the BMS 302 are mounted power connectors 754 and 764 that provide power to the FPU 758 at connector 768 and to the fore and stern batteries, respectively. The cables at 770 are the data and command signal cables between the BMS 302 and the FCU 756, for example.

Float subsystem batteries 114 can function in any spatial position. The duration of operation for the float subsystem at maximum consumption on the 56 V (14 kW) bus is at least 15 minutes. The batteries 114 can meet the requirements of explosion and fire safety in accordance with ISO 12405. The batteries 114 can meet the tightness requirements in accordance with ISO 12405. The degree of water and dust protection for the batteries can be not lower than IP68. A fire prevention or suppression system can be used to supplement cooling of the battery system. A fire retardant cell can be mounted on the battery modules to suppress a fire and/or limit thermal damage to the float. A fire retardant powder such as a glass particulate or a $CO_2$ cell can be included for this purpose, for example.

In some embodiments, the FPSS can operate in a temperature range from −5 to +60° C. and in an altitude range from 0 to 10 km above sea level (a.s.l.).

Figure 26A:
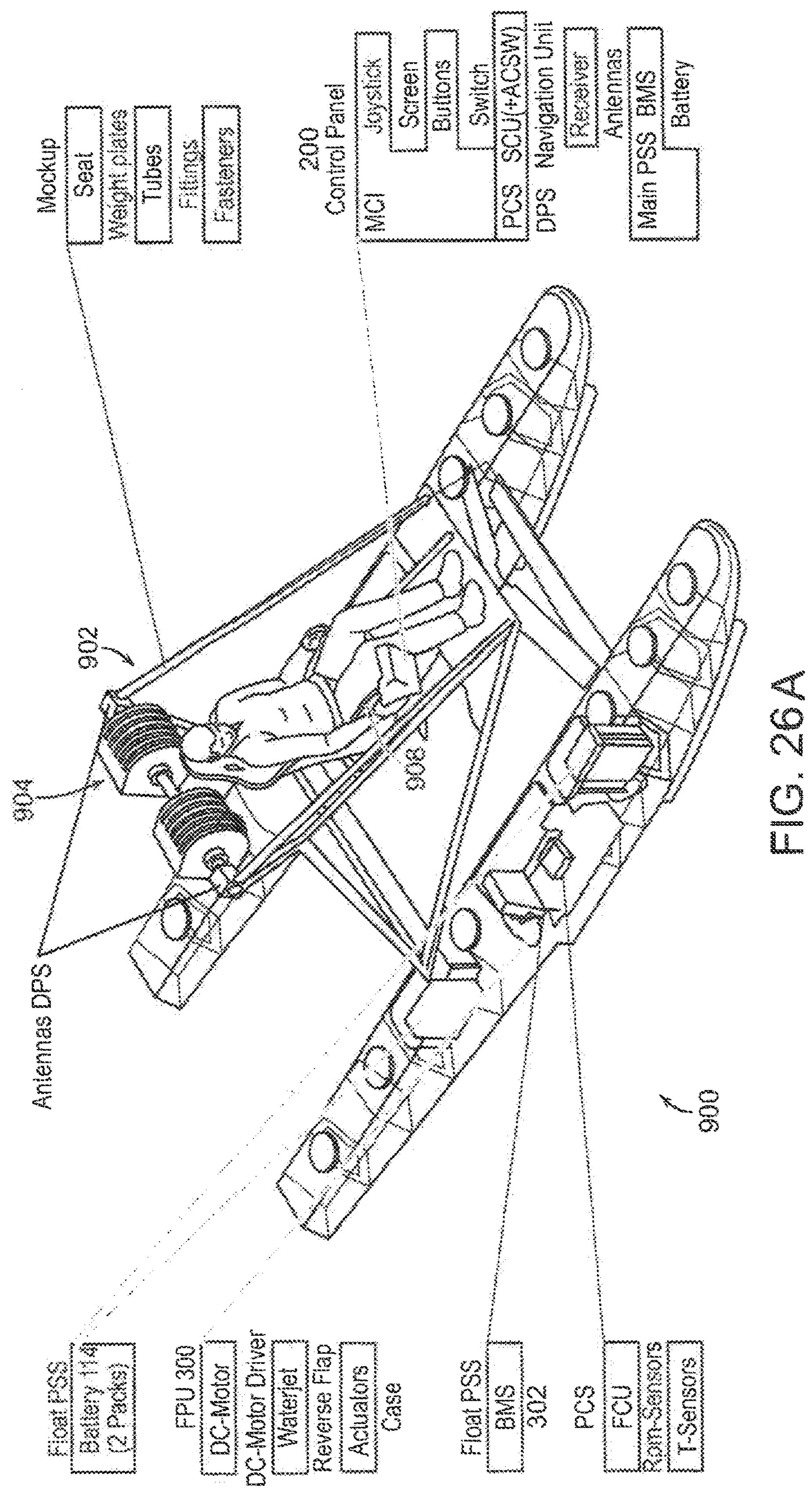
FIG. 26A illustrates a float system measurement embodiment including the float water propulsion system and related control system and components as taught herein.
Figure 27:
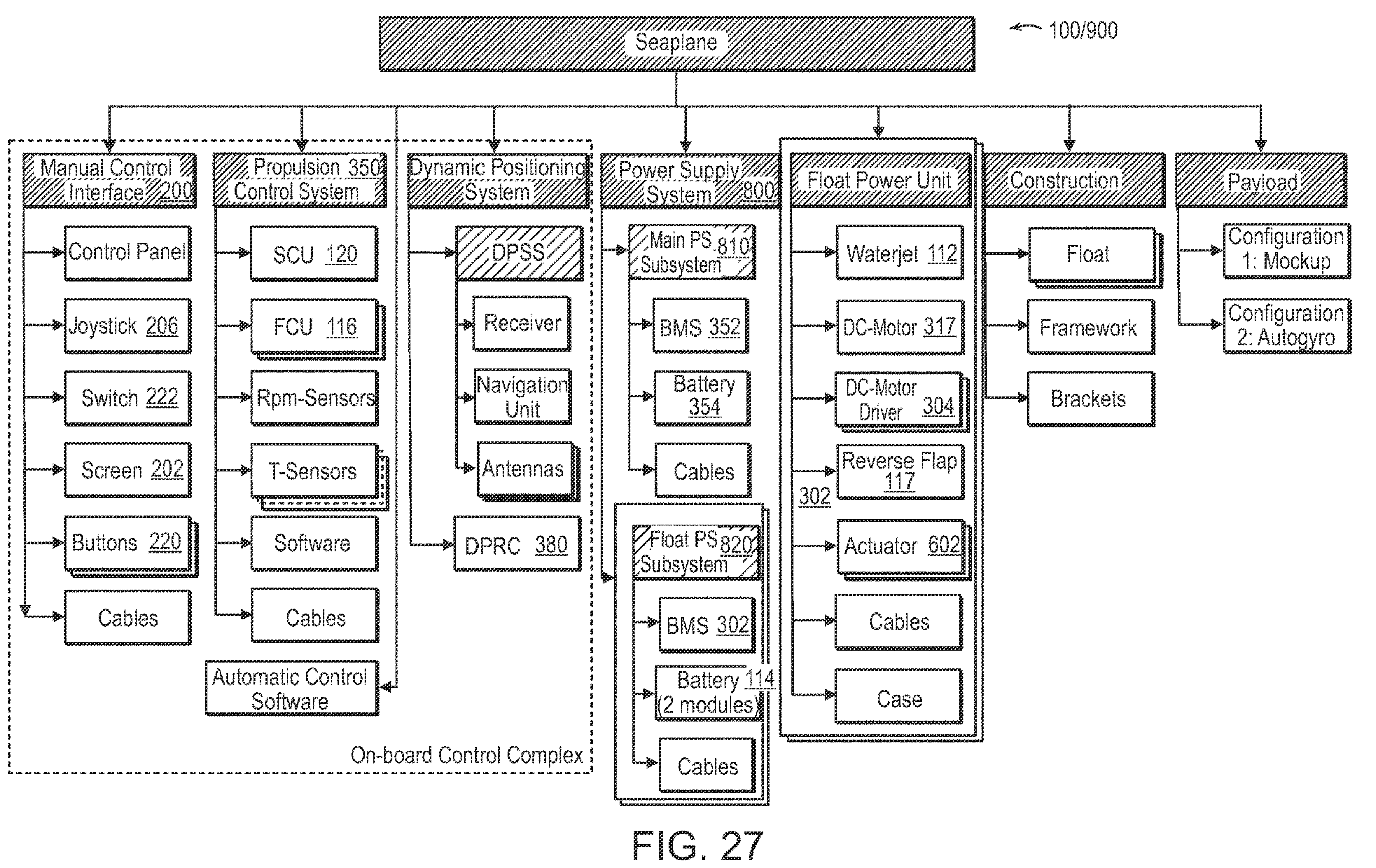
FIG. 27 illustrates a schematic of the seaplane.

FIG. 26A illustrates a float measurement vehicle 900 including the propulsion system and related systems and components as described herein. The measurement vehicle can assist with configuring the float system for different aircraft configurations. FIG. 27 illustrates a schematic of a seaplane 900 configured similarly to the measurement vehicle. The seaplane 900 is supported on floats. Each float is equipped by a waterjet propulsion system driven by a motor (e.g., an electric dc-motor) that creates a jet of water that sets the seaplane 900 in motion. Each of the electric de-motors can be powered via the electric motor controller from storage batteries that do not directly depend on the operation of other electrical systems of the seaplane 900 and that have a charge sufficient for maneuvering on the water for a given time. In some embodiments, batteries and electric dc-motor controllers are installed directly in both floats.

Figure 28:
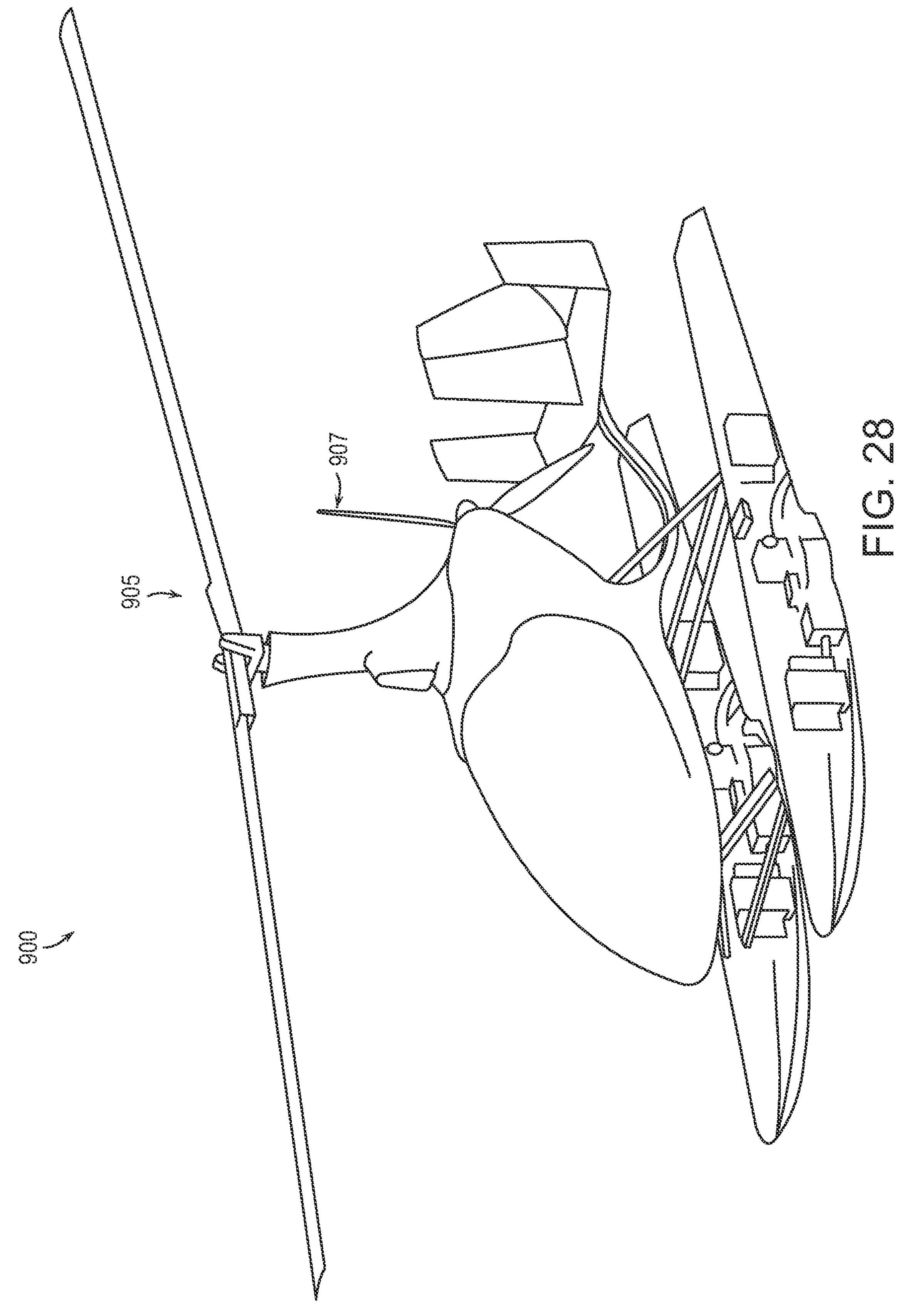
FIG. 28 illustrates an alternative embodiment of an aircraft including a rotor in accordance with some embodiments taught herein.

The seaplane 900 can include two floats with propellers installed in them, a payload, and a frame connecting the payload with the floats. The seaplane 900 can be operated in two different payload configurations. In the first configuration, a water surface module is used as a payload. This configuration is used for tests of the float system in an actual environment on the water, for example. For float systems manufactured to be retrofitted onto an existing aircraft, the water surface module can be used to simulate operation prior to assembly with the remainder of the aircraft, for example. In the second configuration, an actual aircraft is used as a payload. This configuration is used for flight. A general view of the first and second configurations is presented in FIG. 26A and FIG. 28, respectively. In some embodiments, the aircraft 900 can include a rotor 905 and a rear prop 907 on the fuselage.

The seaplane 900 can include a manual control interface (MCI). The MCI is a set of devices and interfaces that allow the crew to control the speed and direction of the seaplane while on the water. Control through the MCI is independent from other control and interface systems of the seaplane such as airplane controls. The speed of movement can be changed by increasing or decreasing the rotation speed of the electric dc-motors, which causes a concomitant change in the thrust created by the waterjets. Direction of movement (for example, a smooth turn) can be changed by various scenarios of increasing or decreasing the rotation speed of the electric dc-motor of one float in comparison with the rotation speed of the electric motor of the second float and other scenarios as described above.

Storage batteries of the seaplane can be charged on the ground, either while batteries are attached to the seaplane, or separately, by removing them from onboard. In some embodiments, the storage batteries can be charged during flight by setting a charger into the onboard equipment and connecting it to the standard electric generator of the seaplane. Further embodiments can include aircraft with battery powered engines for such as those available from MagniX USA, Inc. located in Richmond, WA wherein power from battery systems as described herein can be used to power flight of the aircraft. In preferred embodiments power generated by batteries in the floats can be directed through power cables mounted in or on the aircraft mounting frame that connects the aircraft fuselage to the floats.

Figure 29:
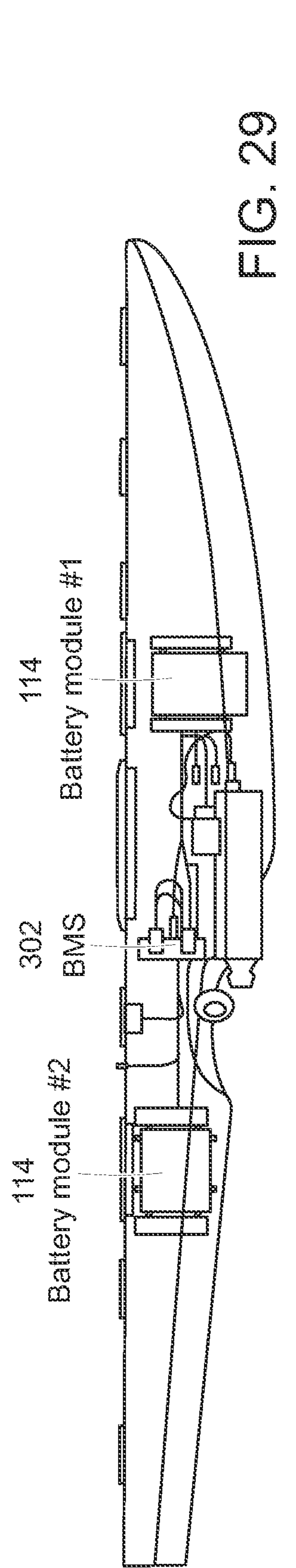
FIG. 29 illustrates components of the waterjet control system installed in a float in accordance with some embodiments taught herein.
Figure 30:
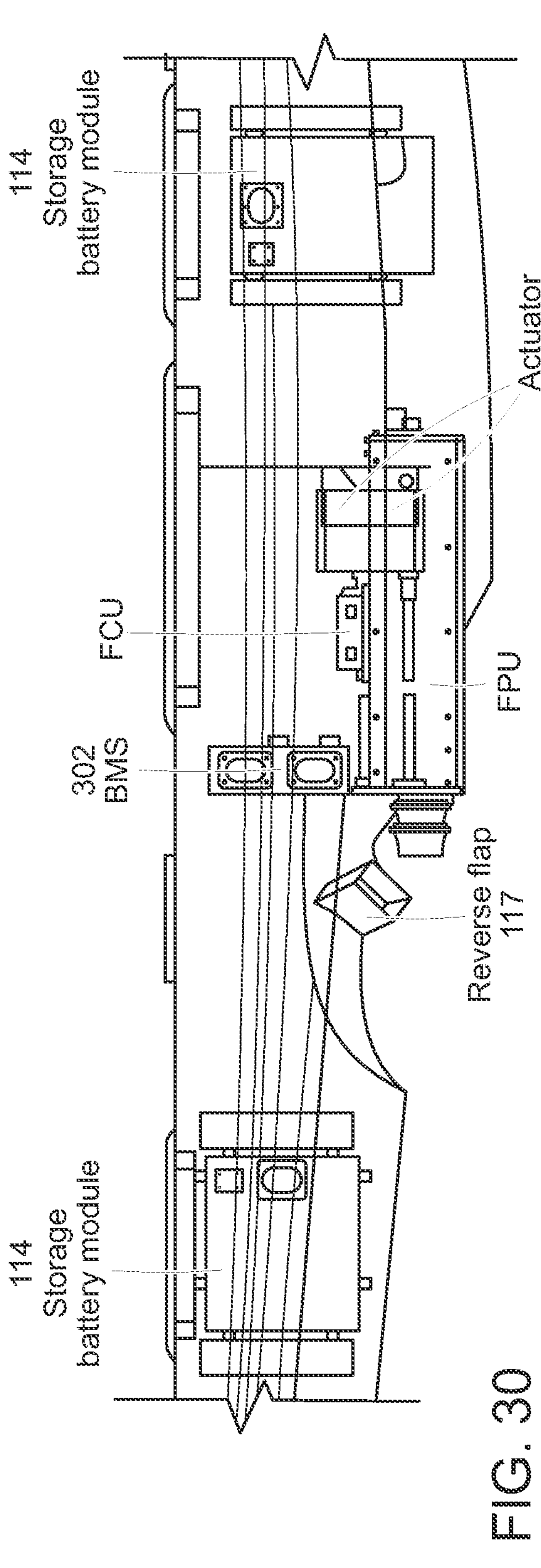
FIG. 30 is a magnified view of FIG. 29.

Each of two floats can be a conventional seaplane riveted sheet metal structure. Other materials such as carbon fiber or fiberglass can be used for the float structure as well as metals such as aluminum, titanium or stainless steel. To ensure reliability, the volume of the float can be divided into compartments by frames and bulkheads. Float power units (FPU), storage batteries modules, battery management unit (BMS), float control unit (FCU) are installed inside each of the floats as shown in FIGS. 27 and FIG. 29.

Figure 31:
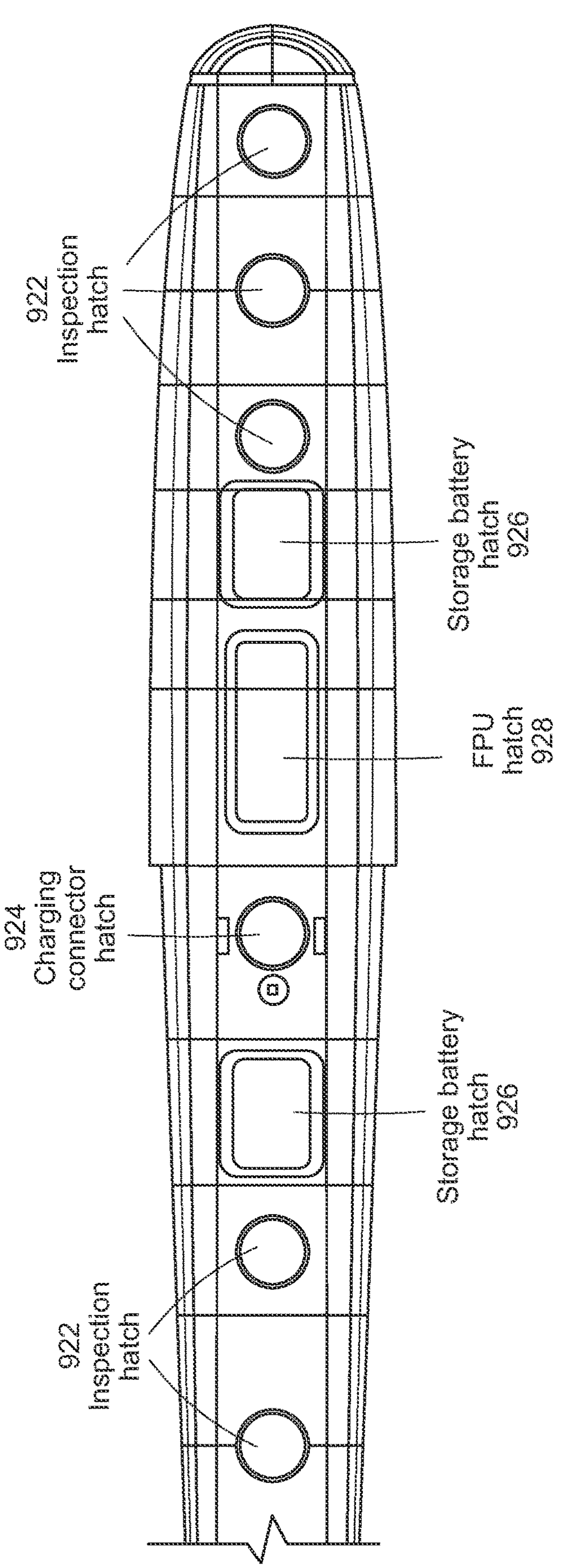
FIG. 31 is a top view of a float illustrating visualization and access panels in accordance with some embodiments described herein.

For installation/dismantling and maintenance of internal units, as well as for monitoring their condition and the condition of float internal volumes, technological hatches are provided on the upper surface of each of the two floats as shown in FIG. 31. In an example embodiment, each of the floats has nine hatches, six of which are round and three of which are rectangular. Inspection hatches 922 can be round hatches and can have a clear diameter of 152 mm. A charging connector hatch 924 can be round. Under the charging connector hatch 924, a bracket is installed with an electrical connector used to charge the batteries. Storage battery hatches 926 can be rectangular and can have clear dimensions of 295×198 mm. Storage battery hatches 926 are designed for installation of battery packs. An FPU hatch 928 can have clear rectangular dimensions of 515×165 mm and can be used for access to FPU, FCU, BMS, and actuators.

FIG. 26A shows a payload mockup in the form of a welded frame structure 902 formed by steel pipes and fittings. In an example embodiment, ø40×2 mm pipe can be used as the main standard size. To ensure that the mass and position of the center of gravity of the seaplane 900 with the payload mockup corresponds to the mass and position of the center of gravity of the seaplane with actual aircraft components, balancing weights 904 with a total mass of 300 kg can be used. For example, the weights can be pancake-shaped and mounted on a sports bar installed on one of the tubes of the mockup structure 902 behind the operator's head. At the same time, this pipe is attached to the fittings of the structure 902 using detachable threaded connections, which allows installation of the balancing weights 904 and modification of the number of weights at the place of the general assembly of the seaplane 900.

The seaplane operator can sit on a seat 908 attached to the frame structure 902 using, for example, a bracket made of sheet steel. At the front of the frame structure 902, the operator's feet can rest on a support made of, for example, sheet metal. A manual controller 200 (sometimes referred to as a control panel) can be installed on one of the pipes of the payload mockup structure 902 using a bracket manufactured, for example, using additive technologies. The bracket can allow adjustment of the position of the controller 200 in space to accommodate different sizes and reach distances of operators. Internal components of the controller 200 can be connected with a stranded wire with fluoroplastic insulation (e.g., fluorinated ethylene propylene or FEP) with a cross section of 0.2 mm$^2$ for signal lines and a cross section of 0.5 mm$^2$ for power lines. Connection of power subsystem equipment can be carried out with AWG18 stranded wire.

The FCU is a hermetically sealed unit. The FCU performs the following functions: receiving via the CAN bus, interpretation and execution of control commands from the SCU; formation and issuance of commands to the actuators of the float (actuators, DC motor driver); receiving telemetric information from actuators, sensors (encoder, thermometers) and BMS installed in floats; formation of a telemetry package containing the current state of the float systems and transmission it to the SCU via the CAN bus; and determination of the condition of the float equipment, incl. identification of accidents and pre-emergency situations and their possible prevention.

The devices are connected with a stranded wire with fluoroplastic insulation FEP with a cross section of 0.2 mm$^2$ for signal lines and a cross section of 0.5 mm$^2$ for power lines. FCU construction can include body elements made using additive technologies, fasteners and electrical connectors.

One CAN-TTL interface converter is required for FCU information exchange between SCUs via CAN1 bus. The 120 Ohm terminating resistor has been removed from the board of this converter, since, in general, the FCU is not the last device on the CAN1 bus. Another CAN-TTL interface converter can be used for FCU communication with other devices in the float (actuators and BMS) via its own CAN2 bus. The terminating resistor is saved on this converter.

The UART-RS485 interface converter is required for FCU communication with the user via a single RS485 bus at the debugging stage. The 12/5V LM2596 voltage converter generates a 5V stabilized output voltage from the input voltage of 12 V. The output voltage is set by a trimmer resistor. The output voltage is designed to power the FCUs and individual FPUs according to the diagram is shown above in FIGS. 11-12B.

The ROS-W manufactured by Monarch Instruments is used as the RPM sensor. The ROS-W is versatile Remote Optical Sensors that have a visible red LED light source and green LED on-target indicator. The sensors are housed in a threaded 303 stainless steel tube. The ROS-W is capable of detecting a reflected pulse from a target consisting of T-5 Reflective Tape at distances of from 12 mm up to 1 m from the rotating object and angles up to 45 degrees. The green LED On-Target Indicator will blink at the input frequency rate when the sensor is properly aimed. In some embodiments, the RPM sensor can sense rotation of objects at speeds in a range from 1 RPM to 250,000 RPM.

Temperature sensors work on the principle of resistance measurement. AA IEC 60751 tolerance class sensors are used.

Each float has 8 sensors: on the first battery module—3 pcs.; on the second battery module—3 pcs.; on the DC motor inside FPU structure—1 pc.; on the DC motor driver inside FPU structure—1 pc.

To increase the duration of the battery and to preserve the capacity of the battery cells it is recommended to charge the battery in two stages: first, with a constant current of not more than 8 A, and then when the voltage value reaches 8.4 V with a constant voltage until the charge current decreases to 200 mA. The correct charging process can be implemented in two ways: removing the battery from the Control Panel structure and connecting it to a special charger for Li—Po batteries, for example, B6AC LiPro Balance Charger by iMAX; or by connecting a laboratory current source to the pins of connector 228 on the Control Panel 200 as shown in FIG. 10B. Connector 228 has four pins. The first two pins must be connected to the positive voltage of the current source, and the last two pins to the negative. Each contact can pass current up to 5 A. To charge the battery using a laboratory current source, you should: set the voltage to 8.4 V and the minimum current; connect to connector X6; raise the current limit to the required value (but not more than 8 A); wait for the charge current to decrease to 200 mA and complete the charge.

BMS HX-2S-JH20 V1.0 allows to safely operate the battery during charging, discharging or storage. BMS performs the following functions: protects battery cells from overdischarge (up to 2.9 V); protects battery cells from overcharging (up to 4.28 V); protects SCU, MCI and storage battery cells from short circuit (over 80 A); provides balancing of storage battery cells during charging (up to 4.2 V).

To ensure the required seaplane balance and the possibility of arranging floats, the battery is divided into two identical modules. Storage battery modules are located in the bow and stern of the float as is shown in FIG. 27. To facilitate the installation and removal of storage battery modules their fastening is implemented on a skid. Sufficient ease of cable connection is provided by special connectors.

Float Power Unit (FPU)—General Description

The FPUs 300 in the system are the propulsion units, creating thrust with a jet of seawater ejected from the nozzle of the waterjets. The thrust vector of each of the FPUs can be controlled by inserting a reverse flap, by turning the jet nozzle, or both.

One FPU is installed in each float. Each FPU includes: structure; waterjet; DC motor; DC motor controller; water cooling system of DC motor and DC motor controller (fittings, branch pipes); reverse flap; electric linear actuators (2 pcs.); a set of rods connecting the actuators with the reverse flap and the rotary jet nozzle; set of electrical connectors; fasteners kit.

Figure 32:
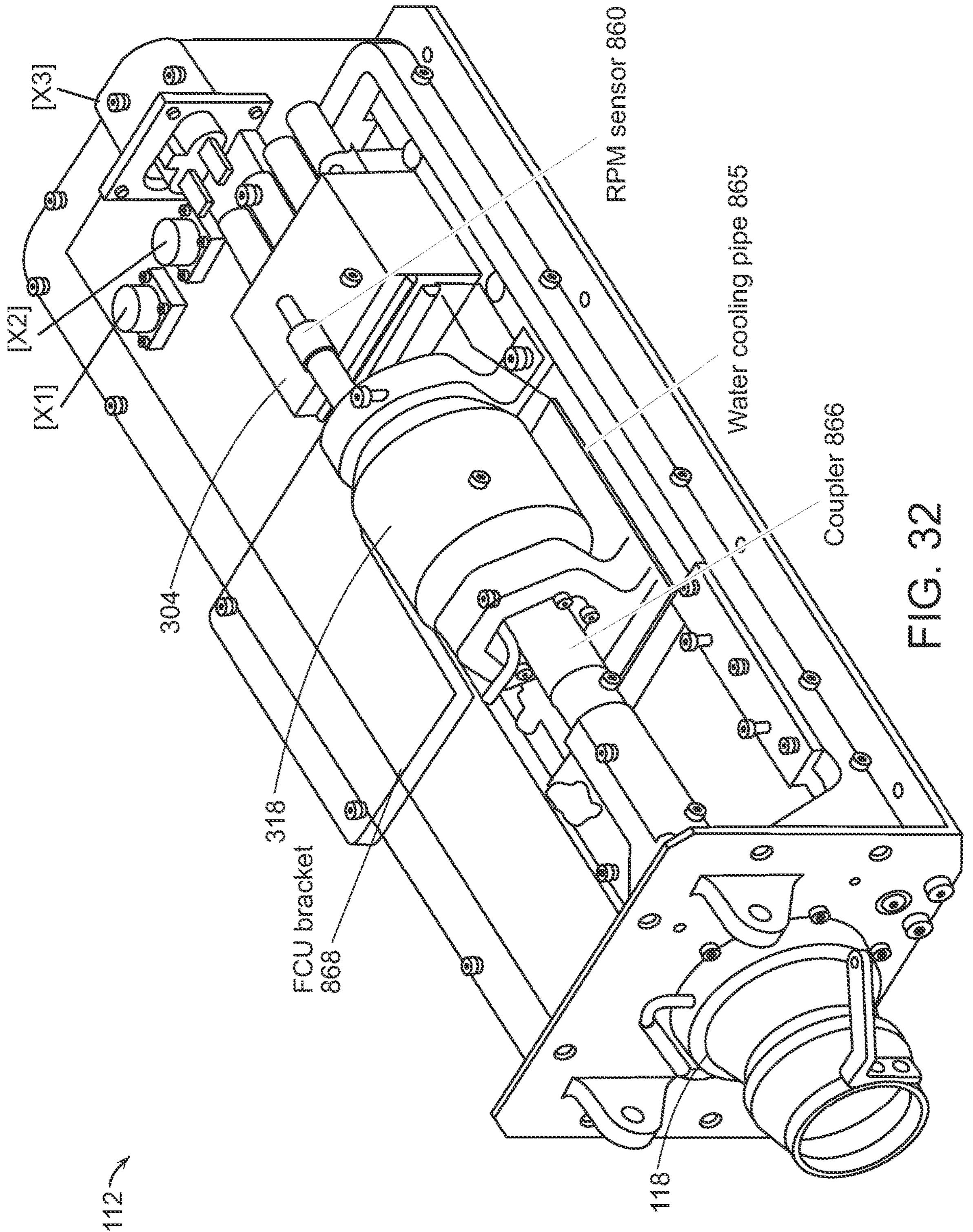
FIG. 32 illustrates a float propulsion unit in accordance with some embodiments taught herein.

The thrust that drives the seaplane is generated by water-jets, which are in turn driven by DC motors. The jet propulsion, DC motor, DC motor controller are installed in the FPU structure, which provides protection against the ingress of outboard water on the mentioned components. The FPU structure with components installed in it is the main unit of the FPU, its general view is shown in FIG. 32. An RPM sensor 860 is mounted to sense propeller/motor speed. A water cooling pipe 865 runs adjacent to the motor 318 to cool the motor using air that has been drawn into the system and that is subsequently ejected through the waterjet. An FCU bracket 868 mounts the FCU to the float structure. A coupler 866 couples the motor to the propeller that forces the water out of the waterjet. The connectors X1, X2, and X3 can connect via cables to the manual controller 200 at the firmware port 239, Ethernet port 236, and SMA connector for GNSS 232, respectively. In one embodiment, the overall dimensions of the FPU case with waterjet installed are 727×210×157 mm, which makes it possible to assemble and dismantle through the float maintenance hatch. The case is made of aluminum alloy and consists of the following main parts: base, wall, side wall and cover. Inspection and maintenance of the components installed inside the FPU housing are carried out by removing the cover; disassembly of the remaining parts of the FPU housing is not provided.

The RPM sensor for the PCT motor can be mounted on the back motor support and directed with its sensitive element directed towards the rear rotating end of the motor.

In order to ensure the specified temperature conditions for the operation of the DC motor and the electric motor controller, a water cooling system is used, which is a set of elastic tubes. Water is supplied to the system from a special selection in the water jet during its operation, then enters the electric motor, after it—into the DC motor controller, and then is discharged overboard.

Figure 33:
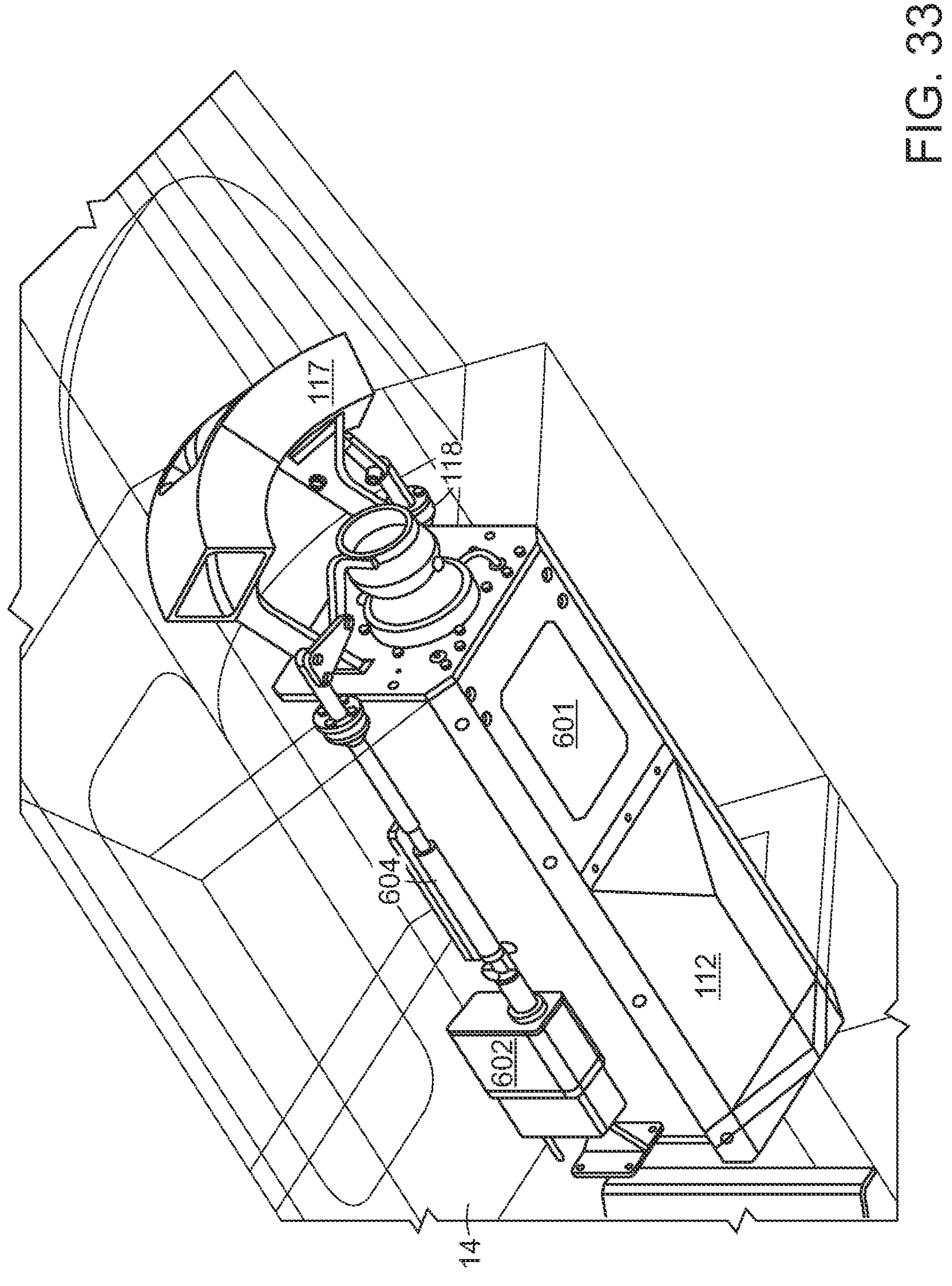
FIG. 33 illustrates the float propulsion unit installed in a float.

The FPU structure is installed in the float in a cutout in the redan area. A general view of the placement of the FPU components installed in the float is shown in FIG. 33.

The FPU thrust vector control is carried out by a rotary waterjet nozzle 118 and a reverse flap 117, each driven by an electric actuator 602 and a linkage system 604. FIG. 33 illustrates the actuator and linkage for the rotary nozzle 118; a similar structure (not shown) is mounted on the opposite side of the FPU to control motion of the reverse flap/damper 117. The range of deviation of the rotary nozzle 118 from the neutral position is ±15°, and the actuator stroke is ±19.5 mm. The reverse flap 117 is attached to the hinges on the FPU structure and is driven by an actuator 906. The full stroke of the actuator 602 for moving the damper from the upper end position to the lower end position is 25 mm.

To ensure the tasks of adjusting the stroke and assembling sliders of the mechanisms of the rotary nozzle and the reverse flap are made up of two parts connected by a threaded connection.

On top of the FPU body in each of the two floats, the FCU of this float from the PCS is installed. The FCU is attached to the FPU with a frame bracket.

MGM ESC TMM 40063-3 X2-SERIES PRO is used as a DC Motor Controller (DC Motor Driver) in the following configuration: water-cooled heatsink XL is used; capacitors and power cables are placed "axially"; power cables diameter: 16.0 mm2 (6 AWG); external cap pack is used; "BC" version (with telemetry) is used; ON/OFF switch is used (for tests only).

If the DC-Motor Controller is not the "BC" version, the telemetry also might be obtained using the DC-Motor Controller connection. Here orange wire is for telemetry, blue wire is ground and white wire is a jumper between power pin and telemetry pin.

DPS is designed for: determining the position and speed of the Prototype; and formation of initial data to determine the control actions when driving in AC Mode.

DPSS is a functional grouping of devices. All devices are located in the Control Panel and perform the following functions: receiving control actions via a radio communication channel through a receiver from the Dynamic Positioning Remote Control; transfer of control actions to the SCU (from composition of the PCS); real-time determination of the coordinates and velocity vector of the system based on the signals of navigation systems while moving through the water using the navigation unit; transfer of information from the navigation unit to the SCU (from composition of the PCS); measurement of angular velocities around the center of mass of the seaplane, linear accelerations at the point of installation of the sensor and the direction of the magnetic field vector along three axes using the navigation unit.

The NV216C-RTK-A module is used as a navigation unit to determine the position of the system in space. Two NV2410 external active antennas are used to receive GPS L1, GLONASS L1 and SBAS (WAAS, EGNOS and MSAS) signals in the frequency band (1574 to 1606 MHZ). The NV2410 antenna is equipped with a LNA, consisting of one input LNA and a SAW filter. The NV2410 is housed in a compact industrial package with a built-in magnet and comes with a 5 m cable with SMA connector. Receiving command information from the DPRC control panel is carried out using the FrSky R-XSR receiver.

To implement remote control at a 2.4 Ghz receiver frequency and automatic control using GNSS signals, Dynamic Positioning Remote Control based on FrSky Taranis Q X7 ACCESS 2.4 GHz is used.

The GPIO interface is designed to turn on the system and generate a signal to turn on the floats. This operation is carried out manually, using a switch from the MCI.

Figures 38, 39:
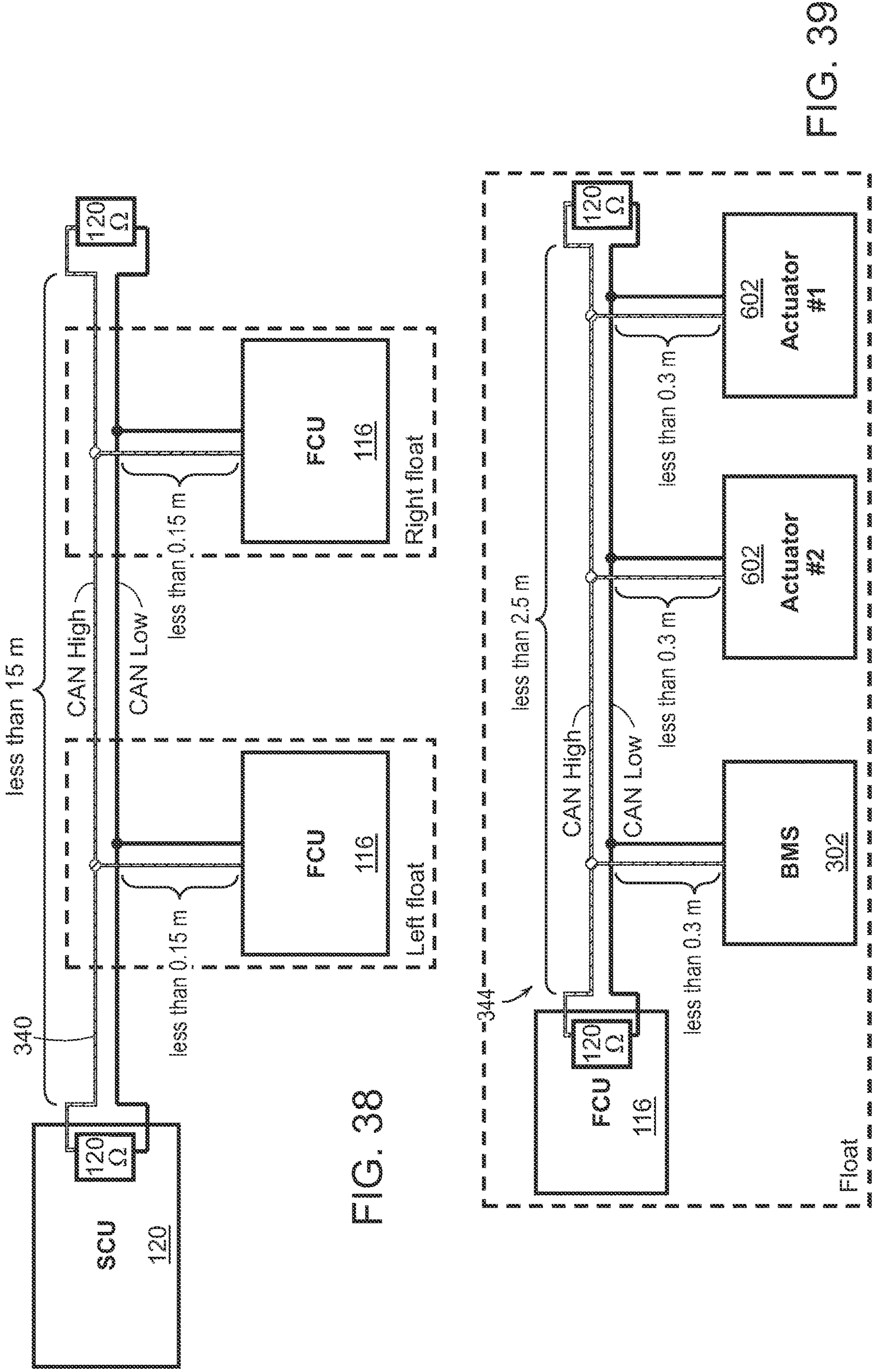
FIG. 38 illustrates a CAN1 bus connecting the system control unit and float control units in accordance with some embodiments described herein.
FIG. 39 illustrates a CAN2 bus connecting the float control unit and other components of the waterjet control system in accordance with some embodiments described herein.

For communication between the units, the CAN1 bus with the CAN protocol of its own configuration is used. The exchange of command and telemetry information between FCUs and SCUs is carried out via the CAN interface, the diagram in the FIG. 38 shows the connection from the FCU to the SCU.

The telemetry package transmitted via CAN from the FCU to the SCU includes: temperature sensors data; number of motor RPMs; data on the position of the actuator rods.

The exchange of command and telemetry information between the SCUs and BMS information is carried out via the CAN2 bus with the J1939 protocol. FIGS. 12A-12B show the connection from the BMS to the SCU. CAN2 bus 344 topology is shown in the FIG. 39. The exchange of command and telemetry information between FCUs and actuators is carried out via the CAN J1939 interface. The diagram in FIG. 11 shows the connection from the actuators to the FCU. The exchange of command and telemetric information between the user and the FCU and SCU is carried out via the RS-485 bus. The output connector for user connection via the RS-485 bus is located on the Control Panel as shown in FIG. 10B. The transfer of data using the RS-485 bus is appropriate for test and configuration purposes. FIGS. 11-12B show the connection between SCU and FCU. The exchange of command and telemetry information between the SCUs and the navigation module from the DPSS is carried out via the UART interface. FIGS. 12A-12B show the connection between DPSS and SCU.

The exchange of command and telemetric information between the SCUs and the LCD screen from the MCI is carried out via the RGB interface. The exchange of command information between the FCUs and the motor driver is carried out via the PWM interface.

The Control Panel devices are powered by a battery connected to the BMS. Together they form a protected unregulated voltage in the range of 5.8 to 8.4 V. This voltage goes to the DC-DC converter, which outputs a regulated voltage of 5 V.

The devices in each float are powered by two storage battery modules connected in parallel in the BMS unit. Together they form a protected unregulated voltage in the range from 53 to 59 V. This voltage goes into the FPU package to power the motor using the driver. Additionally, the BMS generates a stabilized voltage 12 V, which is distributed between the FPU, FCU and actuators. The FCU houses a DC-DC converter that converts 12 V into a stabilized 5 V voltage. It powers the Nucleo-F746ZG development board, as well as devices in the FPU case. To attach the floats to the payload mockup or to the actual aircraft, four points of connection can be used in some embodiments.

The propulsion system including propulsion devices such as waterjets positioned in the floats allows the seaplane to move, maneuver, park, transport to take-off, landing and back using the propulsion system, regardless of the status of the seaplane main engine, including the case when the main engine is off. Certain use cases for the present systems and methods imply an extended use of propulsion power. One purpose of prototype development is to review compatibility of the system to be used together with the seaplane main engine to reduce the take-off run distance of the seaplane and to provide additional braking during the landing.

The propulsion system provides accurate and safe maneuvering of a seaplane when moving on water compared to the use of just the main engine. The following benefits of using the propulsion system taught herein on a seaplane are shown: significant noise level reduction during maneuvering with the use of the propulsion system, compared to the seaplane main engine; maneuvering in highly congested water areas, including, but not limited to, ports, mooring places, and airports with a water landing strip; movement of a seaplane in service areas; active stabilization and holding a seaplane within a small dedicated water area; increased operational safety of a seaplane due to the main engine TURNED OFF mode (and, accordingly, stopping the rotating propeller) during maneuvering with the propulsion system.

When the seaplane is making headway (e.g., as in FIG. 9A or 9C), the longitudinal channel control from the user is carried out as an in-phase change in the number of waterjet revolutions and the reverse deflectors positions. Yaw control is carried out by differential changes in the number of revolutions.

When the seaplane is in-place or traveling at low speeds (e.g., as in FIG. 9B), movement can be carried out with the position dynamic retention (stabilization) at a given point. This point can be defined as the route endpoint when driving autonomously (AC mode, see below) or otherwise selected by the operator when driving in other modes. The longitudinal channel control commands are carried out by to differential changes in the number of waterjet revolutions. Yaw control is carried out due to the differential changes in the reverse deflectors position and in-phase change in the number of propellers revolutions.

The seaplane can operate in several motion modes. In the manual control (MC) mode, the speed selection and direction of movement is carried out by the operator. In this case, the operator has direct access to the controls of the seaplane (e.g., through the controller 200). In the remote control (RC) mode, the speed selection and direction of movement is carried out by the operator. However, in this case, the operator controls the movement using the remote control 380 and does not have direct access to the controls of the seaplane (i.e., operator is not sitting in the cockpit or operator seat). In the autonomous control (AC) mode, the speed selection and direction of movement is carried out autonomously by means of the systems of the seaplane—without direct operator involvement—according to the movement program embedded in the control system of the seaplane.

The operating mode of the automatic control software (ACSW) 950 (described in relation to FIG. 34) is determined by the selected motion mode and the corresponding control commands, as well as the current state of the seaplane equipment. The control system has three main operating modes: direct, full automatic, and semi-automatic. In direct mode, the control system has direct control of actuating devices. A separate channel is used for each group of actuating devices; stabilization of the movement parameters of the seaplane is turned off; and a zero setting is applied to the DC-motor driver. In the full automatic mode, the control action is calculated based on the current state and position of the seaplane and the coordinates of the endpoint where the seaplane should be located.

In semi-automatic mode, longitudinal speed and yaw angle are stabilized. The semi-automatic mode has three sub-modes. In the semi-automatic/manual sub-mode, manual control of the seaplane's movement is available without stabilization of the speed and yaw angle. The signal to the actuators is given depending on the position of the stick: forward/backward movement controls the longitudinal speed, and left/right movement turns the device along the yaw angle. In this mode, the current state of the device is taken into account; stabilization of motion parameters is turned off; the current position of the deflectors' servomotors is taken into account. In the semi-automatic/cruise stabilization sub-mode, stabilization of speed and yaw angle is engaged. This mode can be automatically activated when the minimum cruising speed of 3 m/s is reached. In the semi-automatic/hold sub-mode, stabilization is performed when driving at low speed or in-place.

The main motion control is a joystick 212 located on the control panel 200. In MC/RC Mode, ACSW identifies the position (position change) of the joystick handle and, depending on the operating mode, generates the appropriate control actions. In AC Mode, the control inputs are calculated directly by the ACSW without the use of controls. The operator can also directly set the ACSW mode of operation using the toggle switches 222 and buttons 220 located on the control panel 200.

There are several basic principles of the propulsion control system 350 of the system. First, the PCS 350 is built on block-modular architecture with an allocation of components that can be modified and, if necessary, replaced or increased independently of each other. Second, independent configuration control is desirable to make it possible to widely change the modes of signal processing and the formation of control actions without interfering with the program code of the control system. Continuous monitoring of the state of control channels is desirable (i.e., CAN BUS). This enables automatic setting of all executive bodies and devices to a neutral state in case of errors or loss of control. It is desirable to have independent testing of components using the ground equipment complex (Ground Support Equipment, GSE). The PCS 350 can implement various and independent communication protocols to control in normal (release) mode (CAN BUS) and to control at the stage of prototype development. The PCT 350 can have continuous collection of telemetry information at the same pace with the feedback data receiving. The telemetric information can be accumulated and stored on external devices to exclude overaccumulation onboard during validation & verification process.

Figure 34:
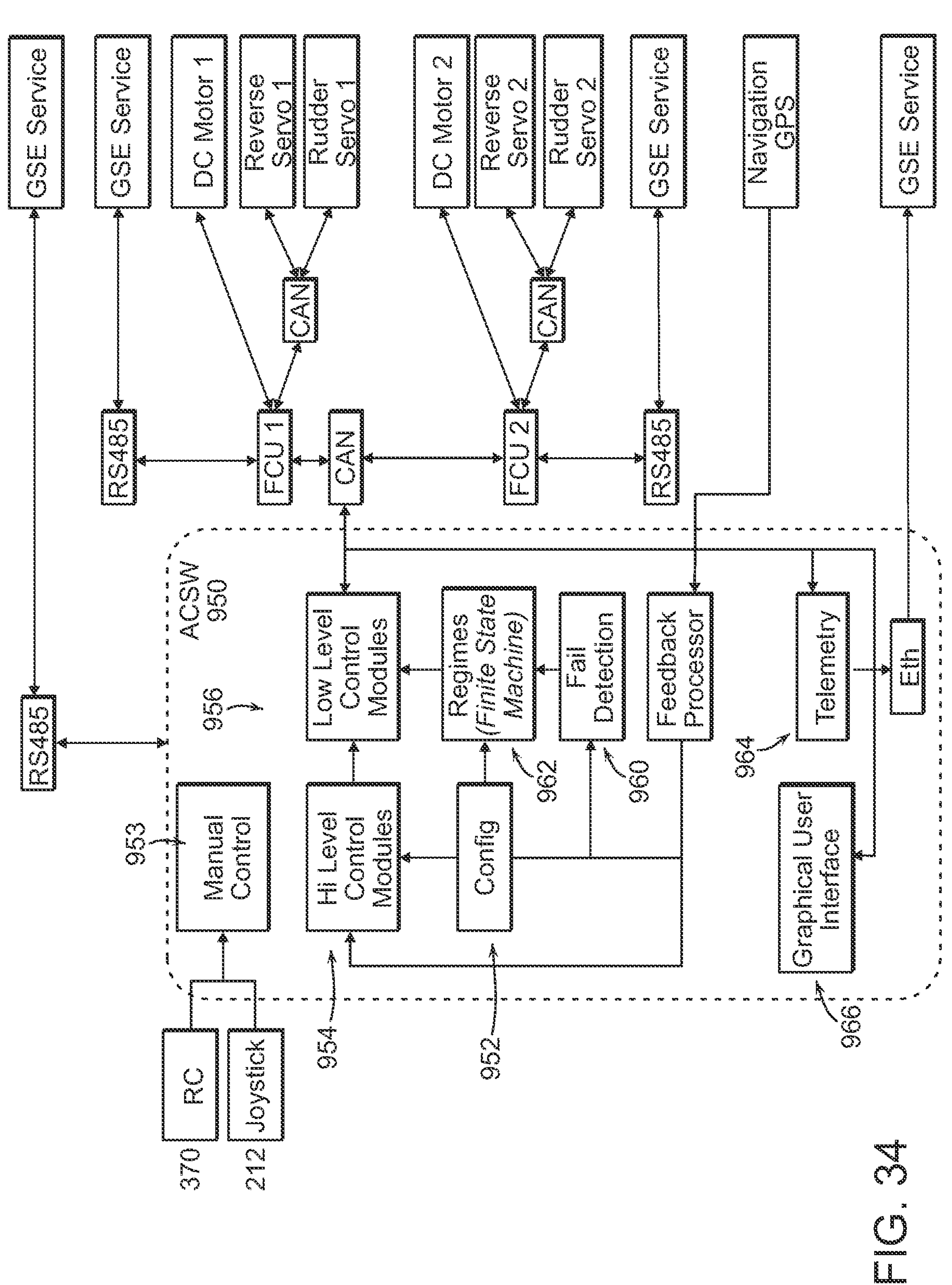
FIG. 34 illustrates a schematic diagram of the functional elements of the system control unit and automatic control software (ACSW).

FIG. 34 illustrates a schematic diagram of the functional elements of the system control unit and automatic control software (ACSW) 950. The parameters of ACSW functioning, including error detection parameters, are set by configuration data (Config) 952. The configuration parameters define all factors that are used to filter input data and compute parameters in the control loop. These factors are determined based on the calculations and must be confirmed during tests. During operation, these parameters are not changed if the physical parameters of the control object are not changed. In addition, the configuration parameters take into account specific values associated with the type of control object, actuators and sensors, weight, dimensions, moments of inertia, DC-Motors power, actuator rod displacements, operating ranges of output voltages and battery capacities, operating temperature ranges, etc. These parameters are determined at the stage of assembly (integration) of the seaplane. During operation, the configuration data 952 takes into account any changes in the electromechanical components of a particular control object—both at the time of initial assembly and during maintenance and repair.

Movement and spatial position control tasks can be divided into two levels: high level control 954 and low level control 956. High control level 954 handles tasks including calculating the required speed and heading angle based on the current and given coordinates. The upper stabilization loop has a rough and fine guidance mode. Low control level 956 handles low level tasks including calculating and issuing the control action necessary to stabilize the given speed and course. The lower level provides cruise stabilization and stabilization (holding) in place.

For the stabilization loop to work, data from the DPSS, data from actuators, signals from manual controls, and configuration parameters are required. The manual control signals go to the manual control 953 block, where, depending on the current state, the appropriate levels of control signals are selected.

In addition to the task of controlling the position of the seaplane, the control system implements error detection algorithms (Fail Detection 960) and a state machine (Regimes 962), which determines the current state of the control system and issues logical control signals.

In the error detection block 960, at each iteration, the values of the signals from the devices 951 are checked. If an error is detected, the corresponding error code is set. The error detection block performs the following tasks: Device communication control; Control of physical quantities (voltage, temperature, speed, etc.); and determination of malfunctions by indirect indicators (e.g., by the value of power for a given speed, speed change rate, temperature increase, overload detection in an actuator channel, etc.).

To analyze the operation of the control system 350 and the seaplane as a whole, data from all buses of the control system and indications of the operation of all devices in the control loop are recorded and updated in the telemetry 964 block.

Based on the received telemetry data, information blocks and messages are formed, which are displayed on the manual control interface (MCI) display 202 as information for the operator. All telemetry data can be sent to an external device at the rate of its receiving for collection and subsequent analysis.

Interim or temporary storage of telemetry data in the system control unit (SCU) or float control unit (FCU) is not provided. However, internal storage for this data could be provided in some embodiments.

The program code is written in C++, version 2014 (C++ 14). Compilation and assembly takes place using toolchain arm-none-eabi version 9.2.1 or later with ARM support (Cortex-M series). During development, the model of object-oriented programming was used. The SW of PCS hardware includes the submodules described in table 4-1.

The main controls of the PCS are two types of fixtures. First, the SCU 120 is the main element of the control system 350. The SCU 120 is responsible for solving problems of motion control and status monitoring of the system, as well as for interaction with the operator and ground testing (debugging) facilities. In some embodiments, the SCU 120 code runs on a dedicated controller.

The float controller 116 (also called the float control unit or FCU) is a subordinate device in relation to the SCU 120. The FCU 116 receives control signals from the SCU 120 and, after pre-processing, sends them to the actuators located in the floats. In addition, the FCU 116 is responsible for continuous requesting of data from the sensors and devices connected to it, any necessary data transformations, and data transmissions to the SCU 120. The FCU 116 continuously monitors the state of the communication link with the SCU 120, as the communication failures mean loss of control. If control signals are not received from the SCU 120 during the period, the duration of which is set in the FCU configuration parameters, then the FCU independently switches all actuators to a safe (neutral) state: reducing the DC-Motor speed to zero, switching the linear actuators to the neutral position. Physically, the FCU 116 can be implemented as a separate controller with the necessary interface wiring.

In some embodiments, the SCU 120 and FCU 116 share common submodules.

Automatic Control Software Description

ACSW is used to control the movement of the system, to stabilize the movement parameters, and to continuously monitor the condition of the equipment. ACSW, at the software level, is implemented as two functions: an initialization function and an update function.

The initialization function is executed once at system startup. The function defines procedures that follow including linking the addresses of controlled devices and the corresponding data when calling functions for calculations and estimation of the initial states of controlled devices. The update function is designed to issue a solution depending on the current state of the system and the position of the controls. The update function is iterated at a specified frequency (i.e., it is executed regularly and in real time). The update frequency can be selected based on the physical properties and parameters of the control object, the requirements for operational safety, and the requirements for the accuracy of regulation and/or stabilization of the current position of the seaplane.

Figure 35:
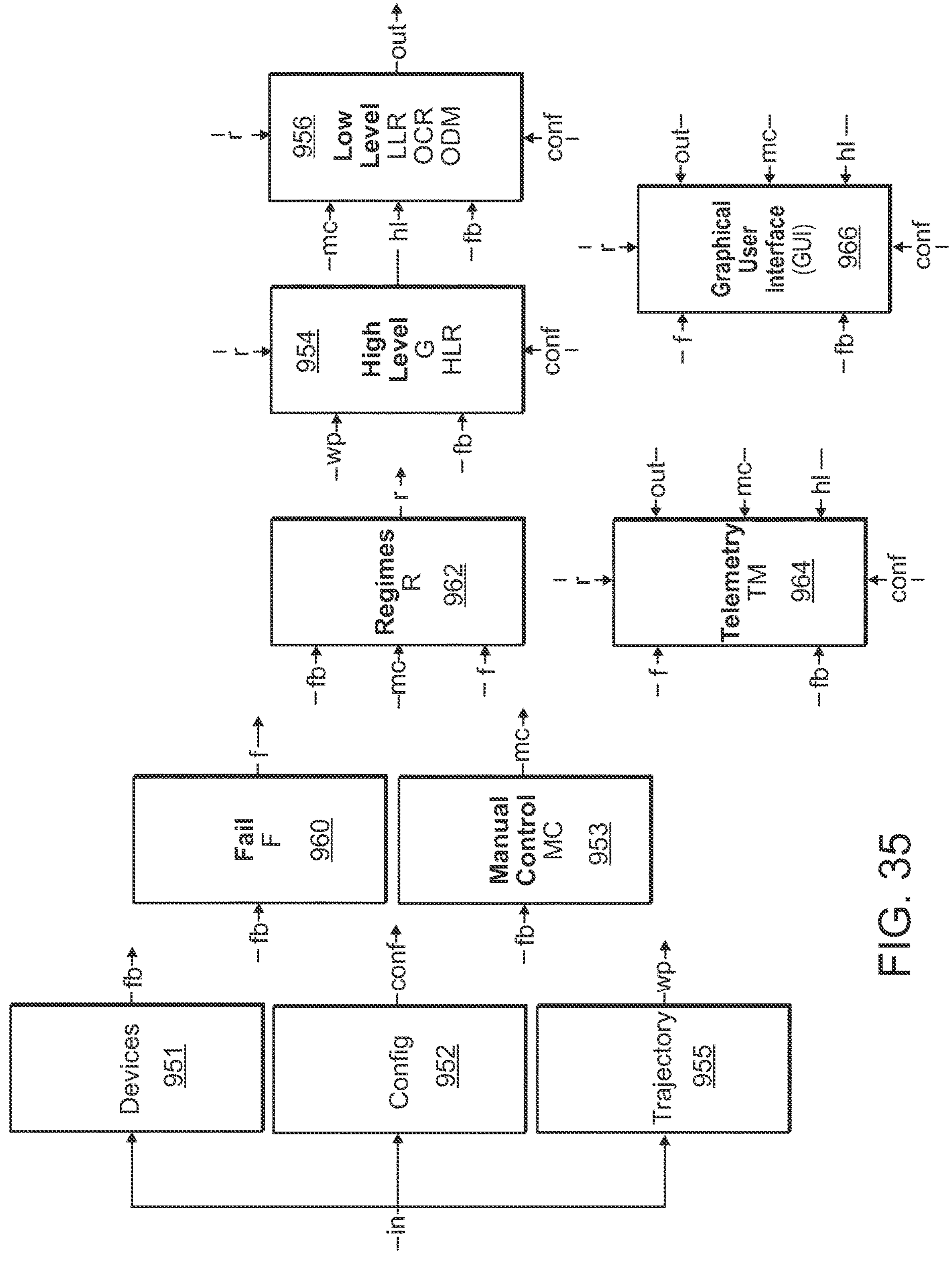
FIG. 35 illustrates a block diagram of structural units within the ACSW and their interconnections in accordance with some embodiments.

FIG. 35 illustrates a block diagram of structural units within the ACSW and their interconnections in accordance with some embodiments. Structurally, ACSW can comprise the following blocks where some blocks are organized under larger hierarchical structures: ODM, OCM, LLR, HLR, G, R, MC, F, TM as described in further detail below.

Within the low level control group 956, the ODM block is designed for multiplexing signals from MCI or RC and signals from the higher control stage (i.e., the OCM block). ODM implements the functionality of direct control of executive devices. It is the final control stage and contains the logic for enabling/disabling control—ARM/DISARM. In addition, this block limits the control signals to a range of 0 to 1. The OCM block is designed for multiplexing and mixing signals. Multiplexing is performed between signals from MCI or RC and signals from the higher control stage (i.e., the LLR block). OCM decomposes control signals for longitudinal movement and rotation by yaw angle into signals for actuators depending on the current state of the system.

The LLR block is designed to stabilize the longitudinal speed and yaw angle, for example. The input signals come either from the upstream circuit (i.e., components of the high level control group 954 such as the HLR block), or from MCI or RC. Stabilization is carried out in two modes—cruise and in-place. The principle of negative feedback and PID controllers can be used to implement these embodiments. To stabilize the yaw angle with MCI or RC, a stick integrator with a given velocity factor can be used. In the high level control group 954, the HLR block is designed to stabilize the distance to the endpoint and target the control object. The input signals come from the G block. The signals from this block are used when operating in automatic mode, for example. There can be a rough and fine guidance mode. The G block is designed to calculate the distance and angle of rotation to the endpoint based on the current and specified coordinates.

The R (Regimes) block 962 calculates logical control signals. It is a finite state machine. The current state is determined based on the movement parameters, the position of the controls and the presence of errors. The MC block 953 performs conversion, processing and selection of manual control signals. This block performs scaling, filtering and prioritization of signals from MCI or RC. The F block 960 is the device error detection unit. This block contains error detection methods for each of the subsystems. The TM block 964 is for registration and transmission of telemetry. The graphical user interface (GUI) block 966 prepares the status information and telemetry data for display on the display 202.

Architecturally, each block is an object of the corresponding class with one obligatory update interface, which is called at each iteration of the ACSW update function. Given the purpose of each of the listed blocks, the update function works in the following cycle. First, a reference to a structure that contains control signals, feedback signals, and configuration parameters is transferred to the update function. Next, depending on the selected motion mode (MC/RC, AC), the current real values of the motion velocity vector and direction to the specified target (endpoint) are taken into account and the control actions are calculated. Then, the data on the physical properties of the system, configuration parameters of control devices and executive devices that are specified or determined during the assembly and integration of the seaplane equipment are used for the calculations. Finally, the calculated impacts are transmitted to the executive devices of the system.

Simultaneously and in parallel with the listed functions, the ACSW can collect telemetry data and send it to an external device and can check the values of telemetry data to detect possible emergency situations and conditions and, if necessary, take actions to prevent an accident.

Following the flow through FIG. 35, the five layers of the software control and communication architecture are illustrated. The input data structure (in) contains processed signals from devices (feedback—fb), configuration parameters 952 (conf) and a trajectory 955 of waypoint coordinates (wp). Note that the feedback signals can comprise sensor data or state information of the system. Data from the devices are sent to the error detection unit (F) 960 and the manual control signal processing unit (MC) 953. The output buses of these blocks (f and mc, respectively) are fed to the input of the mode block (R) 962. This block defines the logical control signals, the current state of the system and the mode of operation. Signals from the mode block control the operation of the upper 954 and lower 956 levels of the ACSW (G, HLR and LLR, OCM, ODM). In addition to logical control signals, the input of these blocks receives signals from the manual control, set coordinates, feedback and configuration parameters. The signals from the lower level block 956 are control signals for the actuators (out). To form the telemetry structure, the buses of all blocks are fed to the input of the telemetry block (TM) 964.

The reading of indications and feedback data and the formation of the ACSW input structure are performed by means of the SCU. The ACSW module itself only describes the format of the input structure. The data in this structure can be represented in absolute or normalized format. By default, data is presented in absolute format. Exceptions are the following signals: the signal of the current position of the servos, and the control channels of the radio equipment and the joystick. These signals are normalized (reduced) to the range [0, 1].

The output data is a structure with normalized values of control signals. The conversion of normalized values—calculation results into values that must be submitted to the executive devices of the system, is performed in the FCU.

Figure 36:
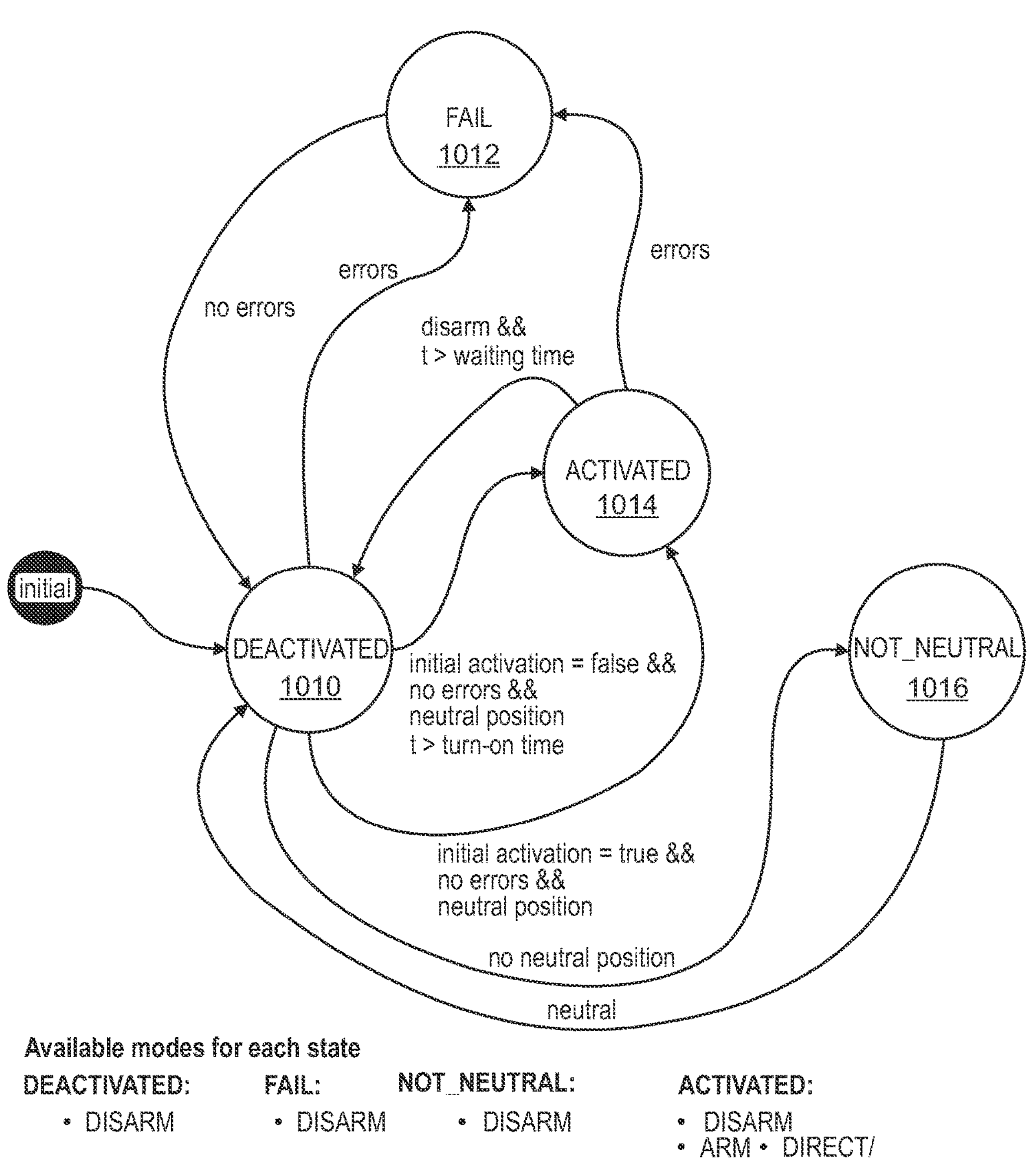
FIG. 36 illustrates a state diagram for the ACSW.

When running, the ACSW can be in one of several states. The corresponding state machine logic of the mode block in the form of a state diagram is illustrated in FIG. 36. In the initial state, the ACSW is started, configuration parameters are read, and no errors are found in configuration parameters. In the DEACTIVATED state, Power is on, preliminary checks are completed successfully, no hardware or configuration errors are found in the system, all controls in neutral, no drive mode is selected, and the system is motionless. The transition to this state can be carried out from all other states. Management of executive devices is prohibited.

In the ACTIVATED state, control of executive devices is allowed, as well as selection of the ACSW operation mode. The transition to this state is carried out only from the DEACTIVATED state. If critical errors are detected, a transition to the FAIL state is performed. The transition to the DEACTIVATED state occurs either at the command of the Operator, or if the system is motionless and no control command is received from the Operator within the specified time (deactivation interval is a configuration parameter).

In the NOT_NEUTRAL mode, the system has detected that one or more agents are not brought to the state specified by ACSW, or they are not in the neutral position if it is specified. In the FAIL state, a critical error has been detected, in which further controlled movement of the system is impossible or dangerous for the equipment performance.

Turning again to FIG. 36, the initial state when the system is enabled is the DEACTIVATED state 1010. This state is characterized by control signals that correspond to the neutral position of the actuators. Access to the control of executive devices is prohibited. In this state, the ACSW waits for a timer to expire, counting down the time to turn on all subsystems. After that, the signals from the error detection unit are checked. If no errors are found, and the position of the actuators corresponds to the neutral value, then the transition to the ACTIVATED state 1014 is performed. In this mode, the operator has access to all control sub-modes—DIRECT/SEMIAUTO/FULL_AUTO.

When a critical error is detected, the transition to the FAIL state 1012 is performed. When the cause of the error is eliminated, the transition to the DEACTIVATED state 1010 is performed. The activation process in this case differs from the original one, as it is assumed that all devices are turned on and working normally. If it is determined that the position of the actuators does not correspond to the neutral position during the activation process, a transition to the NOT_NEUTRAL state 1016 is performed. The transition from this state to the DEACTIVATED state 1010 occurs when the actuators are brought to the neutral position. The deactivation process from the ACTIVATED state 1014 occurs when in DISARM control mode for a specified time.

ACSW status is determined automatically and depends on a combination of the following factors: mode selected by the Operator using the controls; current position of actuators; and presence of errors in the system devices operating.

System Control Unit Functionality

Software in the SCU 120 includes functional components that manage threads of the real-time operating system, CAN bus operation methods, Watchdog, Loader, Clock and timing controller, System timer, and Binary command control system via test interface (for debugging purposes). When power is applied, the SCU can initialize the microcontroller peripherals and memory followed by the initiation of the threads and external components located on the board.

In threads and real-time, the SCU conducts any or all of the following operations: ACS iteration (calculation of control parameters in accordance with the selected driving mode and control mode); Receiving input data and checking them for abnormal situations, as well as generating telemetry data; and Generating data to show the status parameters of the ACSW and the system as a whole on the MCI display.

SCU is a complex device, the purpose of which is to control the system by the operator's commands or automatically—on a predefined route (reaching a given point, holding it and/or returning to its original position). The SCU can receive control signals from the control panel, which is available to the operator in MC Mode. The operator has access to the buttons and joystick located on the control panel. The SCU can receive control signals from Remote control (interaction with the SCU is carried out via the S-BUS protocol). The SCU can receive control signals from a navigation block that determines the exact values of the linear and angular velocity vectors, and provides accurate geopositioning.

The SCU can operate in different modes and switch between them at the operator's command, as well as depending on the state of the equipment. The SCU communicates with the FCU via the CAN interface described in the lib_can_frame_interface submodule. After each iteration of the ACSW control task, the results of the calculation of control actions (setpoints) are sent to the FCU. Since the command and information exchange between the SCU and FCU is carried out via the CAN bus, data loss during transmission is possible. Therefore, the SCU constantly monitors the number of correctly delivered and "lost" data packages. Based on this, the SCU continuously monitors the quality of the control channels. Data exchange is performed asynchronously—the SCU waits for feedback data from the FCU and, at a specified interval, according to the real-time timer, conducts the next iteration of the ACS. In this case, the data that were received from the FCU at the time of the start of the next iteration are taken into account. Based on the results of the ACS iteration, the calculation results are sent to the FCU as control actions. In addition, another block of telemetry data is formed, which is sent outside via the UDP port.

Maintenance of the system is carried out using the GSE complex. To interact with the GSE, the SCU and FCU have a separate communication channel with the RS-485 exchange protocol and support for the VIN interface. The exchange of data presented in text and binary form is supported. The interaction protocol is described in the lib_service submodule.

The SCU design has an integrated display 202 in some embodiments, which, with a frequency of 10 Hz (within the accuracy), shows the necessary parameters of for the operator. All calculations for solving motion control problems are made in SCU. Only the task of stabilizing the DC-Motor speed is performed in the FCU.

Float Control Unit Functionality

Software in the FCU includes functional components that include real-time operating system threads; CAN bus operation methods; watchdog; loader; clock and timing controller; system timer; and binary command control system via test interface. When power is applied, the FCU initializes the microcontroller peripherals and memory, after which it initializes the threads and external components located on the board.

In threads and real-time, the FCU conducts any or all of the following operations: control of actuators; and calculation of DC-motor control parameters in the automatic speed control (stabilization) system.

Float control unit (FCU) has two modes of operation: normal and debug. In the normal mode, the FCU is connected to SCU. Communication exchange between SCU and FCU is done via the CAN bus 340 (also referred to as CAN1) and the FCU can also communicate with the SCU via the CAN bus. A custom protocol is used, the description of which is given in the lib_can_frame_interface submodule. In this case, all control of executive devices are performed by commands received from the SCU. In the debug mode, the FCU is connected to GSE via RS-485 protocol. In this mode, the GSE operator can send any command to the FCU to control the actuators, and also has direct access to the data that the FCU collects from the sensors of the devices. This allows an independent setup and configuration of the FCU, including accounting for mechanical parameters and characteristics of actuators, which are determined only at the stage of assembly (integration) of the float equipment.

FCU Normal Operation

The FCU receives commands from the SCU: frames with setpoint data for the position of the linear actuators and the required DC-Motor speed. After data is received, it is stored in the temporary storage of the FCU. The setting (RPM Value Setting) of the DC-Motor is transferred to the automatic speed control system, which, in turn, displays the DC-Motor in the specified mode of operation. Actuator settings, i.e. changes in the positions of the rods are worked out in case of receiving the appropriate commands. In this case, the setpoint value that was received and written last (in time) is sent to the actuator.

The FCU sends frames with telemetry data to the SCU each time when it polls the executive devices (BMS, DC-motor driver, DC-motor and the actuators). The polling of sensors is performed at a frequency determined by the configuration parameters for each sensor or indicator. The FCU does not analyze the received sensor readings. It checks the correctness of the received data at the binary level, after which it serializes this data into a format suitable for transmission to the SCU.

FCU Development/Debug Mode Functionality

The FCU and the actuators interfaced with the FCU can be tested regardless of the presence or absence of communication with the SCU. To do this, the FCU has a special interface for working via the RS-485 protocol. Using the specified protocol, the FCU can be connected to the external ground equipment (GSE) via the VIN interface. In this mode, all control functions (in any combination) assigned to the FCU can be tested. At the same time, the functions of recording the actions and commands of an operator or a debug script and telemetry data are available for GSE tools for subsequent analysis and verification.

Control and Diagnostic Regulations

To monitor the status of the control bus, the SCU counts incoming and outgoing packages, regardless of their type. Similar actions are performed by the FCU for the controlled devices and in the exchange channel with the SCU. Thus, the integrity of the information exchange over the CAN bus and the stability (controllability) in general for the entire seaplane are determined. In the normal mode of operation, control bus control data is available as part of telemetry, and during debugging—through a test interface.

Software Architecture

The main block in the PCS structure, which receives control actions from the MCI and DPS operated interfaces, is the SCU under the control of the ACSW. The auxiliary control units in the PCS structure are two FCUs housed in the floats.

The exchange of command and telemetry information between SCU and FCU is carried out via the CAN1 bus 340 with the CAN 2.0b protocol with its own data encoding format. CAN1 bus topology is shown in FIG. 38. CAN2 bus 344 topology with CAN J1939 protocol within the float between the float control unit and other devices of the float propulsion system is shown in FIG. 39 such as actuators 602.

Under the control of ACSW, the SCU receives control actions from the MCI and DPS operated interfaces, generates and transmits command messages for the FCU of the left and right floats. Each of the FCU has its own address (CAN ID) on the CAN bus and, in accordance with the specified address, receives command messages from the SCU. The FCU broadcasts the received commands to the motion devices. Values of the control actions calculated by the ACSW in accordance with the selected driving mode are transmitted from the SCU to the FCU. The obtained values are interpreted by the FCU into direct control signals that are sent to the actuators. For example, signals related to the following quantities can be sent to the associated devices: shaft speed value can be sent to the DC-Motor driver, angle of deflection of the rudder nozzle can be sent to the rudder actuator, the reverse damper/flap has no intermediate positions and can receive a signal to be either closed (reverse is engaged) or open (reverse is disabled).

Data from the SCU to the FCU is transmitted as calculations are received from the ACSW. Transmission to each FCU is independent. The control frame is the same for each FCU. Each FCU collects telemetry information from devices inside the float and transmits them to the SCU. In turn, the SCU receives telemetry information (TMI) from each of the FCUs, as well as from devices installed in the Control Panel housing. The SCU under the control of ACSW processes the received TMI and displays it on the LCD screen and the interface for interaction with the equipment for recording telemetry information (GSE).

The FCU asynchronously polls data from the controlled devices and generates appropriate data frames that are sent to the SCU. The SCU, when receiving data from the FCU, uses these data for: analysis of the floats equipment condition; solving problems of movement control and stabilization with the formation of the necessary control actions; and generation of telemetry data that is sent to an external device.

ACSW can implement at least two modes of telemetry data collection: In the single mode, data is collected once at the moment of system equipment activation. Collected data can include configuration parameters that were actually used for equipment activation and ACSW configuration parameters. In the continuous mode, data is collected continuously, from the moment of activation, with a given polling frequency, during the system equipment operation time until shutdown. The data collected includes parameters that reflect the real state of the controlled device/sensor during operation. A single frame reflects the value of one parameter received from one device at a time: a numeric parameter value is transmitted as a 2-byte signed integer while logical values (flags) are transmitted as a 2-byte unsigned integer.

The operation of turning on the system and generating a signal to turn on the floats can be carried out manually, using a switch from the MCI set installed on the control panel. To perform this operation, the GPIO interface is used.

In some embodiments, the SCU is housed in the control panel chassis along with the following devices: navigation unit (DPSS); receiver (DPSS); battery (Main PSS); BMS (Main PSS); all other devices from MCI.

The following information-logical and electrical interfaces are used to exchange command and telemetry information between devices inside the control panel case: UART—SCU with navigation unit (DPSS) and receiver (DPSS); SBUS—SCU with receiver (DPSS); LCD—SCU with LCD-screen (MCI); I2C—SCU with BMS (Main PSS) via current and voltage sensor; ADC—control actions from joystick (MCI) in SCU; GPIO—control actions from buttons (MCI) in SCU.

Depending on the selected control mode via the UART protocol, the DPS receives the following information from the SCU: control actions from the Dynamic Positioning Remote Control via the receiver; coordinates and velocity vector of the seaplane in real time while moving through the water; angular velocities around the center of mass of the seaplane, linear accelerations at the point of installation of the sensor and the direction of the magnetic field vector along three axes.

The LCD interface displays telemetric information on the LCD-screen, which is necessary for the operator to control the seaplane in the following scope: Elapsed Time since power on (MM:SS); drive mode; control panel battery charge level—5 segments about 20% per each; RC/RF receiver state/signal level; GPS receiver state/Signal level; Current GPS coordinates latitude (GG.dddd)/Longitude (GG.dddd); Linear Speed (m/s); Joystick position; linear speed direction; north direction marker; Status; and Left/Right Float Data including CAN-BUS State; float battery charge level—5 segments about 20% per each; DC-motor rpm; and reverse position.

The Battery charge level (Main PSS) is determined by the current and voltage sensor at the output of the BMS (Main PSS) and transmitted to the SCU microcontroller via I2C.

Figure 40:
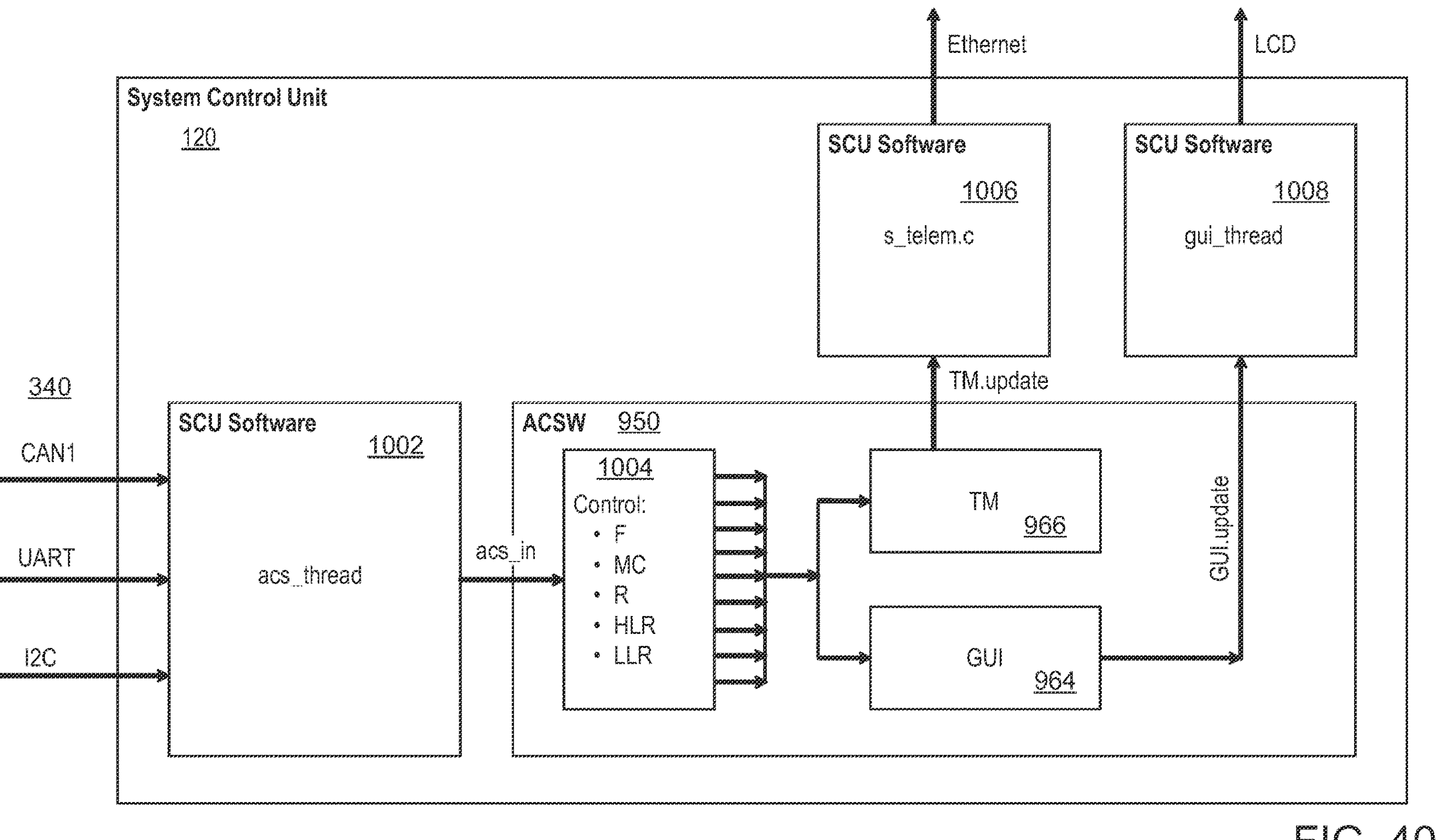
FIG. 40 illustrates an example scheme for transmitting telemetry information within and outside of the system control unit.

FIG. 40 illustrates an example format for transmitting telemetry information within and outside of the SCU 120. Telemetry data from the devices is sent to the SCU via CAN 340, UART and I2C interfaces. ACSW in the acs_thread thread 1002 reads the received data and calls the ACSW solution update function (acs_update). ACSW control blocks 1004 communicate with each other through shared-memory interfaces. Through the specified interfaces, ACSW data is communicated to the input of the telemetry registration and update module 966 (TM) and to the input of the signal conversion module 964 for output to the LCD-screen (GUI).

The acs_thread thread 1002 is created after all SCU peripherals have been initialized and is blocked until the LCD-screen and flash-memory are initialized. The Ethernet driver is initialized before the main acs_thread thread loop. The acs_thread thread calls functions to populate the ACSW input structure, the ACSW update function, and issue control commands from the ACSW output structure. Input can be from devices or from a model. After going through one cycle, the acs_thread thread is blocked until the next iteration.

In the TM block, telemetry variables are initialized (each variable is assigned a unique identifier) and form a structure for sending over Ethernet with the udp protocol. For this, the update and send_telemetry_data functions of the s_telem.c library 1006 are used.

The GUI block is used to prepare data for display on the MCI screen. In it, the gui bus signals are converted for output to the LCD-screen. The display of data from this bus is carried out in the gui_thread thread 1008.

The gui_thread thread 1008 is created after the SCU peripherals are initialized. Before the main loop of the gui_thread thread 1008, the LCD-screen driver is initialized. The gui_thread thread 1008 calls functions to display telemetry parameters on the screen. In the equipment service setup mode, the display can display information necessary for debugging the software and checking the performance of devices.

Figure 41:
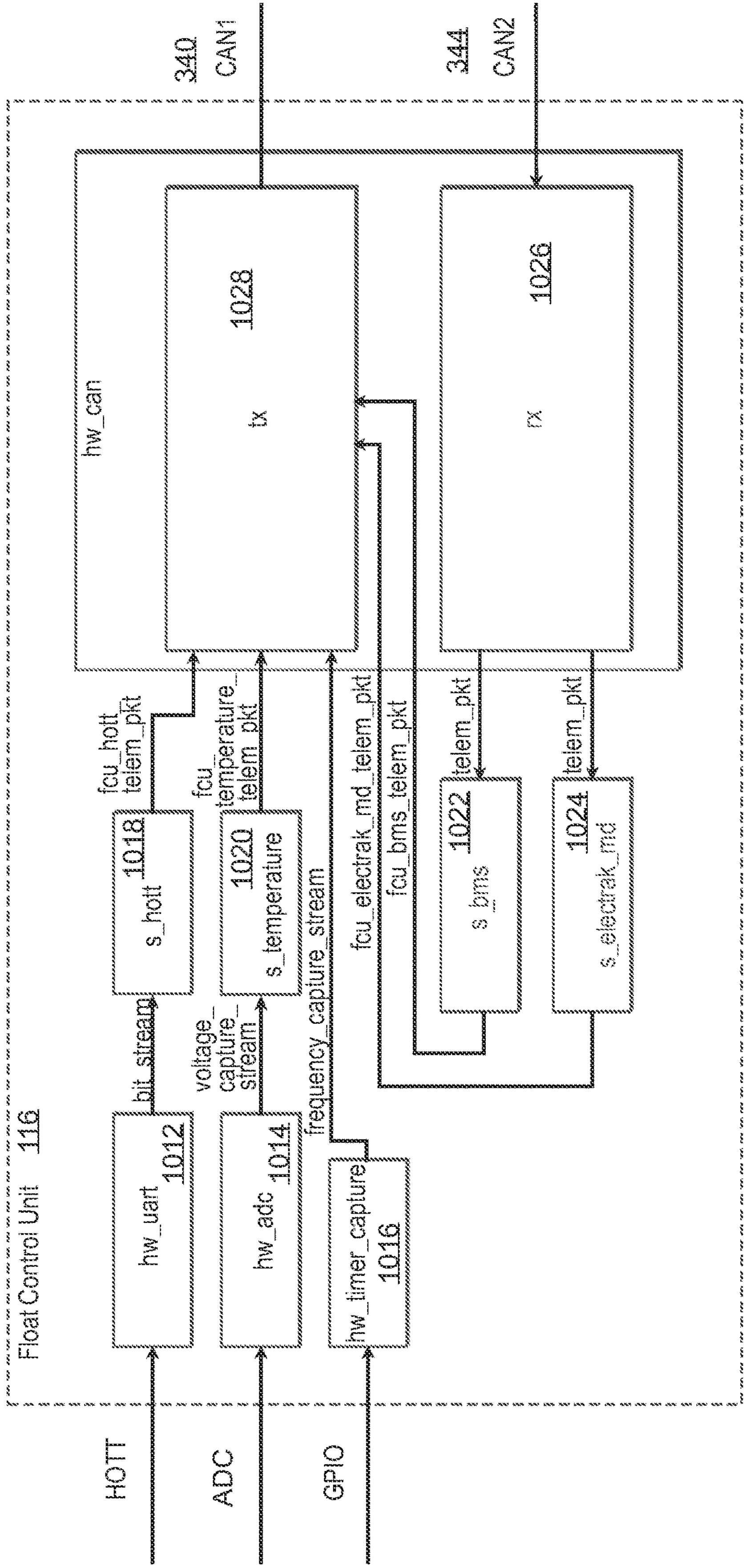
FIG. 41 illustrates a detailed scheme for transmitting telemetry information within and around the float control unit.

FIG. 41 illustrates a detailed scheme for transmitting telemetry information within and around the FCU 300. Inside each of the floats, the FCU exchanges command and telemetry information with the following devices: BMS (Float PSS); two actuators per float (FPU); DC-motor driver (FPU); Rpm-sensor (PCS); and 8 temperature sensors per float (PCS). For the exchange of command and telemetry information between devices inside each float, the following information-logical and electrical interfaces are used: CAN J1939-FCU with BMS (Float PSS) and two actuators per float (FPU); PWM—FCU with DC-motor driver (FPU); HOTT—FCU with DC-motor driver (FPU); GPIO—FCU with Rpm-sensor (PCS); and ADC—FCU with temperature sensors (PCS).

The FCU collects and transmits to the SCU the following information: voltage level on each serial battery module; the magnitude of the charge or discharge current of each battery module; voltage values of connected thermistors; a signal about the termination of the battery charge when the threshold current value is reached; battery blocking signal in case of overdischarging, overcharging or exceeding the current limit value (short circuit); current battery level (%) in each float; resistance values from thermistors; the position of the rods of the actuators of direction and reverse; current (instantaneous) consumption current of actuators; codes (flags) of actuator errors; current (instantaneous) voltage on DC-motor driver; current (instantaneous) current consumption of DC-motor driver; RPM value of DC-motor according to DC-motor driver; DC-motor speed value according to RPM-sensor data on the DC-motor shaft.

Turning again to FIG. 41, telemetry data from devices enters the FCU via CAN, HOTT, ADC and GPIO interfaces to the corresponding FCU Software blocks. The hw_uart block 1012 receives data from the DC-Motor Driver according to the protocol-add-on configured hott of the UART hardware module. The data that passed the integrity check in the form of a bit stream with time separators (checked packets) enters the s_hott block 1018. In this block, the validity of the received packet is checked by the checksum contained in it. If the checksum is valid (the packet is valid), the payload of the packet is split into separate elements of the telemetry frame sent to the hw_can_tx block 1028.

The hw_adc block 1014 digitizes the analog signal coming to the inputs of the ADC FCU hardware module. The converted signal is fed to the input of the median filter, the output of which is connected to the input of the moving average filter. Each hardware ADC channel is processed by an independent pair of described filters. The processed signal enters the s_temperature block 1020. The data obtained is converted into temperature values according to the parameters of the thermistors used. The converted data goes to the hw_can_tx block 1028.

The hw_timer_capture block 1016 receives the intervals between changes in the input signal level from the RPM-sensor. Signal level changes are fixed by means of a hardware timer. The measured values of the intervals are fed to a pair of filters (median and moving average) connected in series. The processed data is sent to the hw_can_tx block 1028.

The hw_can_rx block 1026 receives messages asynchronously from the Float BMS and Actuators. The received packets are transmitted to the control units, which are subscribed to the corresponding CAN line messages. The s_bms block 1022 receives data from the hw_can_rx block 1026 and splits the packet payload into separate elements of the telemetry frame sent to the hw_can_tx block 1028. The s_electrack_md block 1024 receives data from the hw_can_rx block 1026 and splits the packet payload into separate elements of the telemetry frame sent to the hw_can_tx block 1028.

The hw_can_tx block 1028 is a subordinate block for s_hott 1018; s_temperature 1020; hw_timer_capture 1016; s_bms 1022; and s_electrack_md 1024. The hw_can_tx block 1028 checks the state of the CAN hardware block and, if sending a telemetry frame is currently available, sends it to the hw_can_rx SCU Software block. If the package cannot be sent, then the same package will not be resent. The CAN hardware block has a buffer for three messages from any of the control blocks. Since the bandwidth of the CAN bus significantly exceeds the required bandwidth to send all the telemetry, the situation when sending is not possible is extremely rare.

To transfer telemetric information to the user, record and store on the GSE, the Ethernet service interface is used. The connector for connection is located on the control panel case. The telemetry data that is sent to the external device (GSE) is a fixed format structure. The file structure is generated by the tmgen generator at the stage of flashing/service flashing of the SCU with the current version of ACSW. The tmgen generator creates a header with a description of the telemetry class, registers signals, and creates an update method called from the ACS iteration function. The class is generated based on a ".csv" format file with names and variable names. According to the input description file of the ".csv" format, a table is also created with telemetry variable identifiers, name, description, units of measurement and types. The file with telemetric information frames data is recorded on the GSE in the specified directory in the ".csv" format and is subject to processing and analysis by any available data analysis tools.

FIG. 42 illustrates a schematic diagram for a hybrid aircraft 100' in accordance with various embodiments described herein. The hybrid aircraft 100' includes the propulsion control system 350 and one or more waterjet control systems 300 as described previously in relation to other embodiments (e.g., FIGS. 12A and 12B). The hybrid aircraft 100' also includes the electric motor 160 and the combustion engine 160 as illustrated in FIG. 3C to operate the main propeller or propellers 123, 127 of the airplane 100' to taxi or fly the airplane. The propulsion control system 350 including system control unit 120 can control the operation of the electric motor 160 and the combustion engine 150 independently to provide the appropriate mixture of fuel and battery usage and conservation depending upon variables such as flight mode, flight time remaining, fuel or battery power remaining, or other factors.

The PCS 350 is connected to a fuel tank and/or pump 411 that supplies fuel to the combustion engine 150. The throttle of the engine 150 is controlled by the fuel supply from the fuel tank 411. The PCT 350 is also connected to the motor controller 113 that operates the electric motor 160. The electric motor 160 draws power from the storage batteries 129. The hybrid aircraft 100' can include a heat exchanger 421 to provide cooling to the combustion engine 150, the motor controller 113, and/or the storage batteries 129. Sensors 434 monitor physical properties such as temperature of the combustion engine 150, electric motor 160, and storage batteries 129. Signals from the sensors 434 are relayed to the PCS 350. Based upon the received signals from the sensors 434, the SCU 120 can control usage of the combustion engine 150 and the electric motor 160 to prevent adverse conditions such as overheating. Alternatively, the combustion engine and the electric motor can be coupled to a single propeller as described herein.

Other embodiments will be apparent to those skilled in the art from consideration of the specification and practice of this disclosure. It is intended that the specification and examples be considered as exemplary only, with the true scope and spirit of the disclosed devices and methods being indicated by the following claims.

The invention claimed is:

1. A aircraft control system for controlling propulsion of an aircraft comprising:

an aircraft having a fuselage, a flight control system, a flight propulsion system for propelled airborne flight, an electronic controller and a flotation system having a flotation surface attached to the fuselage, or wherein the flotation surface further comprises a float attached to the fuselage, or a combination thereof; and a battery system within the flotation system, the battery system being electrically connected to a water propulsion system within the flotation system.

2. The system of claim 1, wherein the water propulsion system comprises a first electric motor connected to a battery of the battery system and further comprising a power management system that controls delivery of electrical power to the water propulsion system.

3. The system of claim 2, wherein the power management system is connected to the battery in the float that includes a first float and a second float attached to the fuselage, and wherein the battery further comprises a first battery in the first float and a second battery in the second float.

4. The system of claim 1, further comprising a cockpit in the aircraft wherein a pilot operates the flight control system and further comprising a manual controller in the cockpit for operating the water propulsion system, the manual controller being connected to the electronic controller.

5. The system of claim 1, wherein the aircraft comprises an autonomous vehicle.

6. The system of claim 1, wherein the aircraft comprises one or more wings having flight control surfaces operative in response to the flight control system and one or more batteries providing electrical power to the aircraft.

7. The system of claim 1 wherein the electronic controller is mounted to the aircraft and controls operation of the water propulsion system that includes a water jet propulsion device that propels the aircraft on the water surface.

8. The system of claim 7 wherein the battery system further comprises one or more batteries that provide power to at least the water propulsion system and a power management system that controls delivery of electrical power to the water propulsion system, the power management system connected to a first battery in a first float and a second battery in a second float.

9. The system of claim 1 wherein the flotation surface comprises a first float and a second float, each float being attached to the aircraft fuselage wherein the flotation surface comprises a first float flotation surface on the first float and a second float flotation surface on the second float.

10. The system of claim 9 wherein the water propulsion device comprises a first electric motor that drives a first waterjet mounted to the first float and a second electric motor that drives a second water jet connected to the second float, the first electric motor and the second electric motor being controlled by the electronic controller and wherein a first electric motor controller connected to the first electric motor and a second electric motor controller connected to the second electric motor, each electric motor controller being connected to the electronic controller.

11. The system of claim 10 wherein each waterjet further comprises a nozzle wherein water is propelled through the nozzle and wherein each nozzle configured to rotate by operation of a nozzle actuator relative to a respective waterjet axis in response to a control signal from the electronic controller.

12. The system of claim 1 wherein the aircraft comprises one or more wings having flight control surfaces operative in response to the flight control system and a fuel tank that supplies fuel to an aircraft engine.

13. The system of claim 1 further comprising a wireless communication system mounted to the aircraft wherein the wireless communication system is connected to the electronic controller such that the water propulsion system is operative in response to a remote control signal received by the wireless communication system.

14. The system of claim 1 wherein the electronic controller has a first operating mode without operation of an aircraft engine of the aircraft such that the aircraft is propelled across the water surface solely by the water propulsion system and wherein the electronic controller has a second operating mode to control the water propulsion system during takeoff of the aircraft from the water surface and wherein the electronic controller has a third operating mode to control the water propulsion system to actively stabilize a position of the aircraft on the water surface.

15. The system of claim 1 further comprising an aircraft position sensor that generates aircraft position data received by the electronic controller that actuates the water propulsion system to control a position of the aircraft on a water surface or further comprising a sensor that senses a condition of the water propulsion system or further comprising a battery sensor that senses a condition of a battery in the battery system that provides power to the water propulsion system or wherein the battery sensor comprises a temperature sensor.

16. The system of claim 1 further comprising a non-volatile memory that stores a plurality of executable instructions configured to operate the electronic controller.

17. The system of claim 1 wherein the aircraft comprises a cockpit having a flight control panel with at least one display configured to operate a graphic user interface wherein the at least one display is connected to the electronic controller to receive water propulsion data that is displayed on the at least one display and wherein the flight control system is electrically connected to the electronic controller.

18. The system of claim 1 wherein the water propulsion system for the aircraft further comprises a reverse deflector to reverse a direction of thrust by the water propulsion system, the reverse deflector being actuated by a motor that is connected to an encoder, the flotation surface comprising at least one float having a battery within the battery system that provides power to the water propulsion system, the electronic controller including a float control unit in the at least one float and wherein a further battery is mounted in the fuselage, the battery, when installed, lowering a center of gravity of the aircraft wherein the battery is connected to a battery management system that is connected to a battery charging port connector on the float or the fuselage to connect to an external power source, and wherein the battery comprises a first battery module and a second battery module wherein each battery module is connected to the battery management system that further comprises a battery management circuit connected to a float control circuit in the float control unit wherein the battery modules are positioned along a float longitudinal axis on opposite sides of the water propulsion system in the at least one float and wherein the battery modules are mounted on a float frame such that mounting positions of the battery modules are adjustable to define a float center of gravity of the at least one float.

19. The system of claim 18 wherein the float control circuit generates telemetry data for the float wherein the telemetry data includes an amount of battery power and a temperature of the battery, and further includes nozzle position data, and reverse deflector position data.

20. A aircraft control system for controlling propulsion of an aircraft comprising:

an aircraft having a fuselage, a flight control system, a propulsion system for propelled airborne flight, an electronic controller and a flotation system having a flotation surface wherein the aircraft includes one or more wings having a flight control surface operative in response to the flight control system; and a battery system within the flotation system and electrically connected to the propulsion system to provide electrical power to the aircraft.

21. The system of claim 20, wherein the propulsion system comprises a first electric motor connected to a battery of the battery system and further comprising a power management system that controls delivery of electrical power to the propulsion system.

22. The system of claim 20, further comprising a power management system in the flotation system that is connected to a first battery of the battery system in a first float and a second battery of the battery system in a second float.

23. The system of claim 20, further comprising a cockpit in the aircraft wherein a pilot operates the flight control system for the propulsion system that controls flight of the aircraft and further comprising a manual controller in the cockpit for operating a water propulsion system, the manual controller being connected to the electronic controller.

24. The system of claim 20, wherein the aircraft comprises an autonomous vehicle.

25. The system of claim 20, further comprising:

a water propulsion system connected to the aircraft to propel the aircraft across a water surface, the water propulsion system connected to the electronic controller mounted to the aircraft that controls operation of a water jet propulsion device of the water propulsion system that propels the aircraft on the water surface.

26. The system of claim 25 wherein the water propulsion device comprises a first electric motor that drives a first waterjet mounted to a first float and a second electric motor that drives a second waterjet connected to a second float, the first electric motor and the second electric motor being controlled by the electronic controller and wherein a first electric motor controller is connected to the first electric motor and a second electric motor controller is connected to the second electric motor, each electric motor controller being connected to the electronic controller.

27. The system of claim 26 wherein each waterjet further comprises a nozzle wherein water is propelled through the nozzle and wherein each nozzle is configured to rotate, by operation of a nozzle actuator relative to a respective waterjet axis, in response to a control signal from the electronic controller.

28. The system of claim 25 wherein the water propulsion system for the aircraft further comprises a reverse deflector to reverse a direction of thrust by the water propulsion system, the reverse deflector being actuated by a motor that is connected to an encoder, the flotation surface comprising at least one float having a battery of the battery system that provides power to the water propulsion system, the electronic controller including a float control unit in the at least one float and wherein a further battery is mounted in the fuselage, the battery in the at least one float, when installed, lowering a center of gravity of the aircraft wherein the battery in the at least one float is connected to a battery management system that is connected to a battery charging port connector on the at least one float or the fuselage to connect to an external power source, and the battery in the at least one float comprises a first battery module and a second battery module wherein each battery module is connected to the battery management system having a battery management circuit connected to a float control circuit in the float control unit wherein the battery modules are positioned along a float longitudinal axis on opposite sides of the water propulsion system and wherein the battery modules are mounted on a float frame such that mounting positions of the battery modules are adjustable to define a center of gravity of the at least one float.

29. The system of claim 28 wherein the float control circuit generates telemetry data for the float wherein the telemetry data includes an amount of battery power and a temperature of the battery, and further includes nozzle position data, and reverse deflector position data.

30. The system of claim 20 wherein the flotation surface comprises a first float and a second float, each float being attached to the aircraft fuselage wherein the flotation surface comprises a first float flotation surface on the first float and a second float flotation surface on the second float.

31. The system of claim 20 wherein the aircraft comprises a fuel tank that supplies fuel to the aircraft engine.

32. The system of claim 20 wherein the battery system further comprises one or more batteries that provide power to at least a water propulsion system and a power management system that controls delivery of electrical power to the water propulsion system, the power management system connected to a first battery in a first float and a second battery in a second float.

33. The system of claim 20 further comprising a wireless communication system mounted to the aircraft wherein the wireless communication system is connected to the electronic controller such that the water propulsion system is operative in response to a remote control signal received by the wireless communication system.

34. The system of claim 20 wherein the electronic controller has a first operating mode without operation of an aircraft engine of the aircraft such that the aircraft is propelled across the water surface solely by a water propulsion system and wherein the electronic controller has a second operating mode to control the water propulsion system during takeoff of the aircraft from the water surface and wherein the electronic controller has a third operating mode to control the water propulsion system to actively stabilize a position of the aircraft on a water surface.

35. The system of claim 20 further comprising an aircraft position sensor that generates aircraft position data received by the electronic controller that actuates a water propulsion system to control a position of the aircraft on a water surface or further comprising a sensor that senses a condition of the water propulsion system or further comprising a battery sensor that senses a condition of a battery of the battery system that provides power to the water propulsion system or wherein the battery sensor comprises a temperature sensor.

36. The system of claim 20 further comprising a non-volatile memory that stores a plurality of executable instructions configured to operate the electronic controller.

37. The system of claim 20 wherein the aircraft comprises a cockpit having a flight control panel with at least one display configured to operate a graphic user interface wherein the at least one display is connected to the electronic controller to receive water propulsion data that is displayed on the at least one display and wherein the flight control system is electrically connected to the electronic controller.

* * * * *